United States Patent
Dinca et al.

(10) Patent No.: US 11,424,083 B2
(45) Date of Patent: Aug. 23, 2022

(54) METAL-ORGANIC FRAMEWORKS FOR SUPERCAPACITOR ELECTRODES

(71) Applicants: Massachusetts Institute of Technology, Cambridge, MA (US); Automobili Lamborghini S.p.A., Sant'Agata Bolognese (IT)

(72) Inventors: Mircea Dinca, Belmont, MA (US); Jinhu Dou, Cambridge, MA (US); Michal Borysiewicz, Truskaw (PL); Riccardo Parenti, Sala Bolognese (IT); Harish Banda, Cambridge, MA (US)

(73) Assignees: Massachusetts Institute of Technology, Cambridge, MA (US); Automobili Lamborghini S.p.A., Sant'Agata Bolognese (IT)

( * ) Notice: Subject to any disclaimer, the term of this patent is extended or adjusted under 35 U.S.C. 154(b) by 135 days.

(21) Appl. No.: 17/036,737

(22) Filed: Sep. 29, 2020

(65) Prior Publication Data

US 2021/0098203 A1   Apr. 1, 2021
US 2021/0398752 A9   Dec. 23, 2021

Related U.S. Application Data

(60) Provisional application No. 62/908,297, filed on Sep. 30, 2019.

(51) Int. Cl.
*H01G 11/30*   (2013.01)
*H01G 11/24*   (2013.01)
*H01G 11/62*   (2013.01)

(52) U.S. Cl.
CPC ............. *H01G 11/30* (2013.01); *H01G 11/24* (2013.01); *H01G 11/62* (2013.01)

(58) Field of Classification Search
CPC ......... H01G 11/30; H01G 11/24; H01G 11/62
See application file for complete search history.

(56) References Cited

U.S. PATENT DOCUMENTS

| 11,077,398 B2 * | 8/2021 | Dinca | ............. B01D 53/02 |
| 2013/0095351 A1 * | 4/2013 | Gellett | ............. H01G 9/035 |
| | | | 429/9 |

(Continued)

FOREIGN PATENT DOCUMENTS

| CN | 108597898 A * | 9/2018 | ............. H01G 11/30 |
| WO | WO-2009086441 A2 * | 7/2009 | ............. C07D 487/22 |

(Continued)

OTHER PUBLICATIONS

Dinca et al., Metal-organic frameworks for electronics and photonics. MRS Bulletin. 2016;41:854-857.

(Continued)

*Primary Examiner* — Dion R. Ferguson
(74) *Attorney, Agent, or Firm* — Wolf, Greenfield & Sacks, P.C.

(57) ABSTRACT

Metal-organic frameworks, supercapacitor electrodes, and supercapacitors are generally provided. Some metal-organic frameworks described herein may be suitable for use in supercapacitor electrodes, some supercapacitor electrodes described herein may comprise a metal-organic framework described herein, and some supercapacitors described herein may comprise the supercapacitor electrodes described herein.

20 Claims, 40 Drawing Sheets

(56) References Cited

U.S. PATENT DOCUMENTS

| | | | | |
|---|---|---|---|---|
| 2017/0341010 A1* | 11/2017 | Dinca | ................... | C07F 15/065 |
| 2018/0030213 A1* | 2/2018 | Johnson | ................ | A61K 47/32 |
| 2018/0250664 A1* | 9/2018 | Dinca | .................... | B01J 31/16 |
| 2018/0251581 A1* | 9/2018 | Dinca | ................. | B01J 31/1691 |
| 2019/0352243 A1* | 11/2019 | Dinca | .................... | C07F 15/06 |
| 2020/0164353 A1* | 5/2020 | Román-Leshkov | ........................ | |
| | | | | C07D 205/08 |
| 2021/0098203 A1* | 4/2021 | Dinca | ................... | H01G 11/28 |
| 2021/0151262 A1* | 5/2021 | Mallick | ................. | H01G 11/02 |
| 2021/0398752 A9* | 12/2021 | Dinca | ................... | H01G 11/24 |

FOREIGN PATENT DOCUMENTS

| | | | | |
|---|---|---|---|---|
| WO | WO-2014088712 A1 * | 6/2014 | .............. | C07F 9/535 |
| WO | WO-2017205752 A1 * | 11/2017 | .............. | B01D 53/02 |

OTHER PUBLICATIONS

Huang et al., A two-dimensional π-d conjugated coordination polymer with extremely high electrical conductivity and ambipolar transport behaviour. Nat Commun. Jun. 15, 2015;6:7408. doi: 10.1038/ncomms8408. PMID: 26074272; PMCID: PMC4490364.

* cited by examiner

Ni₃BHT₁          Ni₃BHT₂

METAL-ORGANIC FRAMEWORKS FOR SUPERCAPACITOR ELECTRODES

RELATED APPLICATIONS

This application claims priority under 35 U.S.C. § 119(e) to U.S. Provisional Application No. 62/908,297, filed Sep. 30, 2019, and entitled "Metal-Organic Frameworks for Supercapacitor Electrodes", which is incorporated herein by reference in its entirety for all purposes.

TECHNICAL FIELD

Metal-organic frameworks suitable for use as supercapacitor electrodes, supercapacitor electrodes comprising metal-organic frameworks, supercapacitors, and associated articles and compositions are generally provided.

BACKGROUND

Supercapacitors are increasingly being used in more applications due to their power delivery capacities, which are much higher than those of batteries. Batteries, on the other hand, excel in high energy capacity. For this reason, one of the challenges facing current technology research and development is the design of a cell that would exhibit both the high power density of supercapacitors and the high energy density of batteries, and so new electrodes having both high power density and high energy density are needed.

SUMMARY

Metal-organic frameworks, supercapacitor electrodes, and supercapacitors are generally described.

In some embodiments, a supercapacitor electrode is provided. The supercapacitor electrode comprises a metal-organic framework comprising a plurality of metal ions coordinated with a plurality of ligands. The plurality of ligands comprises ligands comprising two or more sulfur donor atoms. The metal ions are coordinated with the ligands comprising the sulfur donor atoms by the sulfur donor atoms.

In some embodiments, a supercapacitor electrode comprises a metal-organic framework comprising a plurality of metal ions coordinated with a plurality of ligands. The metal-organic framework is configured to interact with a second plurality of ions such that the second plurality of ions are intercalated and/or absorbed into the metal-organic framework. The metal-organic framework is configured such that at least a portion of the metal ions undergoes a redox reaction during charging and/or discharging of the supercapacitor electrode.

In some embodiments, a method is provided. The method comprises performing a redox reaction in a metal-organic framework comprising a plurality of metal ions coordinated with a plurality of ligands and intercalating a second plurality of ions into the metal-organic framework. The second plurality of ions and the metal-organic framework together have a neutral charge.

In some embodiments, a metal-organic framework is provided. The metal-organic framework comprises a plurality of metal ions coordinated with a plurality of ligands. The metal ions comprise nickel ions, cobalt ions, iron ions, platinum ions, and/or palladium ions. The plurality of ligands comprises ligands comprising two or sulfur donor atoms. The metal ions are coordinated with the ligands comprising the sulfur donor atoms by the sulfur donor atoms. The metal-organic framework comprises a plurality of pores having an average pore size of greater than or equal to 0.3 nm and less than or equal to 1 nm.

In some embodiments, a supercapacitor is provided. The supercapacitor comprises a first electrode comprising a first metal-organic framework and a second electrode comprising a second metal-organic framework. Each metal-organic framework comprises a plurality of metal ions coordinated with a plurality of ligands. The second metal-organic framework differs from the first metal-organic framework.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
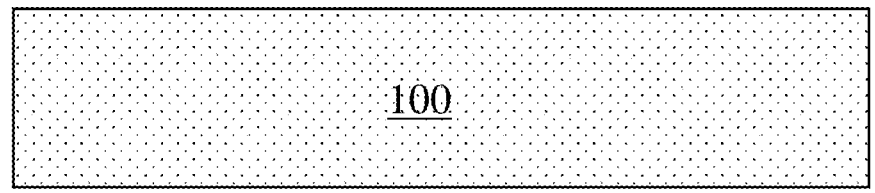
FIG. 1 shows one non-limiting embodiment of a metal-organic framework, in accordance with some embodiments.

Metal-organic frameworks, supercapacitor electrodes, and supercapacitors are generally provided. Some metal-organic frameworks described herein may be suitable for use in supercapacitor electrodes, some supercapacitor electrodes described herein may comprise a metal-organic framework described herein, and some supercapacitors described herein may comprise the supercapacitor electrodes described herein.

In some embodiments, a metal-organic framework described herein has one or more features that enhance its suitability for use in a supercapacitor electrode. By way of example, a metal-organic framework may have one or more structural features that interact in a favorable manner with one or more ions in a supercapacitor electrolyte. For instance, a metal-organic framework may include one or more structural features into which ions can readily intercalate and/or be absorbed, such as pores having a size into which ions can readily be absorbed and/or spaces between two-dimensional sheets therein having a size into which ions can readily intercalate. Metal-organic frameworks having one or more such features may advantageously exhibit an increased ability to intercalate and/or absorb ions from the electrolyte, resulting in enhanced neutralization of any charge thereon by ions from the electrolyte.

As another example, a metal-organic framework may interact with one or more ions in a supercapacitor electrolyte in a favorable manner during a redox process. For instance, a metal-organic framework may comprise a plurality of metal ions configured to undergo a redox reaction, and may be configured such that ions intercalating and/or absorbing thereinto and/or deintercalating and/or desorbing therefrom balance the change in charge on the metal ions therein. This may result in the combination of the metal-organic framework and the ions intercalated therein having a neutral charge. Such interactions may enhance the reversible energy storage capacity of the metal-organic framework by allowing energy storage on the ligands and/or metal ions of the metal-organic framework.

Some metal-organic frameworks may have one or more physical or chemical properties that enhance their performance as supercapacitor electrodes. For example, in some embodiments, a metal-organic framework described herein has an advantageously high electrical conductivity. Without wishing to be bound by any particular theory, it is believed that ligands comprising sulfur donor atoms, such as ligands comprising dithiolene groups, may enhance the electrical conductivity of a metal-organic framework in which they are positioned. It is believed that the p orbitals of the sulfur donor atoms have a favorable energy level and diffuse nature that promotes enhanced overlap with the adjacent d orbitals of the metal ions that they coordinate and/or with pi orbitals of adjacent portion(s) of the ligand. As high electrical conductivity enhances the ability of the metal-organic framework to transport electrons to and from an external circuit, it desirably reduces its internal resistance.

As another example, a metal-organic framework may have a chemical composition that causes it to interact electrochemically with one or more ions in a supercapacitor electrolyte as described above. For instance, a metal-organic framework may comprise a plurality of metal ions having a redox potential such that a reversible redox reaction may take place during charging and discharging in which the change in charge of the metal ions is balanced by the intercalation and/or absorption of one or more ions in a supercapacitor electrolyte thereinto and/or deintercalation and/or desorption of one or more ions in a supercapacitor electrolyte therefrom. Coordination of the plurality of metal ions in the metal-organic framework with some ligands, such as ligands comprising one or more sulfur donor atoms (e.g., ligands comprising one or more dithiolene groups), may affect the redox potential of the metal ions and so may promote such behavior.

In some embodiments, a supercapacitor is provided comprising at least one electrode comprising a metal-organic framework. The metal-organic framework may be one of the metal-organic frameworks described herein and/or have one or more of the properties of metal-organic frameworks described herein. Such supercapacitors may exhibit desirably high power delivery capacities and/or energy densities for the reasons described elsewhere herein with respect to the metal-organic frameworks.

In some embodiments, a supercapacitor comprises two electrodes that comprise metal-organic frameworks and/or comprises exclusively electrodes that comprise metal-organic frameworks. Such supercapacitors may comprise two electrodes that each comprise a metal-organic framework, and the metal-organic framework in one of the electrodes differs in one or more ways from the metal-organic framework in the other electrode. For instance, a supercapacitor may comprise a first electrode comprising a first metal-organic framework having a first electrode potential and a second electrode comprising a second metal-organic framework having a second, different electrode potential. The first and second electrode potentials may together provide a desirable potential difference across the supercapacitor as a whole. By way of example, the two electrodes may together result in the supercapacitor displaying a potential difference thereacross that provides a desirable power density and/or capacity.

Figure 2:
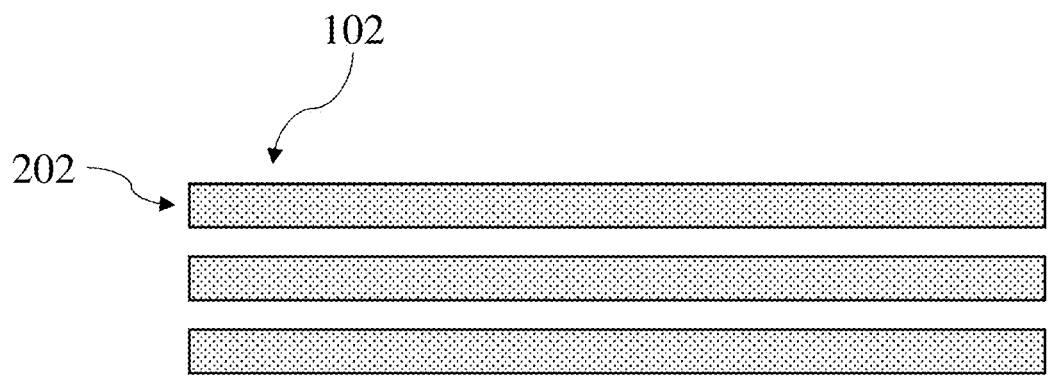
FIG. 2 shows one non-limiting embodiment of a metal-organic framework comprising a plurality of two-dimensional sheets, in accordance with some embodiments.

FIG. 1 shows one non-limiting embodiment of a metal-organic framework 100. In some embodiments, a metal-organic framework has a two-dimensional structure (e.g., as shown in FIG. 2). A metal-organic framework having a two-dimensional structure may be strongly bonded together in two dimensions (e.g., by covalent bonding) and weakly bonded together and/or weakly interacting in the third dimension (e.g., by van der Waals interactions). In other words, the interaction energy between the plurality of two-dimensional sheets may be less than the bond strength within the plurality of two-dimensional sheets. The portions of the two-dimensional structure strongly bonded together in two dimensions may form the two-dimensional sheets, which may extend macro- or meso-scopically in two dimensions and have Angstrom-scale or nanometer-scale thicknesses in the third dimension. Such sheets may be aligned with each other or may be positioned with respect to each other in another manner. In some embodiments, a two-dimensional structure comprises a structural motif that repeats in two dimensions (e.g., in a two-dimensional sheet) but is weakly ordered in the third dimension. As described elsewhere herein, the structural motif may be a pore, an atom, and/or an arrangement of atoms. FIG. 2 shows one non-limiting embodiment of a metal-organic framework 102 comprising a plurality of two-dimensional sheets 202.

Figure 3:
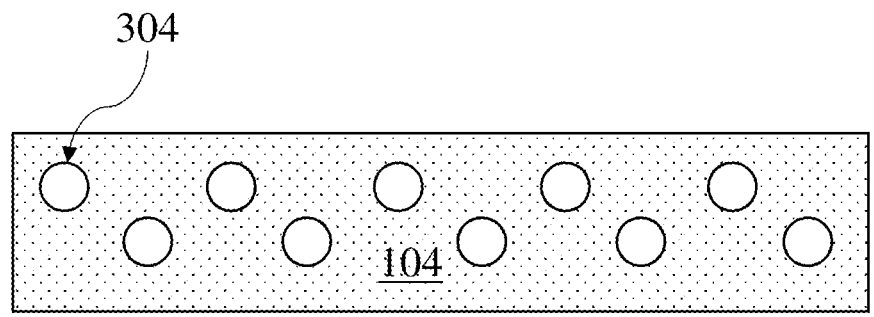
FIG. 3 shows one non-limiting embodiment of a top view of a metal-organic framework comprising a plurality of pores, in accordance with some embodiments.

In some embodiments, a metal-organic framework described herein comprises a plurality of pores. Such pores may have a variety of suitable morphologies. FIG. 3 shows one non-limiting embodiment of a top view of a metal-organic framework 104 comprising a plurality of pores 304. Pores in the metal-organic frameworks described herein may have some features in common with those shown in FIG. 3 and/or may have some features that differ from those shown in FIG. 3. By way of example, in some embodiments, a metal-organic framework comprises a plurality of pores having a relatively uniform sizing and/or spacing like the pores shown in FIG. 3. As also shown in FIG. 3, in some embodiments, a plurality of pores may positioned in a manner with respect to each other that forms a lattice that repeats throughout the metal-organic framework. As an example of a feature of a plurality of pores that may differ from that shown in FIG. 3, in some embodiments, a plurality of pores occupies a different volume fraction of the metal-organic framework than that shown in FIG. 3 (e.g., a metal-organic framework may comprise a plurality of pores may occupying a much larger volume fraction thereof than the metal-organic framework depicted in FIG. 3). As another example, in some embodiments, a metal-organic framework comprises two different pluralities of pores differing from each other in one or more ways (e.g., a first plurality of pores having a first average pore size and a second plurality of pores having a second average pore size). As a third example, in some embodiments, a metal-organic framework comprises a plurality of pores for which the pore size is not uniform.

It should be understood that the metal-organic frameworks described herein may lack porosity as measured by gas adsorption but may comprise pores accessible by ions in an electrolyte and/or may include surface pores as measured by gas adsorption but not bulk pores as measured by gas adsorption. Similarly, some metal-organic frameworks described herein may comprise bulk pores in fluidic communication with an environment external to the metal-organic framework and some metal-organic frameworks may comprise bulk pores not in fluidic communication with an environment external to the metal-organic framework.

Figure 4:
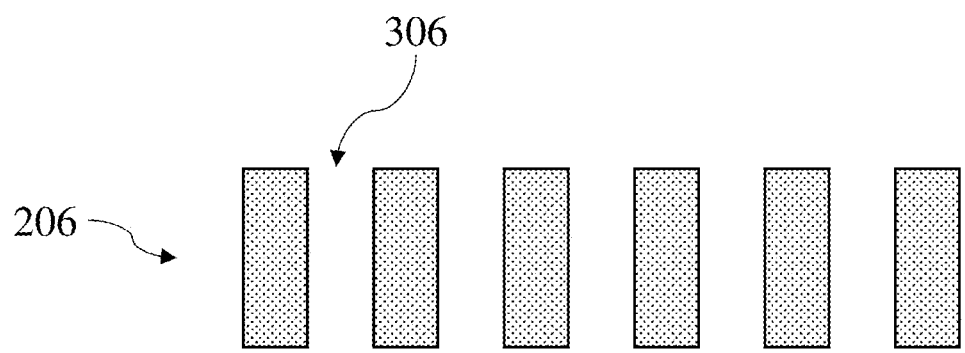
FIG. 4 shows one non-limiting embodiment of a side view of such a two-dimensional sheet within a metal-organic framework, in accordance with some embodiments.

In some embodiments, metal-organic frameworks comprise two-dimensional sheets comprising pores. FIG. 4 shows one non-limiting embodiment of a side view of such a two-dimensional sheet within a metal-organic framework. In FIG. 4, a metal-organic framework 206 comprises a plurality of pores 306. In FIG. 4, the pores pass through the two-dimensional sheet from a first side to a second, opposing side.

Although some metal-organic frameworks described herein include have two-dimensional sheets comprising pores similar in one or more ways to those shown in FIG. 4, other metal-organic frameworks described herein may lack such pores and/or may include pores of other types. For instance, in some embodiments, a metal-organic framework lacks two-dimensional sheets but comprises pores and/or comprises pores in a portion thereof other than a two-dimensional sheet. As another example, in some embodiments, a metal-organic framework comprises pores that do not pass through the thickness of the metal-organic framework as a whole and/or do not pass through the thickness of one or more structural features within a metal-organic framework. As another example, a metal-organic framework may comprise further pores between grains therein (e.g., grains therein randomly oriented with respect to each other). Such pores may have a broad range of sizes.

Two-dimensional sheets and/or pores in the metal-organic frameworks described herein may have morphologies that enhance the utility of the metal-organic framework for use as an electrode in a supercapacitor. For instance, the two-dimensional sheets may be spaced from each other in a manner that allows ions to intercalate therebetween and/or pores in a metal-organic framework may have an average pore size that allows ions to absorb thereinto. In some embodiments, a metal-organic framework comprises both two-dimensional sheets and pores (and/or comprises both two-dimensional sheets that allow ion intercalation therebetween and pores that allow ion absorption thereinto).

Figure 5:
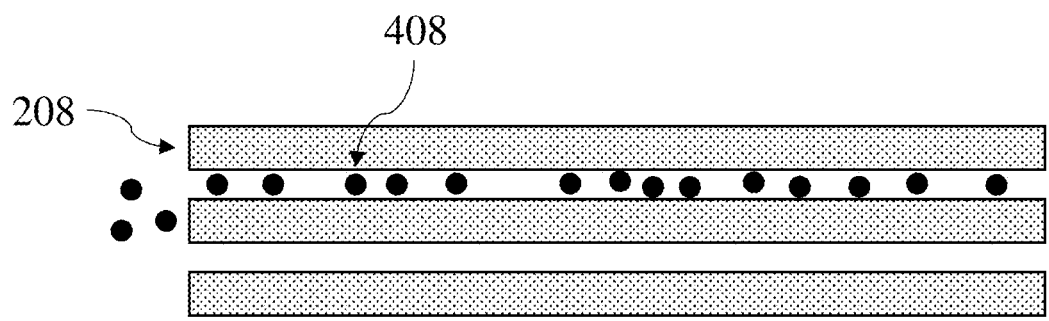
FIG. 5 shows one non-limiting embodiment of a method of intercalating ions into a metal-organic framework between two two-dimensional sheets, in accordance with some embodiments.
Figure 6:
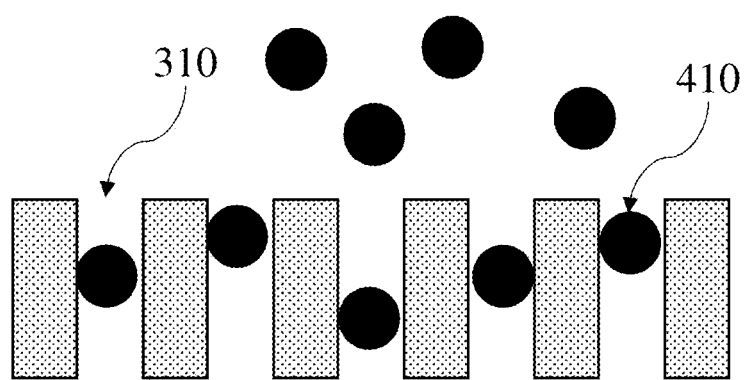
FIG. 6 shows one non-limiting embodiment of a process of absorbing ions into a metal-organic framework into a plurality of pores therein, in accordance with some embodiments.

FIG. 5 shows one non-limiting embodiment of a method of intercalating ions into a metal-organic framework between two two-dimensional sheets. In FIG. 5, a plurality of ions 408 intercalates between two two-dimensional sheets in a plurality of two-dimensional sheets 208. FIG. 6 shows an analogous process of absorbing ions into a metal-organic framework into a plurality of pores therein. In FIG. 6, a plurality of ions 410 absorbs into a plurality of pores 310. As shown in FIGS. 5 and 6, the diameter of the ions may be on the order of the spacing between the two-dimensional sheets and/or the average pore size of the pores, which it is believed promotes intercalation and/or absorption of the ions thereinto. However, it should be understood that some metal-organic frameworks described herein may comprise pores having an average pore size suitable for intercalating more than one ion each.

Intercalation and/or absorption of ions into a metal-organic framework may be accompanied by a redox reaction. For instance, in some embodiments, a metal-organic framework undergoes a redox reaction and at least a portion of a plurality of ions intercalating and/or absorbing into a metal-organic framework compensate for the change in charge of the metal-organic framework associated with the redox reaction. As another example, in some embodiments, a metal-organic framework undergoes a redox reaction and at least a portion of a plurality of ions deintercalating and/or desorbing from a metal-organic framework compensate for the change in charge of the metal-organic framework associated with the redox reaction. The portion of the metal-organic framework undergoing the redox reaction may be the metal ions therein (or any other suitable portion of the metal-organic framework). By way of example, at least a portion of a plurality of ions may be intercalated and/or absorbed while a portion of a plurality of metal ions in the metal-organic framework is reduced. Similarly, in some embodiments, at least a portion of a plurality of ions are intercalated and/or absorbed into the metal-organic framework while a portion of a plurality of metal ions in the metal-organic framework are oxidized. Some metal-organic frameworks may be configured to have this behavior (i.e., they may be configured to interact with a plurality of ions such that the above-described behavior occurs).

It should also be understood that some of the metal-organic frameworks described herein may be configured to intercalate, absorb, deintercalate, and/or desorb ions without undergoing a redox reaction.

Redox reactions accompanied by intercalation and/or absorption of ions into a metal-organic framework and deintercalation and/or desorption of ions from a metal-organic framework may be facilitated by the presence of metal ions in the metal-organic frameworks having a redox potential in a range suitable for undergoing a redox reaction during charging and/or discharging. The redox potential of the metal ions in the metal-organic framework may be affected by one or more of the following factors: the type of metal, the oxidation state of the metal, the type of ligand(s) to which it is coordinated, the oxidation state of the ligand(s) to which it is coordinated, the dielectric constant of the electrolyte in the supercapacitor, the charge of the ions in the electrolyte in the supercapacitor, and the polarizability of the ions in the electrolyte in the supercapacitor.

Figure 7:
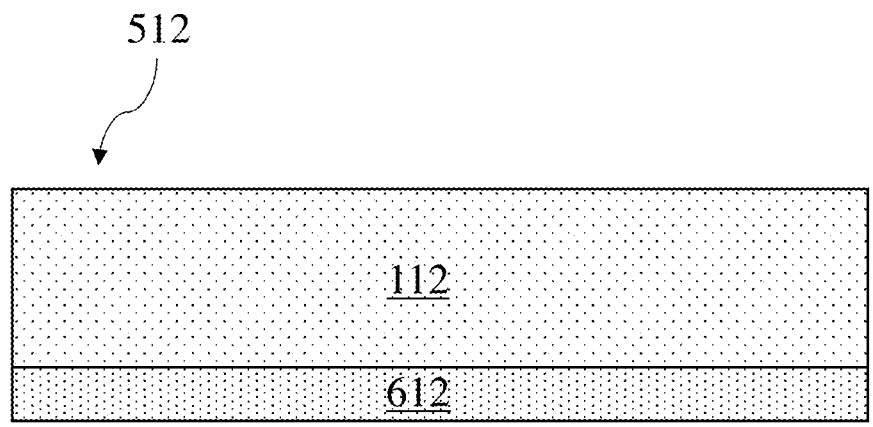
FIG. 7 shows one non-limiting embodiment of a supercapacitor electrode comprising a metal-organic framework, in accordance with some embodiments.
Figure 8:
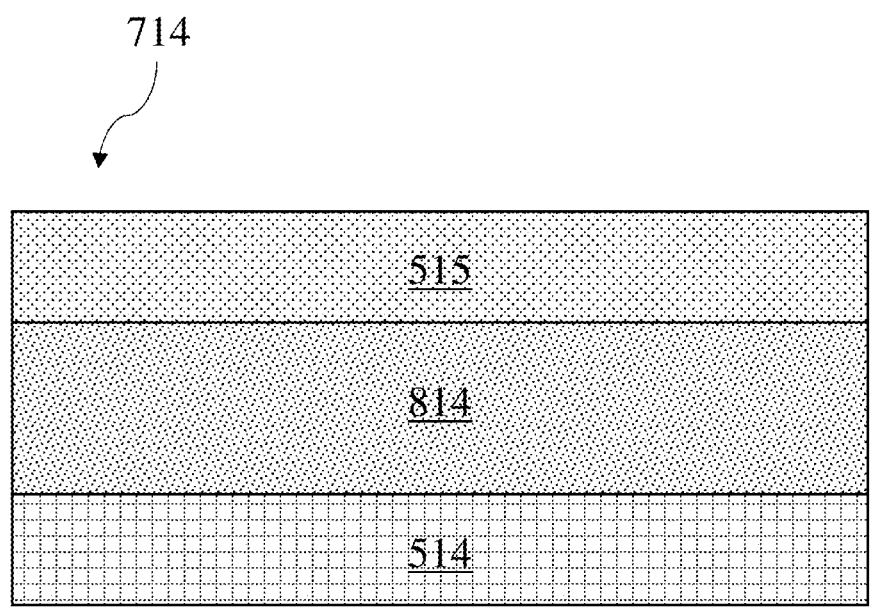
FIG. 8 shows one non-limiting embodiment of a supercapacitor comprising an electrode comprising a metal-organic framework, in accordance with some embodiments.

As described elsewhere herein, some embodiments relate to supercapacitor electrodes comprising metal-organic frameworks and/or to supercapacitors comprising such electrodes. FIG. 7 shows one non-limiting embodiment of a supercapacitor electrode 512 comprising a metal-organic framework 112. As shown in FIG. 7, some supercapacitor electrodes may comprise current collectors (shown as a current collector 612 in FIG. 7). Other supercapacitors may lack current collectors and/or comprise one or more further components not shown in FIG. 7. FIG. 8 shows one non-limiting embodiment of a supercapacitor comprising an electrode comprising a metal-organic framework. In FIG. 8, a supercapacitor 714 comprises a first electrode 514 comprising a metal-organic framework, a second electrode 515, and an electrolyte 814. It should be understood that the supercapacitors described herein may further comprise other components not shown in FIG. 8 (e.g., a separator, a housing, external circuitry, etc.).

Some supercapacitors described herein may be pseudocapacitors. Such capacitors may comprise two electrodes that each undergo faradaic charge transfer during charging and discharging. The faradaic charge transfer may comprise an intercalation or deintercalation process (and/or an absorption or desorption process) upon discharging and the other of the intercalation and deintercalation process (and/or absorption or desorption process) upon charging. In other words, a pseudocapacitor may comprise one electrode from which ions deintercalate (and/or desorb) upon discharging and into which ions intercalate (and/or absorb) upon charging and another electrode into which ions intercalate (and/or absorb) upon discharging and from which ions deintercalate (and/or desorb) upon charging. Either or both of such processes may further comprise redox reactions within the electrodes. Such processes may also comprise the dissolution of an electrical double layer during discharging and/or the formation of an electrical double layer during charging. In some pseudocapacitors, one or both of the electrodes may comprise a metal-organic framework described herein. The ions may intercalate into and/or deintercalate from (and/or absorb into and/or desorb from) the metal-organic framework(s).

Some supercapacitors described herein may be hybrid capacitors. Such capacitors may comprise one electrode that undergoes faradaic processes (e.g., an intercalation or deintercalation process, an absorption or desorption process, a redox reaction) upon discharging and charging. This electrode may also exhibit double-layer capacitance as described above with respect to pseudocapacitors. The other electrode may not undergo faradaic processes during charging and discharging (e.g., it may solely exhibit double-layer capacitance). In such supercapacitors, the electrode that undergoes faradaic processes may comprise a metal-organic framework and the other electrode may comprise a material other than a metal-organic framework.

As described above, in some embodiments, a charging or discharging process comprises intercalating a plurality of ions into a metal-organic framework. This may occur during use of a supercapacitor comprising the metal-organic framework for power delivery and/or may occur as a prior, conditioning process. For instance, some embodiments may comprise a conditioning process in which a plurality of ions are intercalated into a metal-organic framework to condition it in a manner that promotes intercalation of further ions thereinto (e.g., ions of a different type) during a further process. By way of example, a process may comprise intercalating a plurality of relatively large ions into a metal-organic framework in a manner that increases the spacing between two-dimensional sheets therein. Such ions may then be deintercalated from the metal-organic framework, after which the metal-organic framework may be permanently expanded. Subsequent processes may comprise intercalating further ions into the metal-organic framework (e.g., ions having a size of greater than the spacing between the two-dimensional sheets prior to intercalation of the first plurality of ions thereinto and less than the spacing between the two-dimensional sheets after deintercalation of the first plurality of ions therefrom).

In some embodiments, the plurality of relatively large ions has a charge opposite to the plurality of ions subsequently intercalated into the metal-organic framework. A process for conditioning a metal-organic framework in the presence of these ions may comprise first charging the metal-organic framework (e.g., positively) to have a first charge and then charging the metal-organic framework to have a second, opposite charge (e.g., negatively). When the metal-organic framework is charged to have the second, opposite charge the plurality of relatively large ions may deintercalate therefrom and the second plurality of ions may intercalate therein.

The metal-organic frameworks described herein may comprise a plurality of metal ions coordinated with a plurality of ligands. The term "metal-organic framework" is given its ordinary meaning in the art and refers to a one-, two-, or three-dimensional coordination polymer including metal ions and ligands which function as organic structural units, wherein a portion of the metal ions are each chemically bonded to at least one ligand (e.g., a bi-, tri-, and/or poly-dentate ligand). The metal ions, in addition to being coordinated with at least one organic structural unit, may also be coordinated with one or more auxiliary ligands, as described in more detail herein.

The metal-organic frameworks described herein may have a variety of suitable geometries. In some embodiments, a metal-organic framework comprises a plurality of metal ions, at least a portion of which is coordinated with one or more ligands. For instance, in some embodiments, a metal-organic framework comprises a plurality of metal ions and at least a portion of the metal-ions are associated with two, three, or four ligands. The metal-organic framework may further comprise a plurality of ligands, at least a portion of which are coordinated with one or more metal ions. By way of example, at least a portion of the ligands in a metal-organic framework (e.g., at least a portion of and/or each non-auxiliary ligand in a metal-organic framework) may be coordinated with two or more metal ions. In some embodiments, a metal-organic framework comprises a plurality of ligands, at least a portion of which are coordinated with three or four metal ions. The following are further non-limiting examples of morphologies that metal ions and ligands in the metal-organic frameworks described herein may have: at least a portion of the metal ions coordinated with at least two ligands and at least a portion of the ligands coordinated with two metal ions, at least a portion of the metal ions coordinated with three ligands and at least a portion of the ligands coordinated with three metal ions, at least a portion of the metal ions coordinated with two ligands and each ligand coordinated with three metal ions.

The charges of the metal ions and ligands suitable for use in the metal-organic frameworks described herein may generally be selected as desired. For instance, a metal-organic framework may comprise ligands having charges of (−1), (−2), (−3), (−4), (−5), and/or (−6). As another example, a metal-organic framework may comprise metal ions having charges of (+1), (+2), and/or (+3). For metal-organic frameworks that are uncharged, the charge of each ligand is typically balanced by the charge(s) of the metal ion(s) coordinated thereby and any ions absorbed and/or intercalated into the metal-organic framework.

It should be understood that the metal-organic frameworks described herein may comprise two or more types of ligands and/or two or more types of ions. When two or more types of ligands are provided, the relative amounts of each type of ligand may be selected as desired. Similarly, when two or more types of metal ions are provided, the relative amounts of each type of metal ion may be selected as desired. It should also be understood that some metal-organic frameworks described herein comprise a single type of ligand and/or a single type of metal ion.

Ligands comprising a variety of suitable functional groups that coordinate metal ions may be employed in the metal-organic frameworks described herein. Some metal-organic frameworks may comprise polydentate (e.g., bidentate) ligands. Such ligands may coordinate two or more metal ions and coordinate each metal ion in a polydentate manner. By way of example, a ligand coordinating two metal ions, each in a bidentate manner, may comprise two sets of two functional groups, each set of two functional groups coordinating a metal ion. As another example, a ligand coordinating three metal ions, each in a bidentate manner, may comprise three sets of two functional groups, each set of two functional groups coordinating a metal ion. As a third example, a ligand coordinating four metal ions, each in a bidentate manner, may comprise four sets of two functional groups, each set of two functional groups coordinating a metal ion.

Functional groups coordinating metal ions in a polydentate manner may take a variety of suitable forms. In some embodiments, polydentate coordination is achieved via vicinal functional groups (e.g., ortho functional groups). In other words, when a ligand is polydentate, the combination of functional groups configured to coordinate a single metal ion may be vicinal (e.g., ortho). In some embodiments, polydentate coordination is achieved via functional groups other than vicinal functional groups (e.g., ortho functional groups, para functional groups. As above, this means that the combination of functional groups configured to coordinate a single metal ion may be other than vicinal (e.g., meta, para).

In some embodiments, a ligand is coordinated with a single metal ion by a single type of functional group. For instance, a ligand may coordinate a single metal ion by two or more identical functional groups. In some such embodiments, all of the metal ions coordinated by a ligand are coordinated by a single type of functional group therein.

In other embodiments, a ligand is coordinated with a single metal ion by two or more types of functional groups. For instance, a metal ion may be coordinated by a plurality of ligands having ortho functional groups and may also be coordinated by a plurality of ligands having para and/or meta functional groups. In some embodiments, a first plurality of ligands comprising ortho functional groups may coordinate a plurality of metal ions via the ortho functional groups to form a two-dimensional sheet and a second plurality of ligands comprising para and/or meta functional groups may coordinate the plurality of metal ions via the para and/or meta functional groups to form pillars joining the two-dimensional sheets together.

It should also be understood that some embodiments may relate to metal-organic frameworks in which a plurality of ligands comprises ligands comprising two or more types of functional groups and/or in which a plurality of metal ions comprises metal ions coordinated by two or more types of functional groups.

Some metal-organic frameworks described herein may coordinate metal ions via functional groups that are particularly advantageous. For instance, in some embodiments, a metal-organic framework coordinates metal ions by functional groups comprising sulfur donor atoms (e.g., vicinal thiolate functional groups, ortho thiolate functional groups, thiolene functional groups). As another example, in some embodiments, a metal-organic framework coordinates metal ions by imine functional groups (e.g., vicinal imine functional groups, ortho imine functional groups).

The organic cores of the ligands described herein may also have a variety of suitable structures. In some embodiments, a metal-organic framework comprises ligands having electrically conductive organic cores. Such organic cores may comprise conjugated double bonds and/or aromatic moieties. For instance, in some embodiments, a metal-organic framework comprises ligands comprising fused aryl and/or heteroaryl rings. Such ligands may have an organic core having a rigid structure formed from fused aryl and/or heteroaryl rings. Non-limiting examples of suitable aryl and heteroaryl rings include benzyl rings, thiophenyl rings, carbazolyl rings, pyrrolyl rings, indolyl rings, and furanyl rings.

One example of a suitable structure for a ligand is:

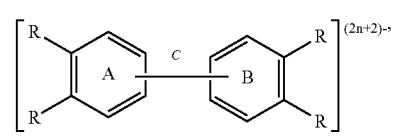

wherein n is 1, 2, or 3, C represent one or more bonds formed between ring A and each ring B, and R is a functional group coordinated with a metal ion. In some embodiments, each R is —S. In some embodiments, each R is —NH. In some cases, n is 1. In some cases, n is 2. In some cases, n is 3.

Further examples of suitable structures for ligands include:

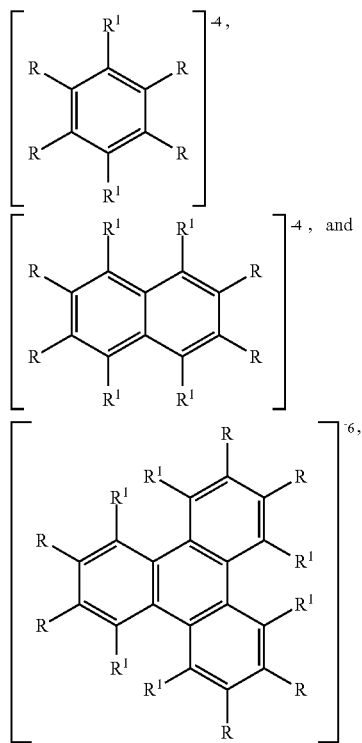

wherein each $R^1$ is the same or different and is selected from the group consisting of hydrogen, —NO$_2$, —R', —F, —Cl, —Br, —I, —CN, —NC, —SO$_3$R', —SO$_3$H, —OR', —OH, —SR', —SH, —PO$_3$R', —PO$_3$H, —CF$_3$, —NR'$_2$, —NHR', and —NH$_2$; wherein each R' is the same or different and is optionally substituted alkyl or optionally substituted aryl; and wherein each R is a functional group coordinating a metal ion. In some embodiments, both the R groups and at least a portion (or all) of the R' groups are functional groups that coordinate metal ions. In some embodiments, each R is —S. In some embodiments, each R is —NH. In some embodiments, each $R^1$ is hydrogen. In some embodiments, each R' is H.

Even further examples of suitable structures for ligands include:

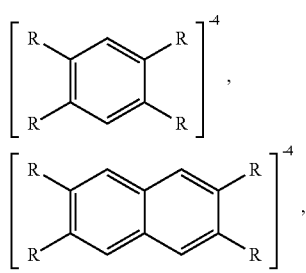

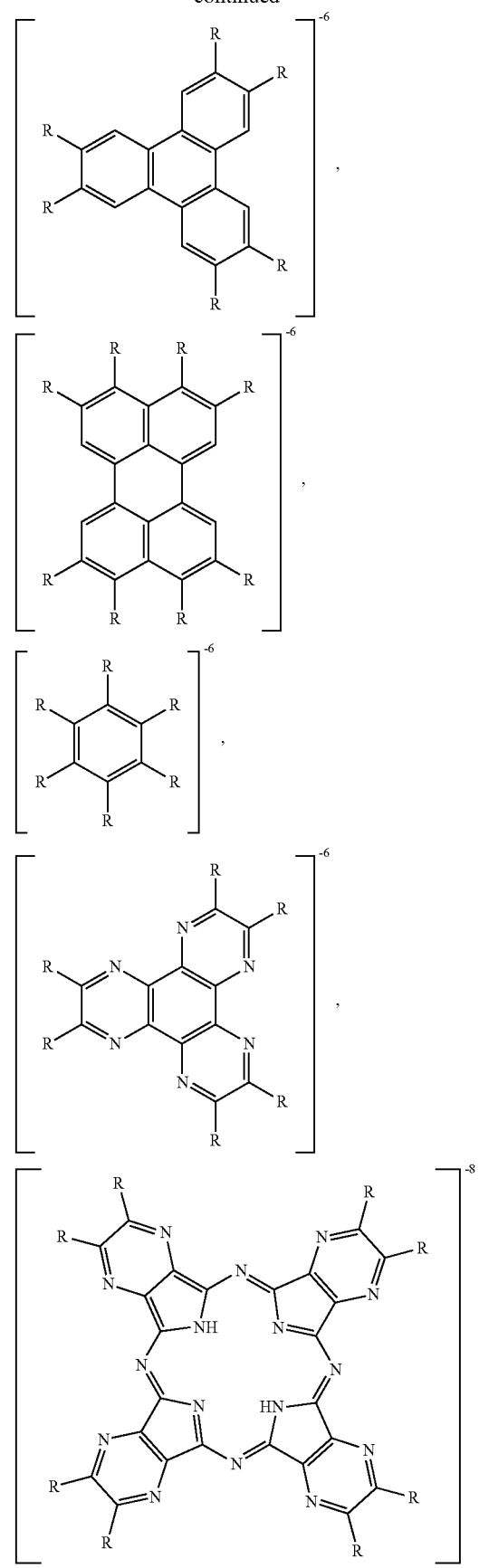

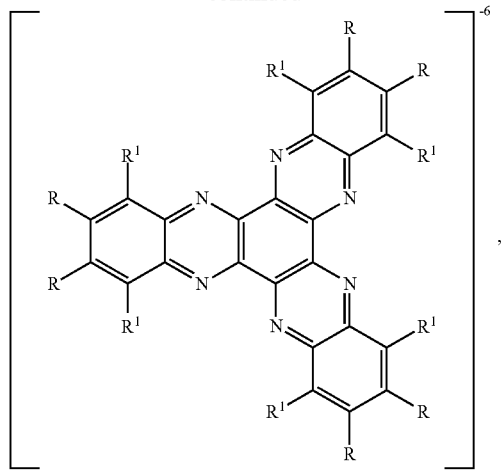

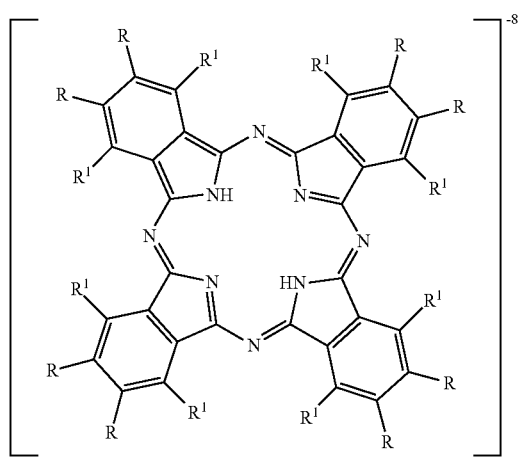

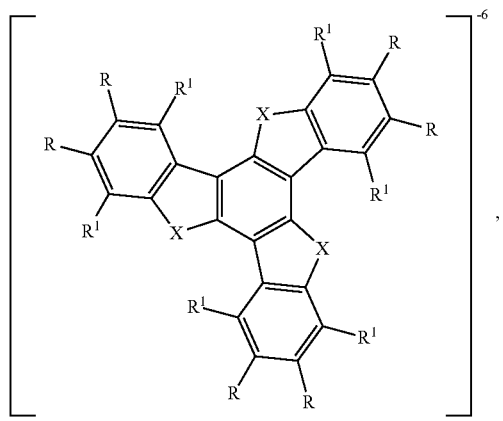

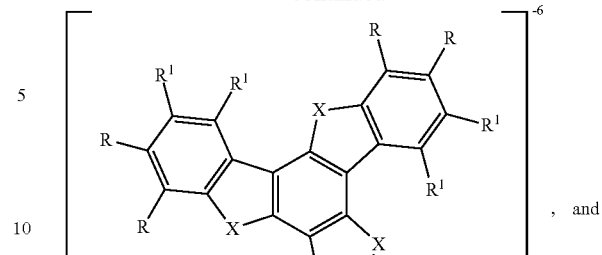

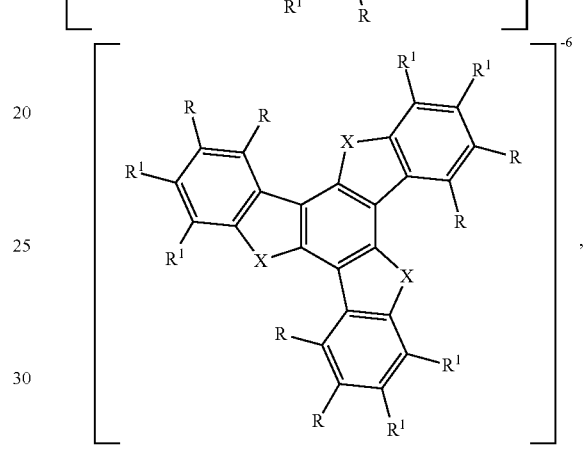

wherein each R' is the same or different and is selected from the group consisting of hydrogen, —NO₂, —R', —F, —Cl, —Br, —I, —CN, —NC, —SO₃R', —SO₃H, —OR', —OH, —SR', —SH, —PO₃R', —PO₃H, —CF₃, —NR'₂, —NHR', and —NH₂; wherein each X is the same or different and is selected from the group consisting of NR', O, S, Se, and Te; wherein each R' is the same or different and is optionally substituted alkyl or optionally substituted aryl; and wherein each R is a functional group coordinating a metal ion. In some embodiments, each R is —S. In some embodiments, each R is —NH. In some embodiments, both the R groups and at least a portion (or all) of the R' groups are functional groups that coordinate metal ions. In some embodiments, each R¹ is hydrogen. In some embodiments, each X is the same or different and is selected from the group consisting of NR', O, and S. In some embodiments, each X is NR'. In some embodiments, each X is O. In some embodiments, each X is S. In some embodiments, each X is Se. In some embodiments, each X is Te. In some embodiments, each R' is H.

As described elsewhere herein, the metal ions included in the metal-organic frameworks described herein may be monovalent, divalent, and/or trivalent. Such metal ions may be transition metal ions, noble metal ions, and/or post-transition metal ions. In some embodiments, each metal ion is a monovalent metal ion. Non-limiting examples of monovalent metal ions are Ag⁺, Cu⁺, and Au⁺. In some cases, the metal-organic framework comprises Cu⁺ (e.g., as the only type of metal ion, as one of two or more types of metal ions). In some embodiments, each metal ion is a divalent metal ion. Non-limiting examples of divalent metal ions are Mg²⁺, Mn²⁺, Fe²⁺, Co²⁺, Ni²⁺, Cu²⁺, Pd²⁺, Pt²⁺, Ru²⁺, Cd²⁺, Zn²⁺, Pb²⁺, Hg²⁺, V²⁺, Cr²⁺, and Ni²⁺. In some cases, the metal ion is (e.g., as the only type of metal ion, as one of two or more types of metal ions). In some cases, the metal ion is $Cu^{2+}$ (e.g., as the only type of metal ion, as one of two or more types of metal ions). In some embodiments, each metal ion is a trivalent metal ion. Non-limiting examples of trivalent metal ions are $Fe^{3+}$, $V^{3+}$, $Sc^{3+}$, $Al^{3+}$, $In^{3+}$, $Ga^{3+}$, $Mn^{3+}$, $Co^{3+}$, and $Cr^{3+}$. In some embodiments, a metal-organic framework comprises nickel ions, cobalt ions, iron ions, copper ions, platinum ions, and/or palladium ions (e.g., in a monovalent form, divalent form, and/or trivalent form).

As also described elsewhere herein, some metal-organic frameworks comprise metal ions that have a redox potential suitable for undergoing an oxidation reaction during charging and/or discharging (e.g., when in a supercapacitor). For instance, a metal-organic framework may comprise a plurality of ions having a redox potential of greater than or equal to −3 V, greater than or equal to −2.75 V, greater than or equal to −2.5 V, greater than or equal to −2.25 V, greater than or equal to −2 V, greater than or equal to −1.75 V, greater than or equal to −1.5 V, greater than or equal to −1.25 V, greater than or equal to −1 V, greater than or equal to −0.75 V, greater than or equal to −0.5 V, greater than or equal to −0.25 V, greater than or equal to 0 V, greater than or equal to 0.25 V, greater than or equal to 0.5 V, greater than or equal to 0.75 V, greater than or equal to 1 V, greater than or equal to 1.25 V, greater than or equal to 1.5 V, greater than or equal to 1.75 V, greater than or equal to 2 V, greater than or equal to 2.25 V, greater than or equal to 2.5 V, or greater than or equal to 2.75 V with respect to a Standard Hydrogen Electrode. In some embodiments, a metal-organic framework comprises a plurality of ions having a redox potential of less than or equal to 3 V, less than or equal to 2.75 V, less than or equal to 2.5 V, less than or equal to 2.25 V, less than or equal to 2 V, less than or equal to 1.75 V, less than or equal to 1.5 V, less than or equal to 1.25 V, less than or equal to 1 V, less than or equal to 0.75 V, less than or equal to 0.5 V, less than or equal to 0.25 V, less than or equal to 0 V, less than or equal to −0.25 V, less than or equal to −0.5 V, less than or equal to −0.75 V, less than or equal to −1 V, less than or equal to −1.25 V, less than or equal to −1.5 V, less than or equal to −1.75 V, less than or equal to −2 V, less than or equal to −2.25 V, less than or equal to −2.5 V, or less than or equal to −2.75 V with respect to a Standard Hydrogen Electrode. Combinations of the above-referenced ranges are also possible (e.g., greater than or equal to −3 V and less than or equal to 3 V, greater than or equal to −3 V and less than or equal to 2 V). Other ranges are also possible.

The redox potential of metal ions in a metal-organic framework may be determined by cyclic voltammetry to determine the redox potential of the metal-organic framework and X-ray adsorption spectroscopy to confirm that the redox potential is that of the metal ions.

In some embodiments, more than one type of metal ion may be employed, for example, a first type of metal ion and a second type of metal ion. The differences between the types of metal ions may relate to the element forming the metal ion and/or to the valency of the metal ion. For instance, some metal-organic frameworks may comprise two or more types of metal ions with different valencies. Such types of metal ions may include the same type of metal but in different redox states (e.g., $Cu^+$ and $Cu^{2+}$) or may include different types of metals in different redox states (e.g., $Cu^+$ and $Ni^{2+}$). As another example, two different types of metal ions may include different types of metals in the same redox state (e.g., $Cu^{2+}$ and $Ni^{2+}$). It should also be understood that some metal-organic frameworks may comprise metal ions only having a single valency and/or of only a single type of metal.

When a metal-organic framework may comprise two or more types of metal ions having different valencies, the combination of metal ion types and relative amounts of the metal ion types may generally be selected as desired. In some embodiments, the metal-organic framework comprises one or more monovalent metal ions and one or more divalent metal ions. In some such embodiments, the metal-organic framework may comprise one or more ligands that are redox active and/or able to accommodate the different redox states of the metal ions.

In some embodiments, a metal-organic framework comprises a plurality of auxiliary ligands. In such cases, at least a portion of the plurality of metal ions therein may be associated with one or more auxiliary ligands. Auxiliary ligands may be positioned above and/or below the metal ions with which they are associated (e.g., as apical ligands). Some suitable auxiliary ligands may be charged and other auxiliary ligands may be uncharged. Non-limiting examples of auxiliary ligands include halides (e.g., chlorine, fluorine, bromine, iodine), salts (e.g., nitrate, carbonate, sulfonate, etc.), and coordinating solvents (e.g., water, pyridine, tetrahydrofuran, diethyl ether, etc.).

Two examples of metal-organic frameworks believed to be particularly suitable for use as supercapacitor electrodes are shown below:

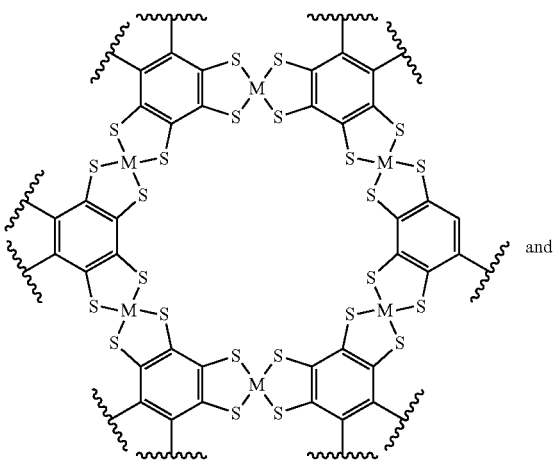

and

-continued

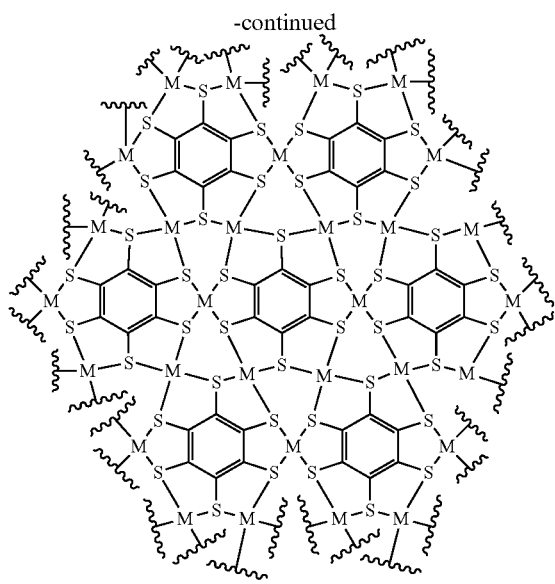

where M is a metal ion. For instance, M may be a transition metal ion, such as an iron ion, a cobalt ion, a nickel ion, and/or a copper ion.

In some embodiments, the metal-organic frameworks described herein comprise few or no excess metal ions. That is, the metal-organic frameworks may comprise essentially no metal ions which are not coordinated with a ligand (and/or not coordinated with a ligand by a functional group configured to coordinate metal ions). Such uncoordinated metal ions are also referred to elsewhere herein as "free metal ions". In some embodiments, a metal-organic framework comprises less than or equal to 0.5 wt %, less than or equal to 0.4 wt %, less than or equal to 0.3 wt %, less than or equal to 0.2 wt %, less than or equal to 0.1 wt %, less than or equal to 0.05 wt %, less than or equal to 0.03 wt %, less than or equal to 0.02 wt %, less than or equal to 0.01 wt %, less than or equal to 0.005 wt %, or less than or equal to 0.001 wt % of free metal ions.

The wt % of free metal ions in a metal-organic framework may be determined by X-ray photoelectron spectroscopy.

In some embodiments, a supercapacitor comprises two electrodes, each comprising one of the metal-organic frameworks shown above (e.g., a cathode comprising one of the metal-organic frameworks shown above, an anode comprising another of the metal-organic frameworks shown above). One of the electrodes may comprise a metal-organic framework in which the metal ions are coordinated with ligands comprising functional groups comprising sulfur donor atoms by the sulfur donor atoms and one of the electrodes may comprise a metal-organic framework in which the metal ions are coordinated with ligands comprising imine functional groups by the imine functional groups.

As described above, in some embodiments, a metal-organic framework described herein has one or more physical properties that enhance its suitability for use in a supercapacitor electrode.

By way of example, a metal-organic framework may comprises a plurality of pores. The plurality of pores may have an advantageous average pore size. For instance, the plurality of pores may have an average pore size of greater than or equal to 0.3 nm, greater than or equal to 0.5 nm, greater than or equal to 0.75 nm, greater than or equal to 1 nm, greater than or equal to 1.25 nm, greater than or equal to 1.5 nm, greater than or equal to 1.75 nm, greater than or equal to 2 nm, greater than or equal to 2.25 nm, greater than or equal to 2.5 nm, or greater than or equal to 2.75 nm. In some embodiments, the plurality of pores has an average pore size of less than or equal to 3 nm, less than or equal to 2.75 nm, less than or equal to 2.5 nm, less than or equal to 2.25 nm, less than or equal to 2 nm, less than or equal to 1.75 nm, less than or equal to 1.5 nm, less than or equal to 1.25 nm, less than or equal to 1 nm, less than or equal to 0.75 nm, or less than or equal to 0.5 nm. Combinations of the above-referenced ranges are also possible (e.g., greater than or equal to 0.3 nm and less than or equal to 3 nm). Other ranges are also possible.

The average pore size of a plurality of pores positioned in an ordered manner may be determined by X-ray crystallography (e.g., pores positioned in a manner that forms a lattice, pores forming a repeating structure in a two-dimensional sheet). The average pore size of a plurality of pores positioned in a disordered and/or random manner may be determined by a Brunauer-Emmett-Teller (BET) adsorption measurement.

When a metal-organic framework comprises a plurality of pores, the plurality of pores may comprise pores having a variety of suitable shapes. For instance, a metal-organic framework may comprise a two-dimensional sheet comprising pores that are circular, triangular, oval, square, pentagonal, hexagonal, and/or any other appropriate shape. As another example, a metal-organic framework may comprise three-dimensional pores having a shape that are spherical, ovoid, cylindrical, and/or any other appropriate shape. In some embodiments, a metal-organic framework comprises pores that have a shape close, but not identical, to one of the above-referenced shapes. For instance, a metal-organic framework may comprise pores for which one of the above-referenced shapes can be drawn that overlaps at least 80%, at least 90%, at least 95%, at least 97%, or at least 99% of the area thereof and/or for which at least 80%, at least 90%, at least 95%, at least 97%, or at least 99% of its area overlaps that of one of the above-referenced shapes.

When a metal-organic framework comprises a plurality of pores, the plurality of pores may comprise pores bordered by a variety of suitable numbers of metal ions. For instance, in some embodiments, a plurality of pores comprises pores bordered by greater than or equal to 3 metal ions, greater than or equal to 4 metal ions, or greater than or equal to 5 metal ions. In some embodiments, a plurality of pores comprises pores bordered by less than or equal to 6 metal ions, less than or equal to 5 metal ions, or less than or equal to 4 metal ions. Combinations of the above-referenced ranges are also possible (e.g., greater than or equal to 3 and less than or equal to 6). Other ranges are also possible.

When a metal-organic framework comprises a plurality of pores, the plurality of pores may comprise pores bordered by a variety of suitable numbers of donor atoms (e.g., sulfur atoms). For instance, in some embodiments, a plurality of pores comprises pores bordered by greater than or equal to 3 donor atoms, greater than or equal to 4 donor atoms, greater than or equal to 5 donor atoms, greater than or equal to 6 donor atoms, greater than or equal to 7 donor atoms, greater than or equal to 8 donor atoms, greater than or equal to 9 donor atoms, greater than or equal to 10 donor atoms, or greater than or equal to 11 donor atoms. In some embodiments, a plurality of pores comprises pores bordered by less than or equal to 12 donor atoms, less than or equal to 10 donor atoms, less than or equal to 9 donor atoms, less than or equal to 8 donor atoms, less than or equal to 7 donor atoms, less than or equal to 6 donor atoms, less than or equal to 5 donor atoms, or less than or equal to 4 donor atoms. Combinations of the above-referenced ranges are also possible (e.g., greater than or equal to 3 and less than or equal to 12). Other ranges are also possible.

As another example of a property that may enhance its suitability for use in a supercapacitor electrode, a metal-organic framework may comprise two-dimensional sheets having one or more desirable structural features. For instance, a metal-organic framework may comprise two-dimensional sheets having an average spacing that is desirable. In some embodiments, a metal-organic framework comprises two-dimensional sheets spaced from each other at an average spacing of greater than or equal to 0.3 nm, greater than or equal to 0.4 nm, or greater than or equal to 0.5 nm, greater than or equal to 0.6 nm, greater than or equal to 0.7 nm, greater than or equal to 0.8 nm, or greater than or equal to 0.9 nm. In some embodiments, a metal-organic framework comprises two-dimensional sheets spaced from each other at an average spacing of less than or equal to 1 nm, less than or equal to 0.9 nm, less than or equal to 0.8 nm, less than or equal to 0.7 nm, less than or equal to 0.6 nm, less than or equal to 0.5 nm, or less than or equal to 0.4 nm. Combinations of the above-referenced ranges are also possible (e.g., greater than or equal to 0.3 nm and less than or equal to 1 nm). Other ranges are also possible.

The average spacing between two-dimensional sheets may be determined by X-ray crystallography.

When a metal-organic framework comprises two-dimensional sheets, they may be positioned with respect to each other in a variety of suitable manners. For instance, some metal-organic frameworks may comprise two-dimensional sheets that are positioned with respect to each other in an eclipsed manner. Such metal-organic frameworks may comprise two-dimensional sheets that have AA-type stacking. In some embodiments, a metal-organic framework comprises two-dimensional sheets that are positioned with respect to each other in a staggered manner. Such metal-organic frameworks may comprise two-dimensional sheets that have AB-type stacking and/or two-dimensional sheets which are maximally offset from each other (e.g., one half of the repeat distance of a motif therein). Other positionings of two-dimensional sheets are also possible. For instance, a metal-organic framework may comprise two-dimensional sheets that are positioned with respect to each other in a manner in between eclipsed and staggered and/or may comprise two-dimensional sheets that have ABC-type or other type stacking.

As a third example of a property that may enhance its suitability for use in a supercapacitor electrode, a metal-organic framework may have a redox potential that facilitates a redox reaction during charging and/or discharging. For instance, a metal-organic framework may have a redox potential of greater than or equal to $-3$ V, greater than or equal to $-2.7$ V, greater than or equal to $-2.5$ V, greater than or equal to $-2.3$ V, greater than or equal to $-2$ V, greater than or equal to $-1.7$ V, greater than or equal to $-1.5$ V, greater than or equal to $-1.3$ V, greater than or equal to $-1$ V, greater than or equal to $-0.7$ V, greater than or equal to $-0.5$ V, greater than or equal to $-0.3$ V, greater than or equal to 0 V, greater than or equal to 0.2 V, greater than or equal to 0.5 V, greater than or equal to 0.7 V, greater than or equal to 1 V, greater than or equal to 1.3 V, greater than or equal to 1.5 V, greater than or equal to 1.7 V, greater than or equal to 2 V, greater than or equal to 2.3 V, greater than or equal to 2.5 V, or greater than or equal to 2.7 V with respect to a Standard Hydrogen Electrode. In some embodiments, a metal-organic framework has a redox potential of less than or equal to 3 V, less than or equal to 2.7 V, less than or equal to 2.5 V, less than or equal to 2.3 V, less than or equal to 2 V, less than or equal to 1.7 V, less than or equal to 1.5 V, less than or equal to 1.3 V, less than or equal to 1 V, less than or equal to 0.7 V, less than or equal to 0.5 V, less than or equal to 0.2 V, less than or equal to 0 V, less than or equal to $-0.3$ V, less than or equal to $-0.5$ V, less than or equal to $-0.7$ V, less than or equal to $-1$ V, less than or equal to $-1.3$ V, less than or equal to $-1.5$ V, less than or equal to $-1.7$ V, less than or equal to $-2$ V, less than or equal to $-2.3$ V, less than or equal to $-2.5$ V, or less than or equal to $-2.7$ V with respect to a Standard Hydrogen Electrode. Combinations of the above-referenced ranges are also possible (e.g., greater than or equal to $-3$ V and less than or equal to 3 V, greater than or equal to $-2.7$ V and less than or equal to 1.3 V, greater than or equal to $-2.7$ V and less than or equal to 0.2 V, or greater than or equal to $-2$ V and less than or equal to 1.3 V). Other ranges are also possible. In some embodiments, a supercapacitor may comprise two metal-organic frameworks, each having a redox potential in one or more of the ranges listed above (e.g., one metal-organic framework having a redox potential of greater than or equal to $-2.7$ V and less than or equal to 0.2 V and another metal-organic framework having a redox potential of greater than or equal to $-2$ V and less than or equal to 1.3 V).

The redox potential of a metal-organic framework may be determined by cyclic voltammetry.

As a fourth example of a property that may enhance its suitability for use in a supercapacitor electrode, a metal-organic framework may have an advantageously high electrical conductivity. In some embodiments, a metal-organic framework described herein has an electrical conductivity of greater than or equal to 1 S/cm, greater than or equal to 2 S/cm, greater than or equal to 5 S/cm, greater than or equal to 7 S/cm, greater than or equal to 10 S/cm, greater than or equal to 15 S/cm, greater than or equal to 20 S/cm, greater than or equal to 25 S/cm, greater than or equal to 30 S/cm, greater than or equal to 35 S/cm, greater than or equal to 40 S/cm, greater than or equal to 50 S/cm, greater than or equal to 60 S/cm, greater than or equal to 70 S/cm, greater than or equal to 80 S/cm, greater than or equal to 90 S/cm, greater than or equal to 100 S/cm, greater than or equal to 150 S/cm, greater than or equal to 200 S/cm, greater than or equal to 500 S/cm, greater than or equal to 750 S/cm, greater than or equal to 1000 S/cm, or greater than or equal to 1500 S/cm. A metal-organic framework may have an electrical conductivity of less than or equal to 2000 S/cm, less than or equal to 1500 S/cm, less than or equal to 1000 S/cm, less than or equal to 750 S/cm, less than or equal to 500 S/cm, less than or equal to 200 S/cm, less than or equal to 150 S/cm, 100 S/cm, less than or equal to 90 S/cm, less than or equal to 80 S/cm, less than or equal to 70 S/cm, less than or equal to 60 S/cm, less than or equal to 50 S/cm, less than or equal to 40 S/cm, less than or equal to 35 S/cm, less than or equal to 30 S/cm, less than or equal to 25 S/cm, less than or equal to 20 S/cm, less than or equal to 15 S/cm, less than or equal to 10 S/cm, less than or equal to 7 S/cm, less than or equal to 5 S/cm, or less than or equal to 2 S/cm. Combinations of the above-referenced ranges are also possible (e.g., greater than or equal to 1 S/cm and less than or equal to 2000 S/cm, or greater than or equal to 1 S/cm and less than or equal to 100 S/cm). Other ranges are also possible.

The electrical conductivity of a metal-organic framework may be determined by performing two-probe direct current measurement at 25° C. on a 500 nm thick film of the metal-organic framework.

As a fifth example of a property that may enhance its suitability for use in a supercapacitor electrode, a metal-organic framework may have an advantageously high charge mobility. The charge mobility of the metal-organic framework may be greater than or equal to 0.1 cm²/(V*s), greater than or equal to 0.5 cm²/(V*s), greater than or equal to 1 cm²/(V*s), greater than or equal to 2 cm²/(V*s), greater than or equal to 3 cm²/(V*s), greater than or equal to 4 cm²/(V*s), greater than or equal to 5 cm²/(V*s), greater than or equal to 7.5 cm²/(V*s), greater than or equal to 10 cm²/(V*s), greater than or equal to 20 cm²/(V*s), greater than or equal to 30 cm²/(V*s), greater than or equal to 40 cm²/(V*s), greater than or equal to 50 cm²/(V*s), greater than or equal to 75 cm²/(V*s), greater than or equal to 100 cm²/(V*s), greater than or equal to 250 cm²/(V*s), greater than or equal to 500 cm²/(V*s) cm²/(V*s), or greater than or equal to 750 cm²/(V*s). In some embodiments, a metal-organic framework has a charge mobility of less than or equal to 1000 cm²/(V*s), less than or equal to 750 cm²/(V*s), less than or equal to 500 cm²/(V*s), less than or equal to 250 cm²/(V*s), less than or equal to 100 cm²/(V*s), less than or equal to 75 cm²/(V*s), less than or equal to 50 cm²/(V*s), less than or equal to 40 cm²/(V*s), less than or equal to 30 cm²/(V*s), less than or equal to 20 cm²/(V*s), less than or equal to 10 cm²/(V*s), less than or equal to 7.5 cm²/(V*s), less than or equal to 5 cm²/(V*s), less than or equal to 4 cm²/(V*s), less than or equal to 3 cm²/(V*s), less than or equal to 2 cm²/(V*s), less than or equal to 1 cm²/(V*s), or less than or equal to 0.5 cm²/(V*s). Combinations of the above-referenced ranges are also possible (e.g., greater than or equal to 0.1 0.5 cm²/(V*s) and less than or equal to 1000 0.5 cm²/(V*s)). Other ranges are also possible.

The charge mobility of a metal-organic framework may be determined by performing a Hall measurement on a single crystal of a metal-organic framework.

The metal-organic frameworks described herein may be synthesized by a variety of suitable methods. In some cases, a method of synthesizing a metal-organic framework comprises exposing a plurality of metal ions to a plurality of precursor ligands in the presence of an oxidant and a base to form a metal-organic framework comprising at least a portion of the plurality of metal ions each coordinated with at least a portion of the plurality of ligands. In some embodiments, the metal ion is provided as a cation of a salt, and the at least one precursor ligand provided comprises functional groups configured to react with the cation (e.g., thiol functional groups, imine functional groups). The functional groups may be polydentate (e.g., bidentate) as described above. During the course of the reaction, the functional groups of the precursor ligand configured to react with the cation are oxidized into the corresponding functional groups coordinating the metal ions in the final metal-organic framework (e.g., the final functional groups comprising sulfur donor atoms and/or imine functional groups). By way of example, with respect to precursor ligands comprising ortho-phenylenediamine groups, during the course of the reaction, the precursor ligand is oxidized so that each ortho-phenylenediamine group is transformed into an ortho-phenylenediimine group, which coordinates a metal ion.

The metal ion and the precursor ligand may be provided in any suitable amounts. In some embodiments, the mole ratio of the metal ion to the precursor ligand may be based upon the coordination of the metal ion to the ligand. For example, in embodiments where the ligand is coordinated with three metal ions, and each metal ion is associated with two ligands, the mole ratio of the metal ion to the precursor ligand may be about 3:2. As another example, in embodiments, where the ligand is coordinated with two metal ions, and each metal ion is associated with one ligand, the mole ratio of the metal ion to the precursor ligand may be about 2:1. In some embodiments, the precursor ligand is providing in slight mole excess as compared to the metal ion.

As described above, the metal ions may be provided in the form of salts. Non-limiting examples of anions that may be included in the salts include chloride, fluoride, bromide, iodide, triflate, $BF_4^-$, $PF_6^-$, $NO_3^-$, $SO_4^{2-}$, and $ClO_4^-$ salts. In some cases, the salt comprises an $SO_4^{2-}$ anion.

One example of a suitable structure for a precursor ligand is:

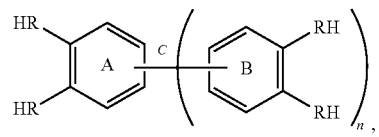

wherein n is 1, 2, or 3, C represent one or more bonds formed between ring A and each ring B, and R is a functional group configured to be coordinated with a metal ion. In some embodiments, each R is —S. In some embodiments, each R is —NH. In some cases, n is 1. In some cases, n is 2. In some cases, n is 3.

Further examples of suitable structures for precursor ligands include:

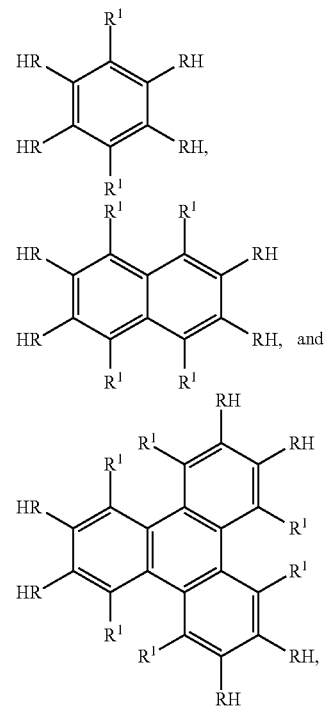

wherein each $R^1$ is the same or different and is selected from the group consisting of hydrogen, —$NO_2$, —R', —F, —Cl, —Br, —I, —CN, —NC, —$SO_3$R', —$SO_3$H, —OR', —OH, —SR', —SH, —$PO_3$R', —$PO_3$H, —$CF_3$, —$NR'_2$, —NHR', and —$NH_2$; wherein each R' is the same or different and is optionally substituted alkyl or optionally substituted aryl; and wherein each R is a functional group configured to coordinate a metal ion. In some embodiments, both the R groups and at least a portion (or all) of the R' groups are functional groups that are configured to coordinate metal ions after oxidation. In some embodiments, each R is —S. In some embodiments, each R is —NH. In some embodiments, each $R^1$ is hydrogen. In some embodiments, each R' is H.

Even further examples of suitable structures for precursor ligands include:

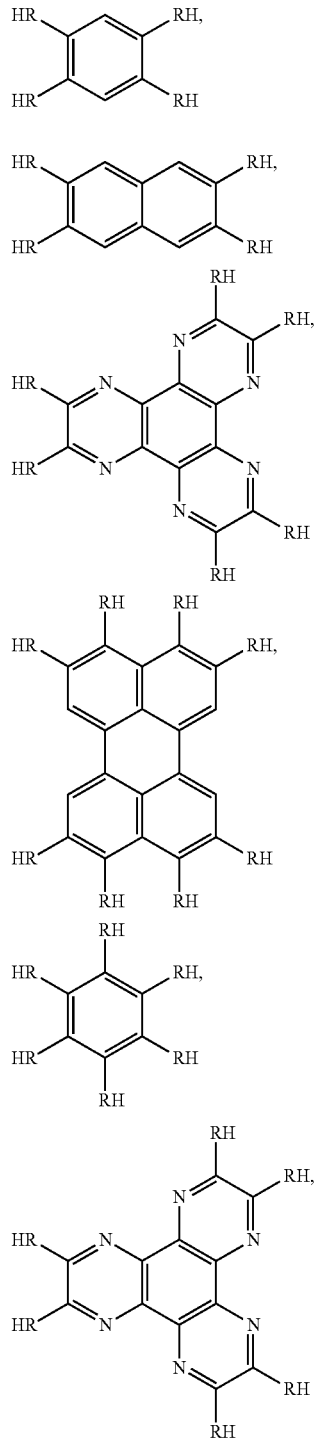

-continued

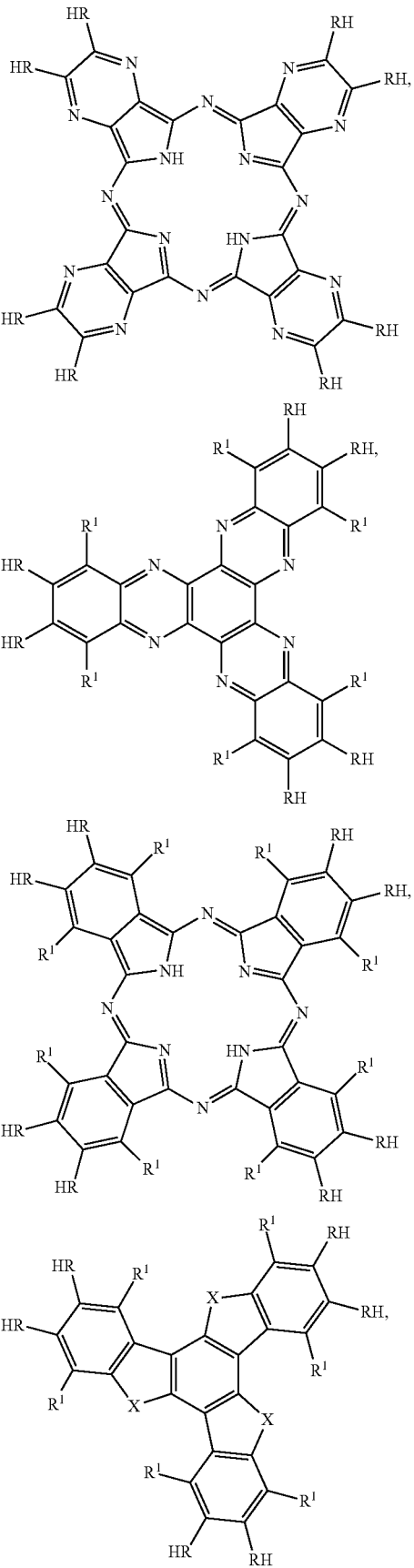

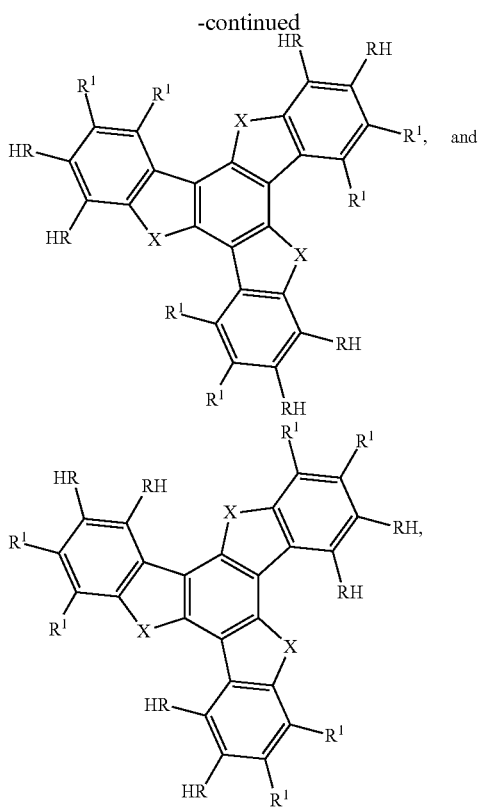

wherein each R' is the same or different and is selected from the group consisting of hydrogen, —$NO_2$, —R', —F, —Cl, —Br, —I, —CN, —NC, —$SO_3$R', —$SO_3$H, —OR', —OH, —SR', —SH, —$PO_3$R', —$PO_3$H, —$CF_3$, —$NR'_2$, —NHR', and —$NH_2$; wherein each X is the same or different and is selected from the group consisting of NR', O, S, Se, and Te; wherein each R' is the same or different and is optionally substituted alkyl or optionally substituted aryl; and wherein each R is a functional group configured to coordinate a metal ion. In some embodiments, each R is —S. In some embodiments, each R is —NH. In some embodiments, both the R groups and at least a portion (or all) of the R' groups are functional groups that are configured to coordinate metal ions after oxidation. In some embodiments, each $R^1$ is hydrogen. In some embodiments, each X is the same or different and is selected from the group consisting of NR', O, and S. In some embodiments, each X is NR'. In some embodiments, each X is O. In some embodiments, each X is S. In some embodiments, each X is Se. In some embodiments, each X is Te. In some embodiments, each R' is H.

Any suitable base may be utilized in the synthetic methods described herein. Non-limiting examples of bases include $NR''_3$ wherein each R" is the same or different and is hydrogen, optionally substituted alkyl, or optionally substituted aryl; QOH, wherein Q is a cation (e.g., a metal cation, a semi-metal cation, $NH_4^+$); and acetate. In some embodiments, the base is $NH_3$ or $NH_4OH$. In some embodiments, the base is selected to have a higher pH as compared to the groups on the precursor ligand configured to react with the metal ions to coordinate them. Any suitable oxidant may be employed. In some embodiments, the oxidant is oxygen. In some embodiments, the oxidant is a chemical oxidant. Non-limiting examples of oxidants include air, oxygen, ferricinium, nitrosonium, $Ag^{2+}$, $Ag^+$, $Fe^{3+}$, $MnO_4^-$, and $CrO_4^-$. The oxidant may be present in an amount suitable to aid in the oxidation of the precursor ligand. In some embodiments, the oxidant is present in excess.

Any suitable solvent may be utilized in the synthetic methods described herein. Non-limiting examples of solvents include water, methanol, ethanol, propanol, benzene, p-cresol, toluene, xylene, diethyl ether, glycol, diethyl ether, petroleum ether, hexane, cyclohexane, pentane, methylene chloride, chloroform, carbon tetrachloride, dioxane, tetrahydrofuran (THF), dimethyl sulfoxide, dimethylformamide, hexamethyl-phosphoric triamide, ethyl acetate, pyridine, triethylamine, picoline, and mixtures thereof. In some embodiments, the solvent is water.

The methods of synthesis described herein may be carried out at any suitable temperature. In some cases, the reaction is carried out at about room temperature (e.g., 25° C., 20° C., from 20° C. to 25° C., etc.). In some cases, however, the reaction is carried out at temperatures below or above room temperature. In some embodiments, the reaction is carried at a temperature from 25° C. to 100° C., from 35° C. to 95° C., from 45° C. to 85° C., or from 55° C. to 75° C.

Metal-organic frameworks synthesized using the methods described herein may be purified using techniques known to those of ordinary skill in the art. In some embodiments, a synthesized metal-organic framework may be washed, sometimes involving a Soxhlet extractor, boiled, and/or sonicated (e.g., to remove excess starting materials).

The synthetic methods described herein may provide for rapid synthesis of a wide range of metal-organic frameworks. The ability to synthesize metal-organic frameworks rapidly may be useful for the screening of known, as well as new metal-organic frameworks, to determine its appropriateness for use in a supercapacitor electrode.

The metal-organic frameworks described herein, in some cases, may be formed as a film on a surface of a material. The film may be formed using techniques known to those of ordinary skill in the art. For example, the film may be formed by a spin-casting method, a drop-casting method, a dip coating method, a roll coating method, a screen coating method, a spray coating method, a screen printing method, an ink-jet method, etc. In some cases, the thickness of the film may be less than or equal to 100 microns, less than or equal to 10 microns, less than or equal to 1 micron, less than or equal to 100 nm, less than or equal to 10 nm, or less than or equal to 1 nm. In some cases, the film may have a thickness greater than or equal to 1 mm. Other ranges are also possible. The thickness of the film may be measured by microscopy.

As described above, a supercapacitor described herein may comprise an electrolyte, an electrode described herein may be suitable for use with an electrolyte, and/or a metal-organic framework may be configured to interact with an electrolyte. The electrolyte is typically configured to readily allow ion transfer between the supercapacitor electrodes, to readily allow ion intercalation and/or absorption into one or more of the supercapacitor electrodes, and/or to readily form and/or dissolve an electrical double layer. However, the electrolyte is typically configured to prevent appreciable electron transfer therebetween. In other words, the electrolyte is typically ionically conductive but not electrically conductive. Without wishing to be bound by any particular theory, it is believed that liquid electrolytes may be particularly suitable for use in and/or with the supercapacitors, electrodes, and/or metal-organic frameworks described herein because they may have particularly high ionic mobilities. In some embodiments, gel electrolytes, solid electrolytes (e.g., polymeric electrolytes), and/or liquid-in-salt electrolytes may also or alternatively be suitable.

In some embodiments, an electrolyte described herein comprises a solvent. The solvent may solvate ions from a salt dissolved therein. For instance, the electrolyte may comprise water (i.e., it may be an aqueous electrolyte). In other embodiments, the electrolyte may lack water (i.e., it may be a non-aqueous electrolyte). The electrolyte may, in addition to or instead of comprising water, comprise one or more organic solvents. For instance, the electrolyte may comprise acetonitrile, propylene carbonate, ethylene carbonate, dimethylformamide, diethyl carbonate, adiponitrile, and/or dimethyl sulfoxide.

In some embodiments, an electrolyte described herein comprises one or more salts. The salt(s) may be dissolved in a solvent (e.g., one or more of the solvents described above) or may form an ionic liquid (e.g., the salt(s) may be liquid at room temperature and pressure and may be provided without a further solvent). The salt(s) may comprise one or more ions configured to intercalate and/or absorb into a metal-organic framework and/or supercapacitor electrode described herein. These ions may be intercalated into and/or out (and/or absorbed into and/or desorbed out of) of the metal-organic framework(s) and/or supercapacitor electrodes described herein during supercapacitor charging and discharging. Such salts typically also comprise counter ions to these ions (which, in some embodiments, are not configured to intercalate and/or not configured to absorb into a metal-organic framework and/or supercapacitor electrode described herein but in other embodiments may be configured to intercalate and/or absorb into the metal-organic framework and/or supercapacitor electrode described herein in an activation process). In some embodiments, an electrolyte comprises one or more salts lacking ions configured to intercalate and/or absorb into a metal-organic framework and/or supercapacitor electrode described herein. Salts of either type may comprise ions that are transported between supercapacitor electrodes during charging and discharging to form an ionic current that balances the electron current also being transported between the relevant electrodes. This ionic current may serve to maintain charge neutrality throughout the supercapacitor.

The electrolytes described herein may comprise salts comprising ions having a variety of suitable diameters, lengths, and/or widths. For instance, an electrolyte may comprise a salt comprising an ion having a diameter, length, and/or width smaller than a pore in a metal-organic framework described herein and/or smaller than a spacing between two-dimensional sheets of a metal-organic framework described herein. In some embodiments, an electrolyte comprises a salt comprising an ion having a diameter, length, and/or width of greater than or equal to 0.1 Å, greater than or equal to 0.2 Å, greater than or equal to 0.5 Å, greater than or equal to 0.75 Å, greater than or equal to 1 Å, greater than or equal to 2 Å, greater than or equal to 5 Å, greater than or equal to 7.5 Å, greater than or equal to 10 Å, greater than or equal to 15 Å, or greater than or equal to 20 Å. In some embodiments, an electrolyte comprises a salt comprising an ion having a diameter, length, and/or width of less than or equal to 25 Å, less than or equal to 20 Å, less than or equal to 15 Å, less than or equal to 10 Å, less than or equal to 7.5 Å, less than or equal to 5 Å, less than or equal to 2 Å, less than or equal to 1 Å, less than or equal to 0.75 Å, less than or equal to 0.5 Å, or less than or equal to 0.2 Å. Combinations of the above-referenced ranges are also possible (e.g., greater than or equal to 0.1 Å and less than or equal to 25 Å). Other ranges are also possible.

It should be understood that the electrolytes described herein may comprise an ion having a diameter, length, and/or width in one or more of the ranges described above when in the form of a naked ion (i.e., in a vacuum) and/or may comprise an ion having a diameter, length, and/or width in one or more of the ranges described above when in the form of a solvated ion (i.e., dissolved in a solvent).

The electrolytes described herein may comprise salts having monatomic cations and/or polyatomic cations. Non-limiting examples of suitable monatomic cations include alkali metal cations (e.g., $Li^+$, $Na^+$, $K^+$), alkaline earth metal cations (e.g., $Mg^{2+}$, $Ca^{2+}$), post-transition metal cations (e.g., $Al^{3+}$). Non-limiting examples of suitable polyatomic cations include quaternary ammonium cations (e.g., ammonium cations, tetramethylammonium cations, tetraethylammonium cations, tetrabutylammonium cations, tetrapentylammonium cations, tetrahexylammonium cations, tetraheptylammonium cations, tetraoctylammonium cations, tetraethylmethylammonium cations), quaternary phosphonium cations (e.g., phosphonium cations, tetramethylphosphonium cations, tetraethylphosphonium cations, tetrabutylphosphonium cations, tetrapentylphosphonium cations, tetrahexylphosphonium cations, tetraheptylphosphonium cations, and tetraoctylphosphonium cations), pyrrolidinium cations (e.g., N-methyl-N-butyl-pyrrolidinium, N-methyl-N-methoxyethyl-pyrrolidinium, N-methyl-N-propyl-pyrrolidinium), and imidazolium cations (e.g., 1-ethyl-3-methyl-imidazolium, 1-butyl-3-methylimidazolium). As may be appreciated from the above, electrolyte salts may comprise cations having a variety of suitable valencies. For instance, an electrolyte salt may comprise monovalent cations, divalent cations, trivalent cations, and/or tetravalent cations.

Similarly, the electrolytes described herein may comprise salts having monatomic anions and/or polyatomic anions. Non-limiting examples of suitable monatomic anions include halogen anions (e.g., $Cl^-$). Non-limiting examples of suitable polyatomic anions include $SO_4^{2-}$, $NO_3^-$, $ClO_4^-$, $CO_3^{2-}$, $PO_4^-$, $OH^-$, $BF_4^-$, $PF_6^-$, and bis(trifluoromethane) sulfonamide anions. As may be appreciated from the above discussion, electrolyte salts may comprise anions having a variety of suitable valencies. For instance, an electrolyte salt may comprise monovalent anions and/or divalent anions.

As described above, a supercapacitor may comprise one or more electrodes comprising a metal-organic framework and may comprise one or more electrodes lacking a metal-organic framework. The electrode(s) lacking the metal-organic framework may comprise a variety of suitable materials, such as carbon (e.g., porous carbon, carbon black, graphite, graphene, carbon nanotubes), a carbonitride, a transition metal carbide, a metal oxide (e.g., a ruthenium oxide, a molybdenum oxide, a niobium oxide, a manganese oxide, a nickel oxide, a cobalt oxide, an iron oxide), a metal sulfide (e.g., a nickel sulfide, a cobalt sulfide, a molybdenum sulfide, a copper sulfide), a metal hydroxide (e.g., a nickel hydroxide, a cobalt hydroxide), and/or a metal nitride (e.g., a vanadium nitride, a titanium nitride, a tungsten nitride, a molybdenum nitride, a niobium nitride, a gallium nitride). In some embodiments, the electrode(s) lacking the metal-organic framework may have a morphology that takes the form of a covalent organic framework or an MXene.

Electrode(s) lacking a metal-organic framework may serve as the cathode (e.g., in the case of an electrode comprising carbon, an electrode comprising a metal oxide, an electrode comprising a metal sulfide, an electrode comprising a metal hydroxide, and/or an electrode comprising a metal nitride) and/or the anode (e.g., in the case of an electrode comprising carbon and/or an electrode comprising an MXene). Electrodes serving as the cathode typically have potentials with respect to a silver wire electrode of greater than −2 V (e.g., between −2 V and 3 V) and those serving as the anode typically have potentials with respect to a silver wire electrode of less than −2 V (e.g., between −3 V and −2 V). However, it should be understood that any of the above-described materials may serve as the cathode or anode when paired with an appropriate electrode acting as the other of the cathode and the anode (e.g., as the cathode when paired with an anode having a lower potential with respect to a silver wire electrode, as the anode when paired with a cathode having a higher potential with respect to a silver wire electrode).

It should also be understood that electrode(s) lacking a metal-organic framework may be configured to intercalate and/or absorb ions (e.g., in the case of an electrode comprising carbon polarized to a potential of less than or equal to −2.5 V or greater than or equal to 2.5 V with respect to a silver wire electrode) or may not be configured to intercalate or absorb ions (e.g., an electrode comprising carbon otherwise polarized). The electrode(s) lacking the metal-organic framework may be configured to undergo a redox reaction during charging and/or discharging (e.g., in the case of an electrode configured to intercalate and/or absorb ions) or may not be configured to undergo a redox reaction during charging and/or discharging (e.g., in the case of an electrode not configured to intercalate and/or absorb ions).

In some embodiments, an electrode as described herein (e.g., an electrode comprising a metal-organic framework, an electrode lacking a metal-organic framework) may further comprise a current collector. The current collector may be a conductive material that assists in transporting electrical current into and/or out of the electrode during charging and/or discharging. The current collector may take the form of a foam or may take another form (e.g., a foil, a film, a disk, a matrix, a carbon cloth, a conducting flexible polymeric material). Non-limiting examples of materials that may be employed in current collectors include metals (e.g., nickel, gold, platinum), alloys (e.g., stainless steel), and carbon.

The supercapacitors described herein may have a variety of suitable potential drops thereacross. In some embodiments, the potential drop across a supercapacitor is less than or equal to 4 V, less than or equal to 3.5 V, less than or equal to 3 V, less than or equal to 2.5 V, less than or equal to 2 V, less than or equal to 1.5 V, less than or equal to 1 V, or less than or equal to 0.5 V. In some embodiments, the potential drop across a supercapacitor is greater than or equal to 0 V, greater than or equal to 0.5 V, greater than or equal to 1 V, greater than or equal to 1.5 V, greater than or equal to 2 V, greater than or equal to 2.5 V, greater than or equal to 3 V, or greater than or equal to 3.5 V. Combinations of the above-referenced ranges are also possible (e.g., less than or equal to 4 V and greater than or equal to 0 V). Other ranges are also possible.

The potential drop across a supercapacitor may be determined by use of a voltmeter.

In some embodiments, a supercapacitor described herein has an advantageously high gravimetric capacitance. For instance, a supercapacitor may have a gravimetric capacitance of greater than or equal to 50 F/g, greater than or equal to 75 F/g, greater than or equal to 100 F/g, greater than or equal to 125 F/g, greater than or equal to 150 F/g, greater than or equal to 200 F/g, greater than or equal to 250 F/g, greater than or equal to 300 F/g, greater than or equal to 350 F/g, greater than or equal to 400 F/g, greater than or equal to 450 F/g, greater than or equal to 500 F/g, greater than or equal to 550 F/g, greater than or equal to 600 F/g, greater than or equal to 650 F/g, or greater than or equal to 700 F/g.

In some embodiments, a supercapacitor has a gravimetric capacity of less than or equal to 750 F/g, less than or equal to 700 F/g, less than or equal to 650 F/g, less than or equal to 600 F/g, less than or equal to 550 F/g, less than or equal to 500 F/g, less than or equal to 450 F/g, less than or equal to 400 F/g, less than or equal to 350 F/g, less than or equal to 300 F/g, less than or equal to 250 F/g, less than or equal to 200 F/g, less than or equal to 150 F/g, less than or equal to 125 F/g, less than or equal to 100 F/g, or less than or equal to 75 F/g. Combinations of the above-referenced ranges are also possible (e.g., greater than or equal to 50 F/g and less than or equal to 750 F/g, greater than or equal to 50 F/g and less than or equal to 400 F/g, or greater than or equal to 100 F/g and less than or equal to 750 F/g). Other ranges are also possible. In some embodiments, otherwise identical supercapacitors may have higher gravimetric capacitances when comprising an aqueous electrolyte than when comprising a non-aqueous electrolyte (e.g., a supercapacitor comprising an aqueous electrolyte may have a gravimetric capacitance of greater than or equal to 100 F/g and less than or equal to 750 F/g and an otherwise equivalent supercapacitor comprising a non-aqueous electrolyte may have a gravimetric capacitance of greater than or equal to 50 F/g and less than or equal to 400 F/g).

The gravimetric capacitance of a supercapacitor may be determined by the following procedure: (1) allowing the supercapacitor to stand overnight at room temperature; (2) performing a number of cyclic voltammetry cycles thereon at a scan rate of 20 mV/s until a stable cyclic voltammetry curve is generated; and (3) performing a final cyclic voltammetry cycle thereon at a scan rate of 1 mV/s across a 600 mV scan window; and (4) dividing the capacitance measured during the final cyclic voltammetry cycle by the weight of the supercapacitor to determine the gravimetric capacitance.

In some embodiments, a supercapacitor described herein has an advantageously high power density. For instance, a supercapacitor may have a power density of greater than or equal to 0.5 W/g, greater than or equal to 0.75 W/g, greater than or equal to 1 W/g, greater than or equal to 1.25 W/g, greater than or equal to 1.5 W/g, greater than or equal to 2 W/g, greater than or equal to 2.5 W/g, greater than or equal to 3 W/g, greater than or equal to 3.5 W/g, greater than or equal to 4 W/g, greater than or equal to 4.5 W/g, greater than or equal to 5 W/g, greater than or equal to 5.5 W/g, greater than or equal to 6 W/g, greater than or equal to 6.5 W/g, greater than or equal to 7 W/g, greater than or equal to 7.5 W/g, greater than or equal to 8 W/g, greater than or equal to 8.5 W/g, greater than or equal to 9 W/g, or greater than or equal to 9.5 W/g. In some embodiments, a supercapacitor has a power density of less than or equal to 10 W/g, less than or equal to 9.5 W/g, less than or equal to 9 W/g, less than or equal to 8.5 W/g, less than or equal to 8 W/g, less than or equal to 7.5 W/g, less than or equal to 7 W/g, less than or equal to 6.5 W/g, less than or equal to 6 W/g, less than or equal to 5.5 W/g, less than or equal to 5 W/g, less than or equal to 4.5 W/g, less than or equal to 4 W/g, less than or equal to 3.5 W/g, less than or equal to 3 W/g, less than or equal to 2.5 W/g, less than or equal to 2 W/g, less than or equal to 1.5 W/g, less than or equal to 1.25 W/g, less than or equal to 1 W/g, or less than or equal to 0.75 W/g. Combinations of the above-referenced ranges are also possible (e.g., greater than or equal to 0.5 W/g and less than or equal to 10 W/g). Other ranges are also possible.

The power density of a supercapacitor may be determined by performing the first three steps of the method for determining gravimetric capacitance described elsewhere herein and then dividing the power measured during the final cyclic voltammetry cycle by the weight of the supercapacitor to determine the power density.

For convenience, certain terms employed in the specification, examples, and appended claims are listed here. Definitions of specific functional groups and chemical terms are described in more detail below. For purposes of this invention, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito: 1999.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "alkyl" refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. The alkyl groups may be optionally substituted, as described more fully below. Examples of alkyl groups include, but are not limited to, methyl, ethyl, propyl, isopropyl, butyl, isobutyl, tert-butyl, 2-ethylhexyl, cyclopropyl, cyclobutyl, cyclopentyl, cyclohexyl, and the like. "Heteroalkyl" groups are alkyl groups wherein at least one atom is a heteroatom (e.g., oxygen, sulfur, nitrogen, phosphorus, etc.), with the remainder of the atoms being carbon atoms. Examples of heteroalkyl groups include, but are not limited to, alkoxy, poly(ethylene glycol)-, alkyl-substituted amino, tetrahydrofuranyl, piperidinyl, morpholinyl, etc.

The terms "alkenyl" and "alkynyl" refer to unsaturated aliphatic groups analogous to the alkyl groups described above, but containing at least one double or triple bond respectively. The "heteroalkenyl" and "heteroalkynyl" refer to alkenyl and alkynyl groups as described herein in which one or more atoms is a heteroatom (e.g., oxygen, nitrogen, sulfur, and the like).

The term "aryl" refers to an aromatic carbocyclic group having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl), all optionally substituted. "Heteroaryl" groups are aryl groups wherein at least one ring atom in the aromatic ring is a heteroatom, with the remainder of the ring atoms being carbon atoms. Examples of heteroaryl groups include furanyl, thienyl, pyridyl, pyrrolyl, N lower alkyl pyrrolyl, pyridyl N oxide, pyrimidyl, pyrazinyl, imidazolyl, indolyl and the like, all optionally substituted.

The terms "amine" and "amino" refer to both unsubstituted and substituted amines, e.g., a moiety that can be represented by the general formula: N(R')(R")(R'") wherein R', R", and R'" each independently represent a group permitted by the rules of valence.

The terms "acyl," "carboxyl group," or "carbonyl group" are recognized in the art and can include such moieties as can be represented by the general formula:

wherein W is H, OH, O-alkyl, O-alkenyl, or a salt thereof. Where W is O-alkyl, the formula represents an "ester." Where W is OH, the formula represents a "carboxylic acid." In general, where the oxygen atom of the above formula is replaced by sulfur, the formula represents a "thiolcarbonyl" group. Where W is a S-alkyl, the formula represents a "thiolester." Where W is SH, the formula represents a "thiolcarboxylic acid." On the other hand, where W is alkyl, the above formula represents a "ketone" group. Where W is hydrogen, the above formula represents an "aldehyde" group.

As used herein, the term "heteroaromatic" or "heteroaryl" means a monocyclic or polycyclic heteroaromatic ring (or radical thereof) comprising carbon atom ring members and one or more heteroatom ring members (such as, for example, oxygen, sulfur or nitrogen). Typically, the heteroaromatic ring has from 5 to about 14 ring members in which at least 1 ring member is a heteroatom selected from oxygen, sulfur, and nitrogen. In another embodiment, the heteroaromatic ring is a 5 or 6 membered ring and may contain from 1 to about 4 heteroatoms. In another embodiment, the heteroaromatic ring system has a 7 to 14 ring members and may contain from 1 to about 7 heteroatoms. Representative heteroaryls include pyridyl, furyl, thienyl, pyrrolyl, oxazolyl, imidazolyl, indolizinyl, thiazolyl, isoxazolyl, pyrazolyl, isothiazolyl, pyridazinyl, pyrimidinyl, pyrazinyl, triazinyl, triazolyl, pyridinyl, thiadiazolyl, pyrazinyl, quinolyl, isoquinolyl, indazolyl, benzoxazolyl, benzofuryl, benzothiazolyl, indolizinyl, imidazopyridinyl, isothiazolyl, tetrazolyl, benzimidazolyl, benzoxazolyl, benzothiazolyl, benzothiadiazolyl, benzoxadiazolyl, carbazolyl, indolyl, tetrahydroindolyl, azaindolyl, imidazopyridyl, qunizaolinyl, purinyl, pyrrolo[2,3]pyrimidyl, pyrazolo[3,4]pyrimidyl, benzo(b)thienyl, and the like. These heteroaryl groups may be optionally substituted with one or more substituents.

The term "substituted" is contemplated to include all permissible substituents of organic compounds, "permissible" being in the context of the chemical rules of valence known to those of ordinary skill in the art. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl" must still comprise the phenyl moiety and cannot be modified by substitution, in this definition, to become, e.g., a heteroaryl group such as pyridine. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. This invention is not intended to be limited in any manner by the permissible substituents of organic compounds.

Examples of substituents include, but are not limited to, alkyl, aryl, aralkyl, cyclic alkyl, heterocycloalkyl, hydroxy, alkoxy, aryloxy, perhaloalkoxy, aralkoxy, heteroaryl, heteroaryloxy, heteroarylalkyl, heteroaralkoxy, azido, amino, halogen, alkylthio, oxo, acyl, acylalkyl, carboxy esters, carboxyl, carboxamido, nitro, acyloxy, amino alkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, halo alkyl, alkylaminoalkylcarboxy, aminocarboxamidoalkyl, alkoxyalkyl, perhaloalkyl, arylalkyloxyalkyl, and the like.

Example 1

This Example describes a new lithium ion high capacitance and low equivalent series resistance (ESR) electrode utilizing a highly conducting and porous two-dimensional metal-organic framework (2D-MOF). In this two-dimensional metal-organic framework, charge is stored through lithium ion insertion into the 2D-MOF in the pseudo-circular pores of the framework. The electrode has a capacitance of 475 F/g in an aqueous LiCl electrolyte and a measured ESR of 0.17 ohms. It is believed that this performance is related to the structure and chemical composition of the 2D-MOF, which comprises both apertures small enough for efficient lithium ion insertion and a conductivity high enough to provide low ESR.

Figure 9A:
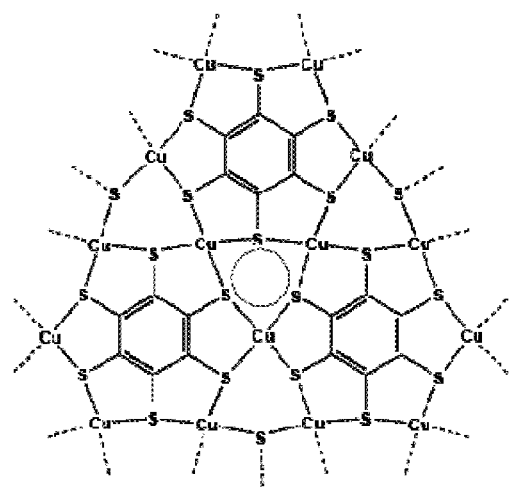
FIG. 9A shows one non-limiting embodiment of a structure of a metal-organic framework, in accordance with some embodiments.

The conductive 2D-MOF employed in this Example is copper benzenehexathiol ($Cu_3BHT_1$), in which copper ions are coordinated with benzenehexathiol moieties. This 2D-MOF displays BET surface areas on the order of 10 $m^2$/g, but it is believed that the true surface area of this 2D-MOF is in fact larger than this value. $Cu_3BHT_1$ comprises quasi-triangular pores bordered by copper and sulfur atoms (see FIG. 9A), which it is believed are too small to be penetrated by the gas probes employed during BET measurements (e.g., $N_2$) but large enough to be of interest for supercapacitor applications.

For this reason, this Example contemplates the use of $Cu_3BHT_1$ and structural analogues having one or more of the following features: (1) electrically conductive ligands, such as conjugated aromatic ligands; (2) metal ions; and (3) pores having a diameter appropriate for lithium or other ion insertion, such as greater than or equal to 0.3 nm and less than or equal to 0.33 nm. 2D-MOFs suitable for intercalating and/or absorbing other alkali ions and/or alkaline earth metal ions are also contemplated, as are the use of aqueous and non-aqueous solvents solubilizing such ions.

Figure 9B:
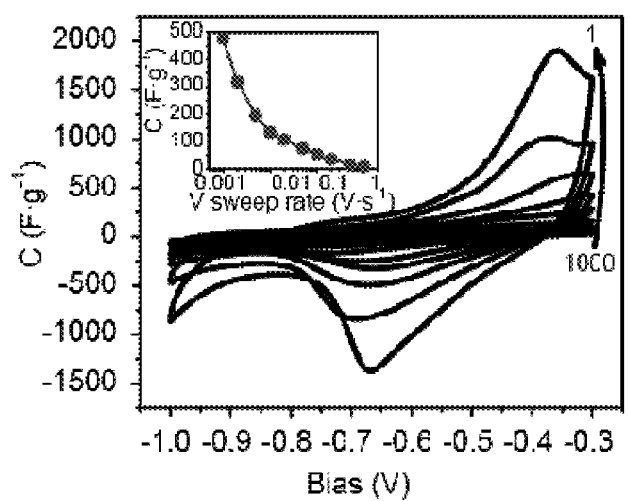
FIG. 9B shows cyclic voltammetry (CV) curves of a $Cu_3BHT_1$ electrode in an aqueous LiCl electrolyte, in accordance with some embodiments.
Figure 9C:
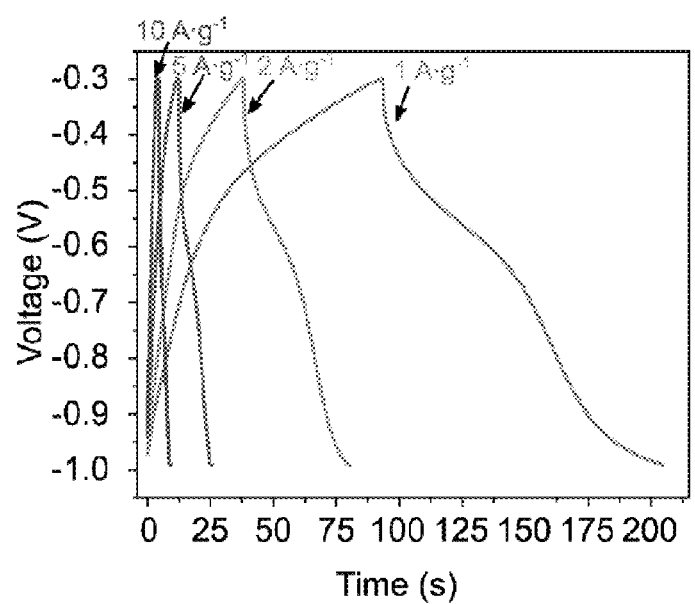
FIG. 9C shows galvanostatic charge/discharge sweeps for a metal-organic framework, in accordance with some embodiments.

FIG. 9B shows cyclic voltammetry (CV) curves of a $Cu_3BHT_1$ electrode in an aqueous LiCl electrolyte. These curves shows two clear events in the 1 mV/s sweep, one at −0.66 V and the other at −0.35V. Without wishing to be bound by any particular theory, it is believed that these events relate to interactions of lithium ions with the 2D-MOF and that such interactions contribute to the high measured values of capacitance. These same interactions can be seen in the galvanostatic charge/discharge sweeps shown in FIG. 9C. The highest capacitance recorded for the $Cu_3BHT_1$ electrode was 475 F/g at a 1 mV/s cycling rate. This electrode also exhibited good capacitance retention, with values of capacitance greater than 100 F/g recorded up cycling rates of 10 mV/s (inset in FIG. 9B). The stability of the capacitance was confirmed upon performing constant current charging and discharging, with the $Cu_3BHT_1$ electrode exhibiting 90% retention of the initial capacitance value after 5000 charge/discharge cycles at a current density of 5 Å/g.

Figure 10:
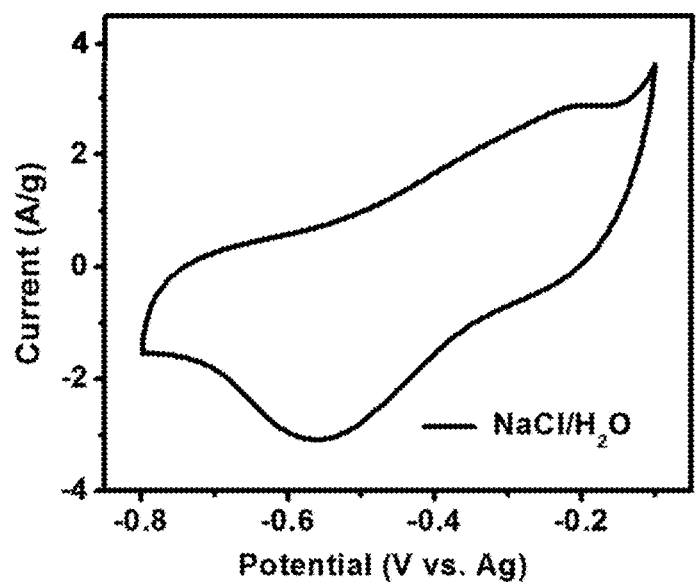
FIG. 10 shows a cyclic voltammetry curve for a metal-organic framework, in accordance with some embodiments.

It is noted that the measured capacitance may vary with ramp rate: FIG. 10 shows further data obtained in the presence of a NaCl solution at 10 mV/s, in which the $Cu_3BHT_1$ electrode displayed a capacitance of 290 F/g.

Figure 11A:
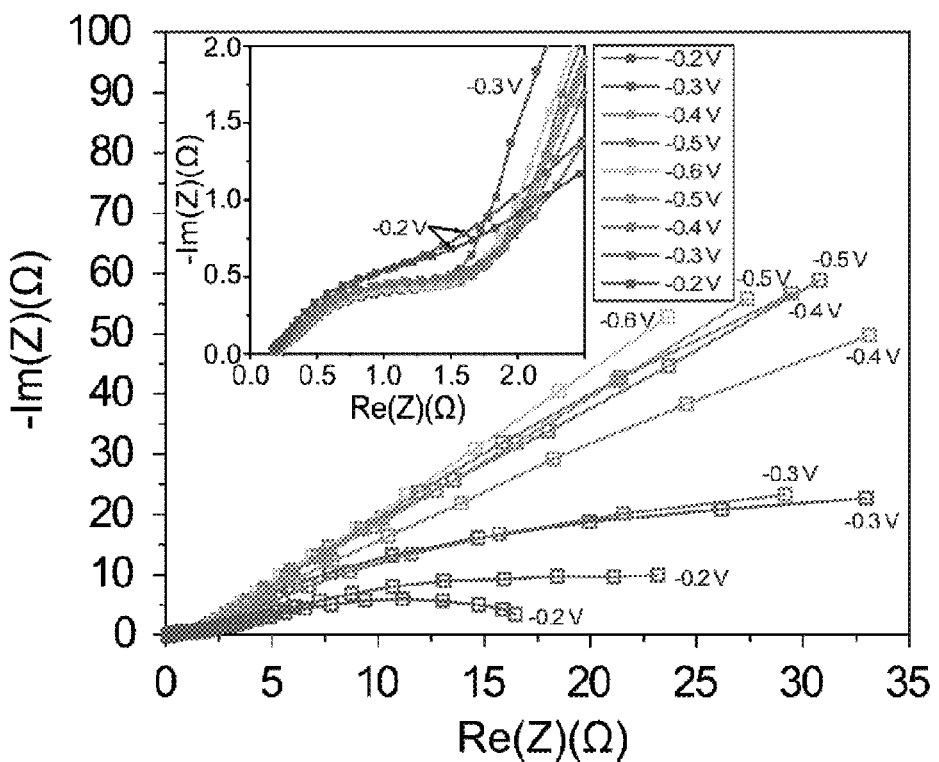
FIG. 11A shows Electrochemical Impedance Spectroscopy (EIS) Nyquist plots collected for $Cu_3BHT_1$ electrodes, in accordance with some embodiments.

Further experiments were performed, in which Electrochemical Impedance Spectroscopy (EIS) Nyquist plots were collected for $Cu_3BHT_1$ electrodes. These plots were collected by, over a period of 20 minutes, performing the following steps: (1) applying a voltage of −0.1 V to the electrodes; (2) reducing the voltage applied to the electrodes to −0.6 V; and (3) increasing the voltage applied to the electrodes back to −0.1 V (FIG. 11A). The Nyquist plots for the electrodes included three semicircles: one each at high, medium, and low frequencies.

During the voltage sweep, the position of the ESR on the high frequency end of the smallest semicircle shifted upward, from 0.15 ohms for −0.2 V to 0.20 ohms for −0.6 V. This ESR shifted back to 0.15 ohms upon returning to −0.2 V.

The radius of the medium frequency semicircle varied from 1.4 to 1.7 ohms during the same above-described voltage sweep, exhibiting variation believed to be related to a change in charge transfer resistance.

The low frequency semicircle exhibited the largest variation over the above-described voltage sweep: it changed from 20 ohms at −0.2 V to 675 ohms at −0.6 V. From FIG. 11A, it is apparent that the shape of the low frequency semicircle changed most rapidly between −0.4 V and −0.2 V and changed less rapidly in the area around −0.6V. It is believed that the low frequency semicircle is related to the electrolyte resistivity: it is believed that increasing introduction of $Li^+$ ions into the electrodes enhances the resistance thereof, causing increased ESR and charge transfer resistance. It is also believed that the amount of free $Li^+$ ions in the electrolyte decreases during charging due to intercalation of $Li^+$ ions into the electrodes, enhancing electrolyte resistivity.

Figure 11B:
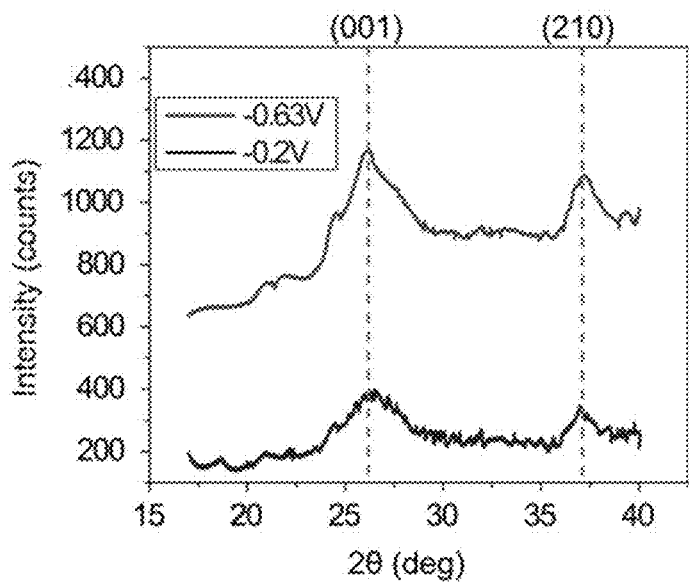
FIG. 11B shows powder X-ray diffraction patterns of $Cu_3BHT_1$, in accordance with some embodiments.

Powder X-ray diffraction patterns of $Cu_3BHT_1$ taken at the voltages at which the peaks in the CV traces occurred did not evidence any changes in the unit cell thereof, implying that $Li^+$ insertion therein and removal therefrom did not cause this material to experience mechanical stress (FIG. 11B). Advantageously, this also implies that charging and discharging of $Cu_3BHT_1$ can be performed without mechanical stress.

Figure 12:
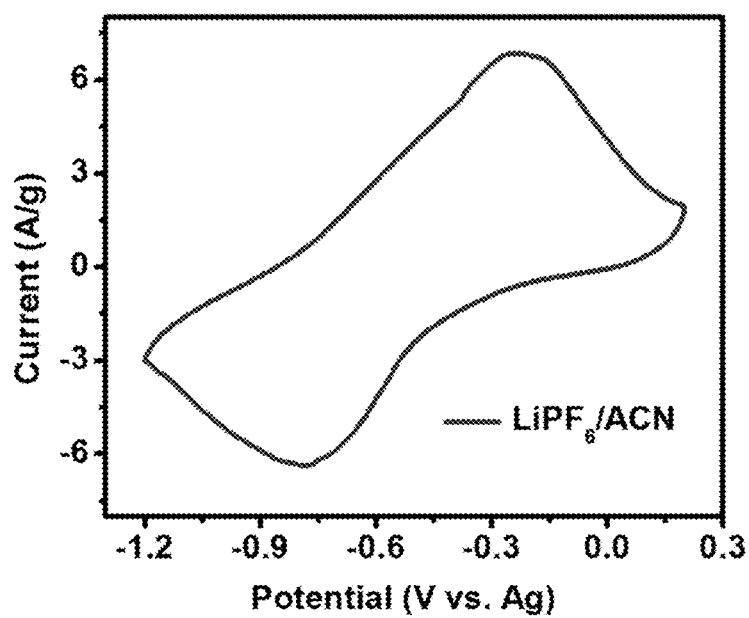
FIG. 12 shows a cyclic voltammetry curve for a $Cu_3BHT_1$ electrode in the presence of an electrolyte comprising acetonitrile and $LiPF_6$, in accordance with some embodiments.

FIG. 12 shows a cyclic voltammetry curve for a $Cu_3BHT_1$ electrode in the presence of an electrolyte comprising acetonitrile and $LiPF_6$. This cyclic voltammetry curve was taken at 20 mV/s and evidences a capacitance for the $Cu_3BHT_1$ electrode of 254 F/g in an electrochemical window of 0.2 V to −1.2 V in comparison to a silver wire. FIG. 12 shows that $Cu_3BHT_1$ electrodes may also be suitable in supercapacitors comprising non-aqueous and/or organic electrolytes.

$Cu_3BHT_1$ electrodes were fabricated by pressing the synthesized 2D-MOF to form pellets. Either Ni-foam or gold current collectors were used to support the $Cu_3BHT_1$ electrodes, both of which caused the electrodes to display the same CV shape during the above-described testing. The absolute voltage values of the CV peaks shifted slightly as other testing conditions were changed (e.g., upon shifting from measurements made in a beaker to those made on a stainless steel cell), but these shifts were believed to be due to the differing cell geometries and differing relative masses of the 2D-MOF electrode and the carbon counter electrode in these differing testing conditions. For a given experimental setup, the results were consistent across several different cells tested over several weeks and formed from different batches of $Cu_3BHT_1$.

Example 2

This Example describes the performance of electrodes comprising nickel benzenehexathiol ($Ni_3BHT_1$) metal-organic frameworks.

Figure 13A:
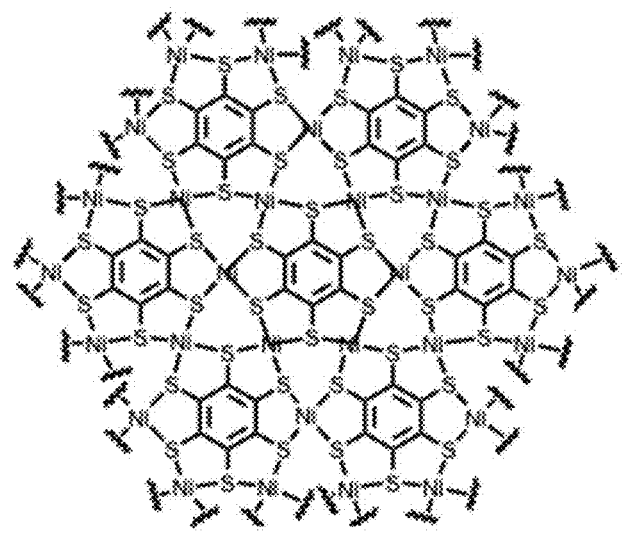
FIG. 13A shows a schematic depiction of the $Ni_3BHT_1$ structure, in accordance with some embodiments.

FIG. 13A shows a schematic depiction of the $Ni_3BHT_1$ structure, which forms two-dimensional sheets comprising pores.

Figure 13B:
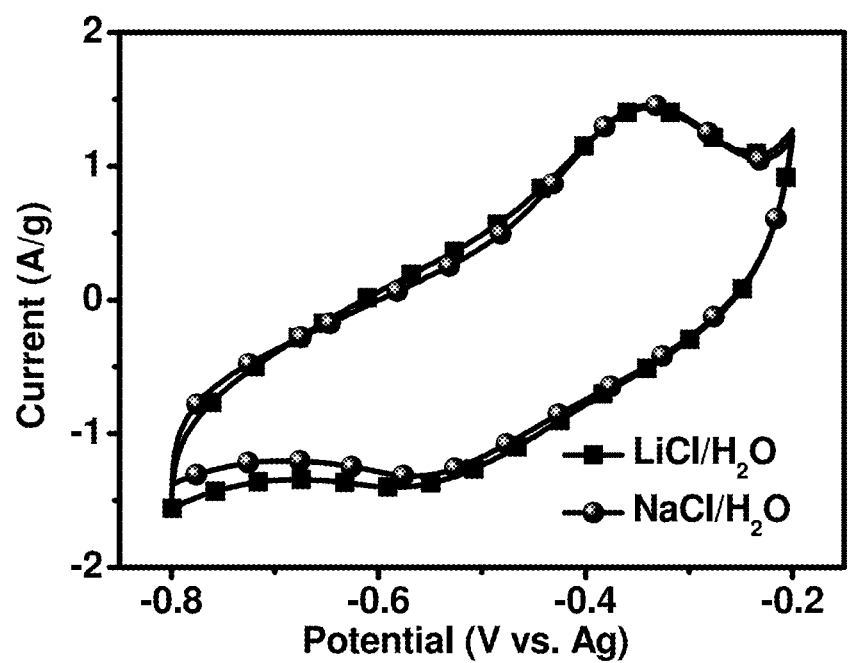
FIG. 13B shows cyclic voltammetry curves taken at 2 mV/s for a metal-organic framework, in accordance with some embodiments.
Figure 13C:
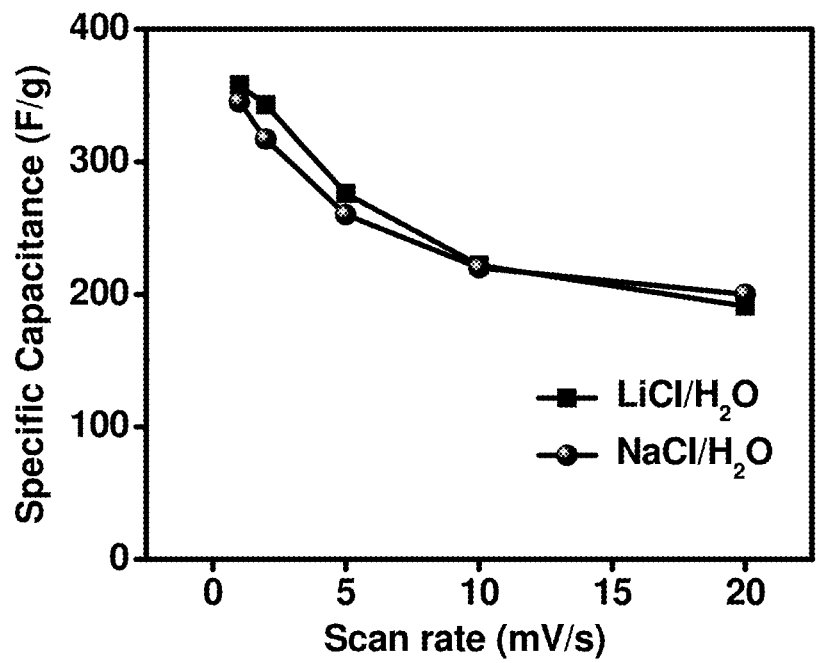
FIG. 13C shows specific capacitance as a function of scan rate for a metal-organic framework, in accordance with some embodiments.

The $Ni_3BHT_1$ 2D-MOF displays advantageous values of capacitance in the presence of aqueous electrolytes comprising LiCl and/or NaCl, as shown in FIGS. 13B-13C (showing cyclic voltammetry curves taken at 2 mV/s and specific capacitance as a function of scan rate, respectively). It is also conceivable that the $Ni_3BHT_1$ 2 D-MOF could be used in a supercapacitor including an aqueous electrolyte comprising one or more of the following ions: $Mg_{2+}$, $K^+$, $Al_3^+$, $SO_4^{2-}$, $CO_3^-$, and $NO_3^-$.

The $Ni_3BHT_1$ 2D-MOF also displays advantageous values of capacitance in the presence of non-aqueous electrolytes, examples of which are detailed below.

Figure 14A:
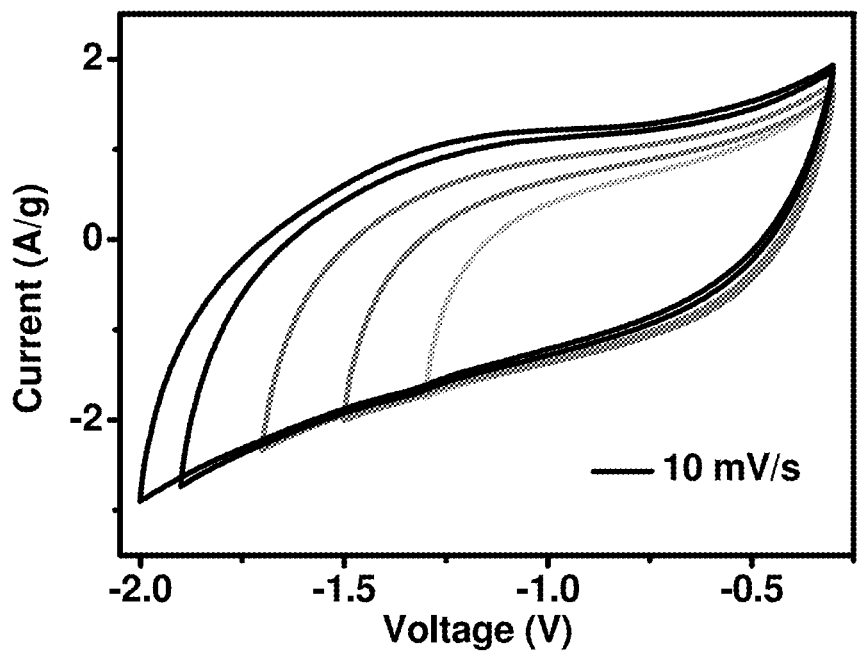
FIGS. 14A-14C show cyclic voltammetry curves for $Ni_3BHT_1$ in an electrolyte comprising acetonitrile and $LiPF_6$ at differing scan rates and potential windows, in accordance with some embodiments.
Figure 14B:
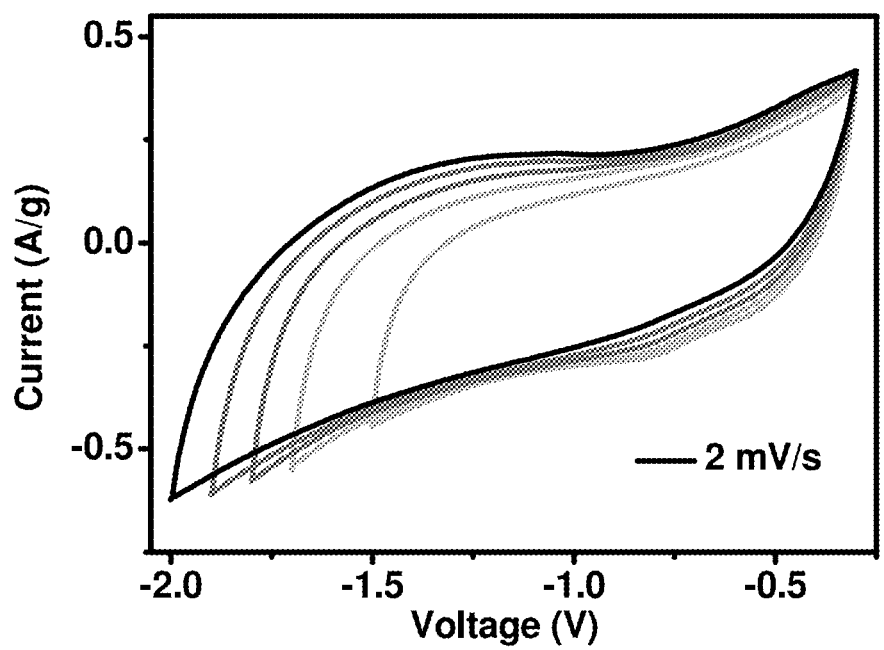
Figure 14C:
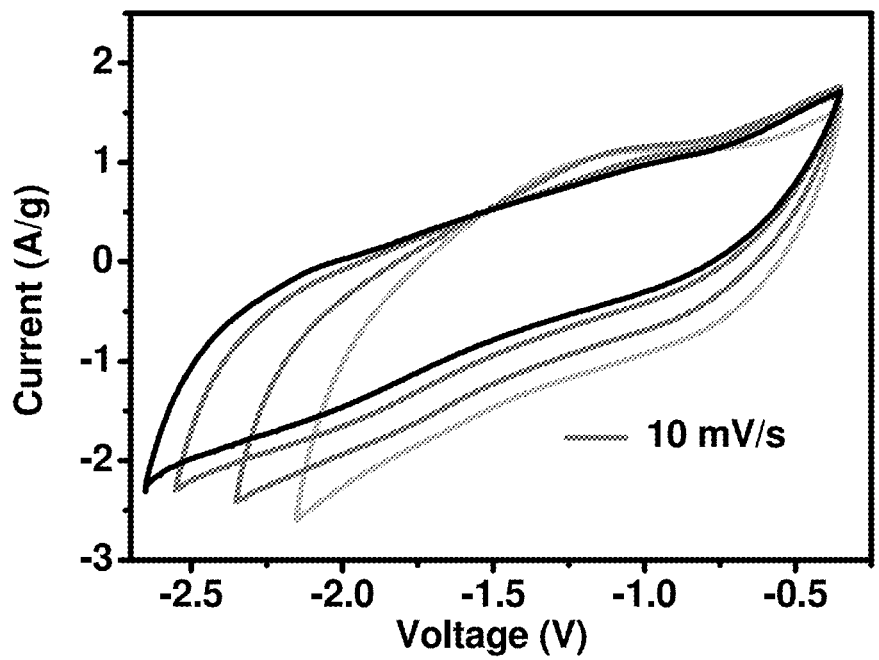
Figure 14D:
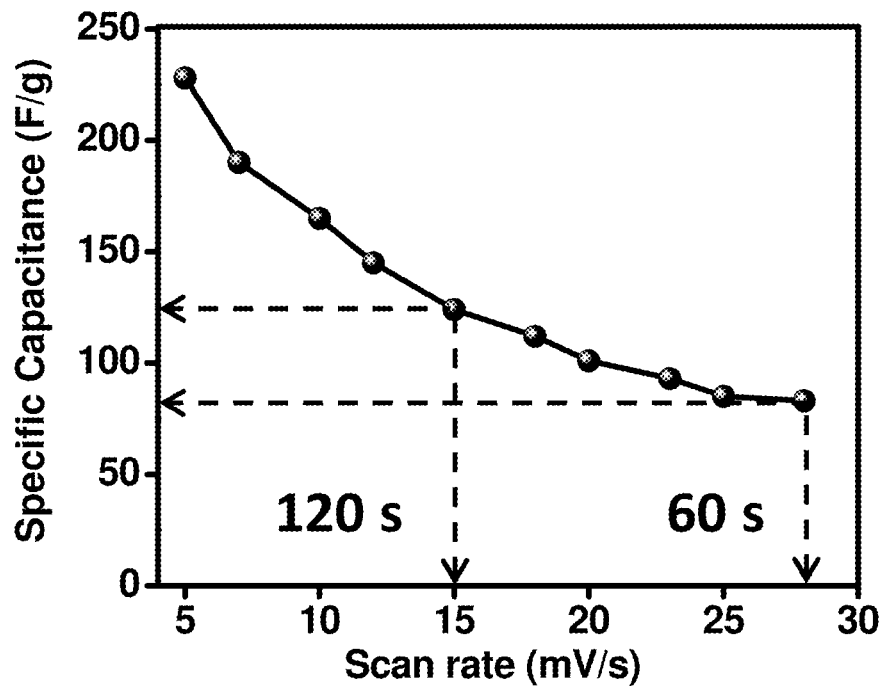
FIG. 14D shows specific capacitance as a function of scan rate for a metal-organic framework, in accordance with some embodiments.

FIGS. 14A-14C show cyclic voltammetry curves for $Ni_3BHT_1$ in an electrolyte comprising acetonitrile and $LiPF_6$ at differing scan rates and potential windows. FIG. 14D shows the specific capacitance extracted from this data as a function of scan rate. It should be noted that the cyclic voltammetry curves do not show any clear redox peaks, and so it is possible that lithium ion intercalation into the $Ni_3BHT_1$ electrodes occurs without a redox reaction between the lithium ions and the $Ni_3BHT_1$ 2 D-MOF.

Figure 15:
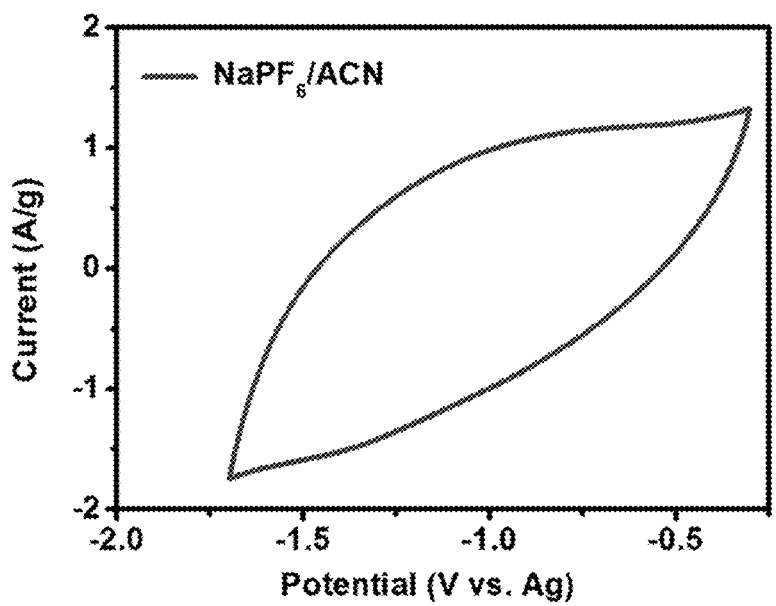
FIG. 15 shows a cyclic voltammetry curve form $Ni_3BHT_1$ in an electrolyte comprising acetonitrile and $NaPF_6$ performed at a scan rate of 20 mV/s, in accordance with some embodiments.

FIG. 15 shows a cyclic voltammetry curve form $Ni_3BHT_1$ in an electrolyte comprising acetonitrile and $NaPF_6$ performed at a scan rate of 20 mV/s, evidencing the suitability of this 2D-MOF for use in supercapacitor electrodes configured to intercalate sodium ions.

Figure 16:
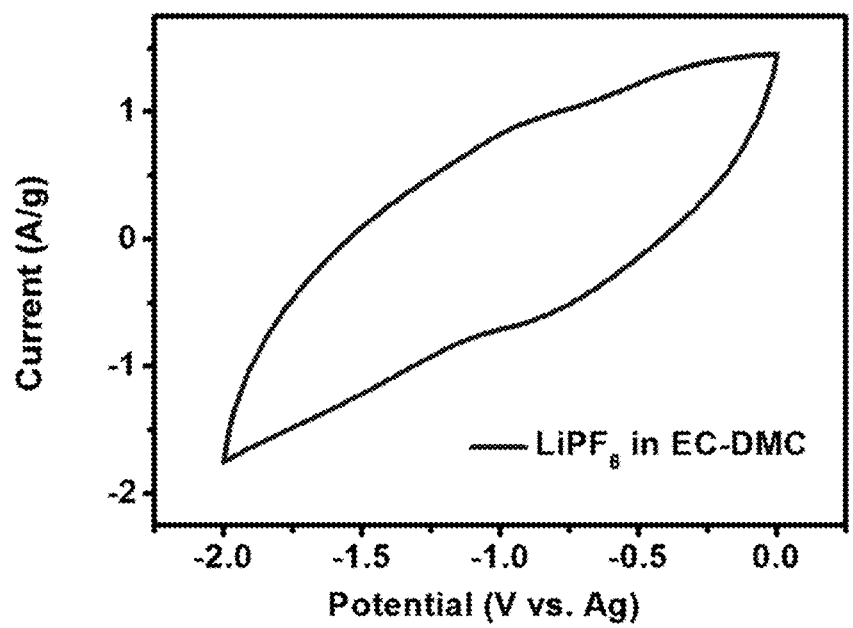
FIG. 16 shows a cyclic voltammetry curve for $Ni_3BHT_1$ in an electrolyte comprising ethylene carbonate, dimethyl carbonate, and $LiPF_6$ performed at a scan rate of 20 mV/s, in accordance with some embodiments.
Figure 17A:
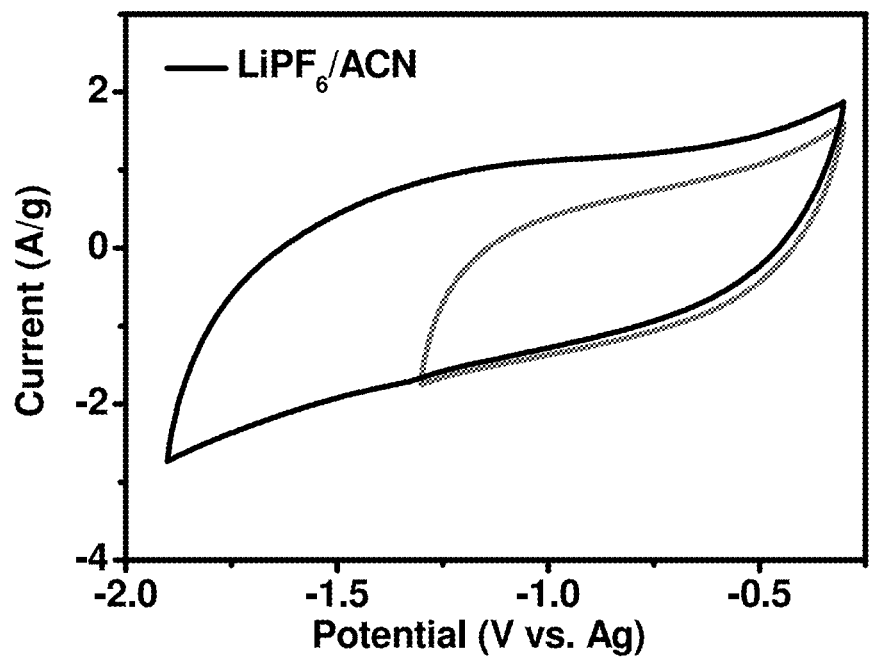
FIGS. 17A-17D show cyclic voltammetry curves for $Ni_3BHT_1$ in an electrolyte comprising acetonitrile and a salt, in accordance with some embodiments.
Figure 17B:
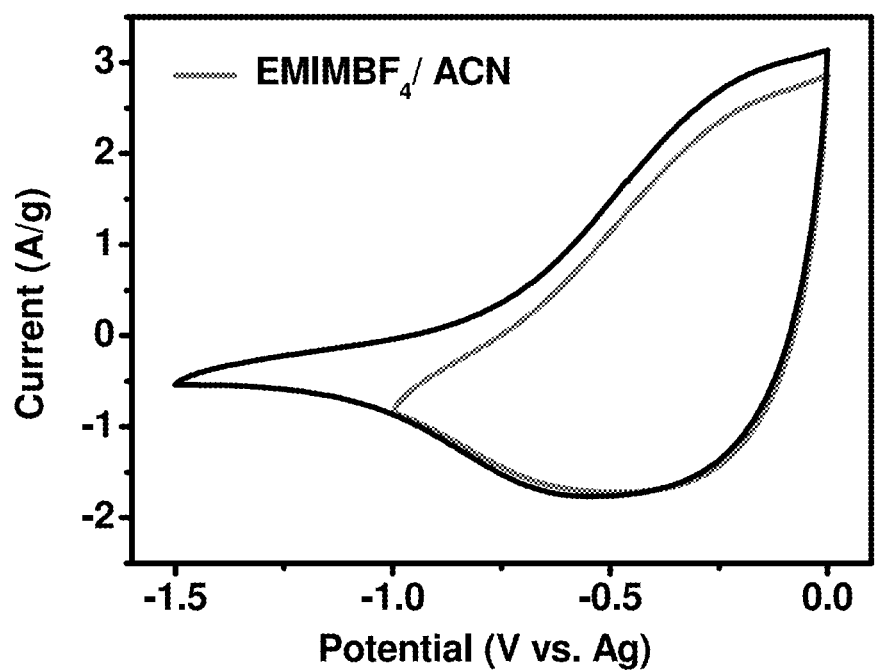
Figure 17C:
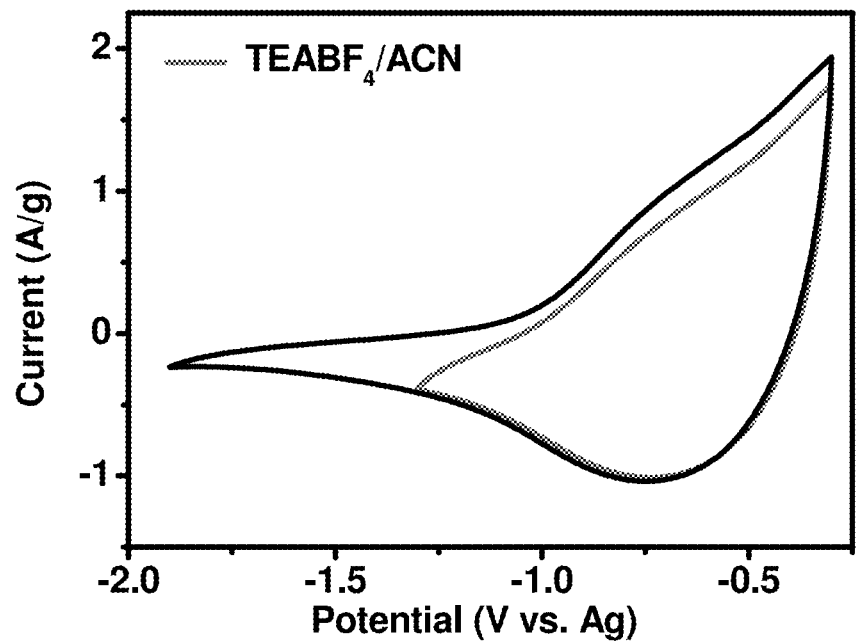
Figure 17D:
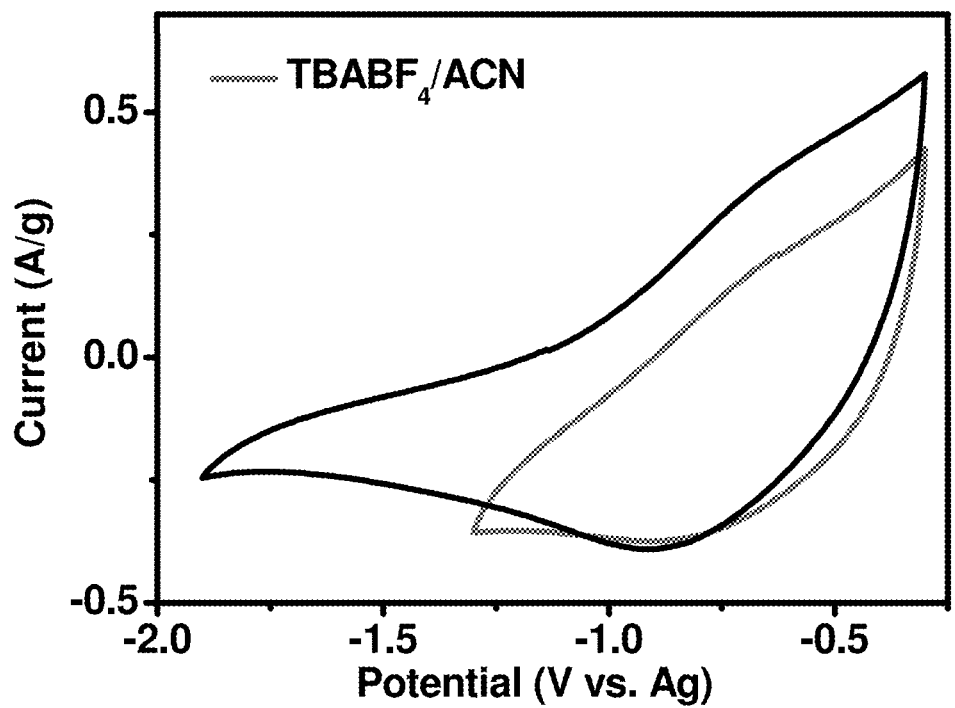

FIG. 16 shows a cyclic voltammetry curve for $Ni_3BHT_1$ in an electrolyte comprising ethylene carbonate, dimethyl carbonate, and $LiPF_6$ performed at a scan rate of 20 mV/s, evidencing the suitability of this 2D-MOF for use in supercapacitor electrodes comprising further types of non-aqueous electrolytes.

FIGS. 17A-17D show cyclic voltammetry curves for $Ni_3BHT_1$ in an electrolyte comprising acetonitrile and one of a variety of salts. These cyclic voltammetry curves were obtained at 10 mV/s, and evidence the ability of $Ni_3BHT_1$ to intercalate larger cations (such as those typically found in ionic liquids) in addition to the alkali metal cations described above. The cyclic voltammetry curve for $Ni_3BHT_1$ in the presence of $LiPF_6$ (FIG. 17A) has a shape that is close to rectangular, which indicates ion intercalation thereinto. However, the cyclic voltammetry curves for $Ni_3BHT_1$ in the presence of salts comprising the larger $EMIM^+$, $TEA^+$, and $TBA^+$ cations instead have a pointed shape.

Without wishing to be bound by any particular theory, it is believed that cyclic voltammetry curves having a shape including a low current intensity at greater polarization (−1 V to −2 V) (e.g., having a pointed shape at greater polarization, such as the shape shown in FIGs. EAB-EAD) indicate that the 2D-MOF has some surface area that is inaccessible to larger ions. For $Ni_3BHT_1$, it is believed that the larger ions may not be able to penetrate between the two-dimensional sheets therein. The spacing between the two-dimensional sheets in $Ni_3BHT_1$ is about 0.35 nm, which is larger than the diameters of $Li^+$ and $Na^+$ cations but smaller than the diameters of $EMIM^+$, $TEA^+$ and $TBA^+$ cations (which are 0.7, 0.68 and 0.82 nm respectively).

Figure 18A:
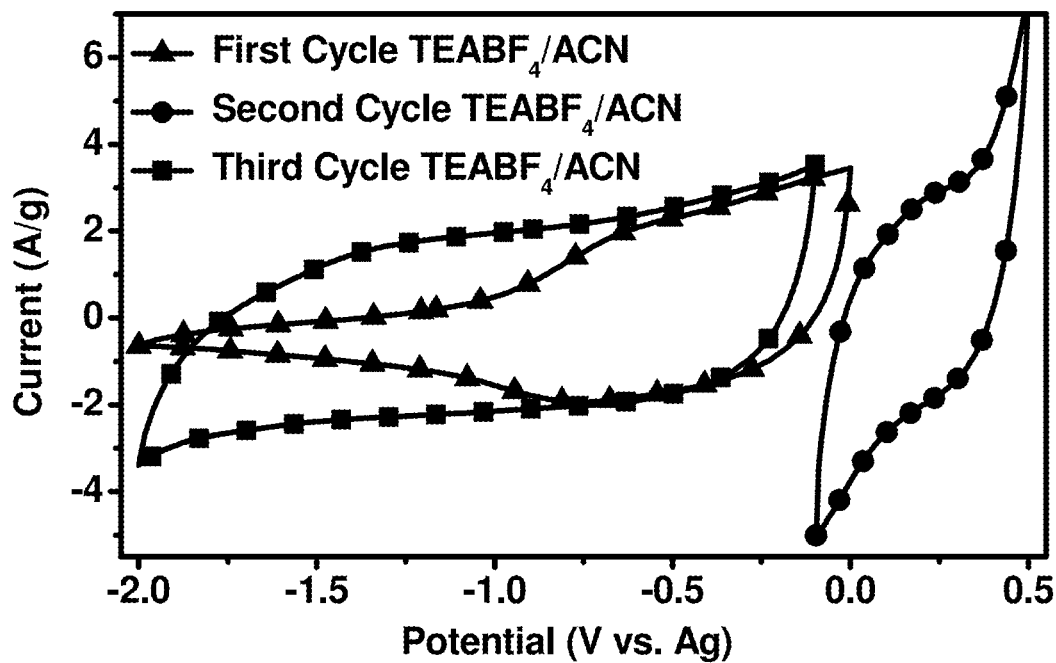
FIGS. 18A-18B show cyclic voltammetry curves for $Ni_3BHT_1$, in accordance with some embodiments.
Figure 18B:
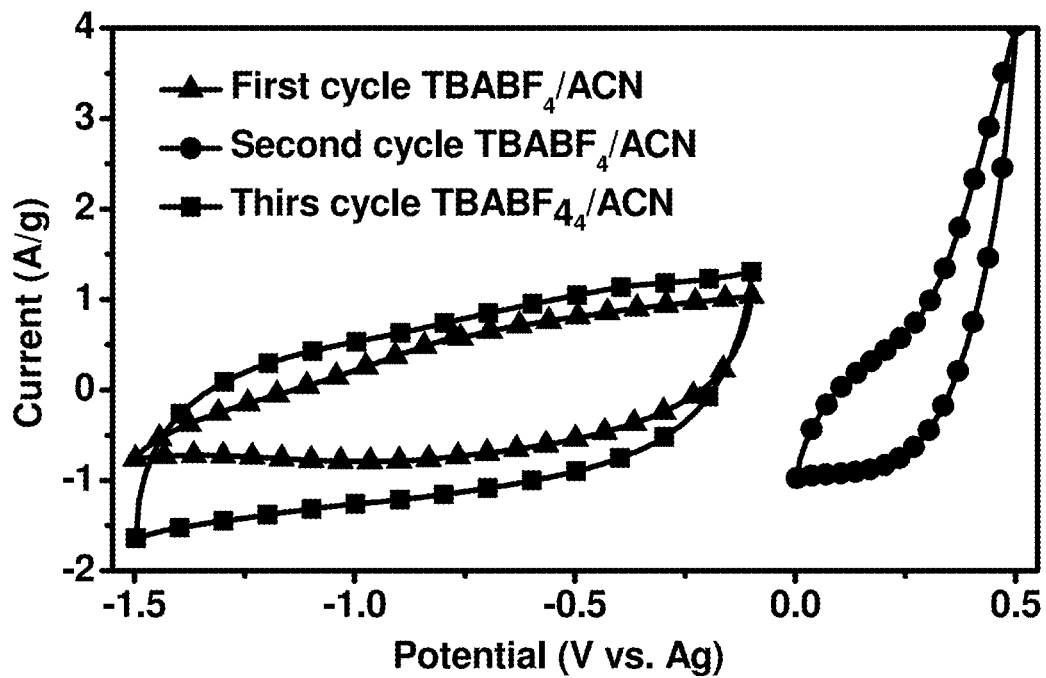

FIGS. 18A-18B show cyclic voltammetry curves for $Ni_3BHT_1$ over a potential window that includes both portions that are positive and negative with respect to the silver wire reference electrode. Three cycles were performed at 20 mV/s: a first cycle during which negative potentials were applied to the 2D-MOF, a second cycle during which positive potentials were applied to the 2D-MOF, and then a third cycle that was identical to the first cycle.

The cyclic voltammetry curve from the first cycle has a pointed shape as described above. However, that from the third cycle had a more rectangular shape. It is believed that the application of a positive charge to the 2D-MOF during the second cycle caused anions from the salt dissolved in the electrolyte to intercalate thereinto and that this intercalation caused the average spacing between the two-dimensional sheets therein to increase. It is also believed that this allowed for enhanced intercalation of the larger cations into the 2D-MOF during the third cycle.

Example 3

This Example describes the performance of a supercapacitor comprising an anode comprising nickel benzenehexathiol ($Ni_3BHT_1$) metal-organic framework having a structure as shown in FIG. 13A and a cathode comprising porous carbon. The supercapacitor further comprises an electrolyte comprising 1 M $LiPF_6$ in acetonitrile.

Figure 19A:
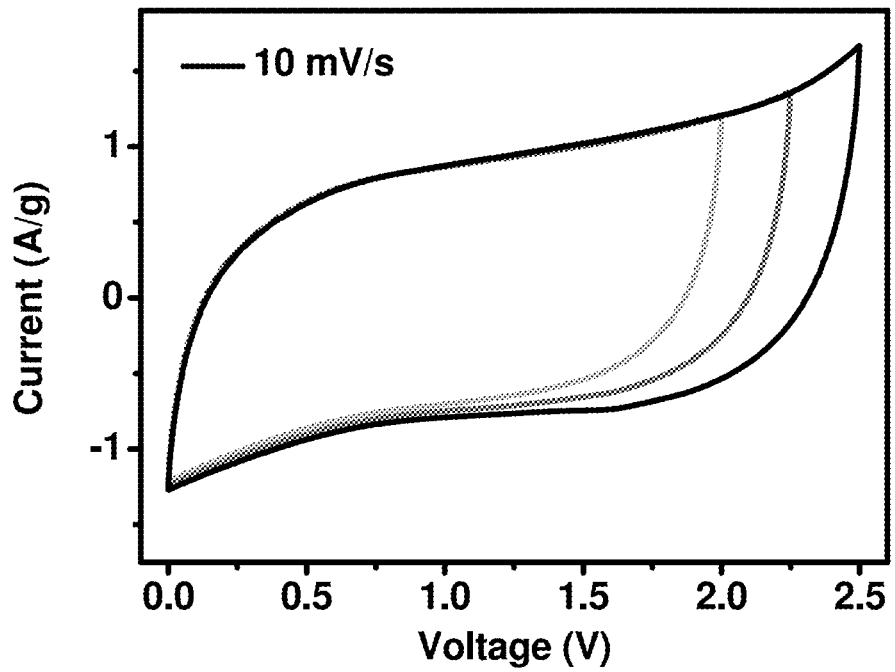
FIG. 19A shows cyclic voltammetry curves for a supercapacitor performed at 10 mV/s, in accordance with some embodiments.

FIG. 19A shows cyclic voltammetry curves for the supercapacitor performed at 10 mV/s. These curves show stable rectangular shapes at voltage windows of 2 V, 2.2 V, and 2.5 V.

Figure 19B:
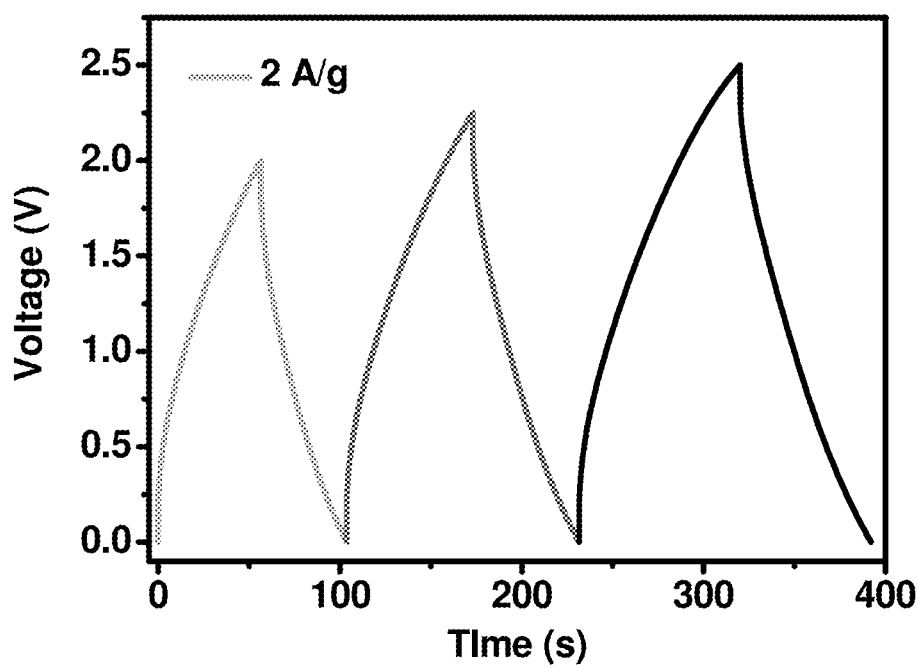
FIG. 19B shows galvanostatic charge/discharge sweeps for a supercapacitor, in accordance with some embodiments.

FIG. 19B shows galvanostatic charge/discharge sweeps for the supercapacitor. These galvanostatic charge/discharge sweeps were performed at a current of 2 Å/g and cycled between voltages of 0 V-2 V, 0 V-2.2 V, and 0 V-2.5 V.

Figure 19C:
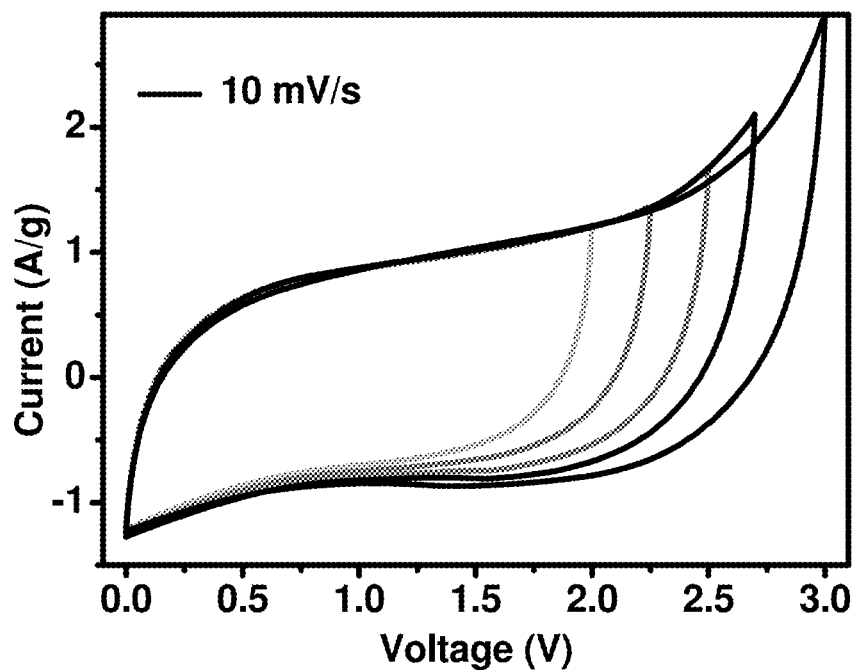
FIG. 19C shows cyclic voltammetry curves for a supercapacitor performed at 10 mV/s, in accordance with some embodiments.

FIG. 19C shows cyclic voltammetry curves for the supercapacitor performed at 10 mV/s. These curves evidence reversibility at voltage windows of up to 3 V. However, cycling at voltage windows in excess of 2.5 V does result in the presence of a distorted shape.

Figure 19D:
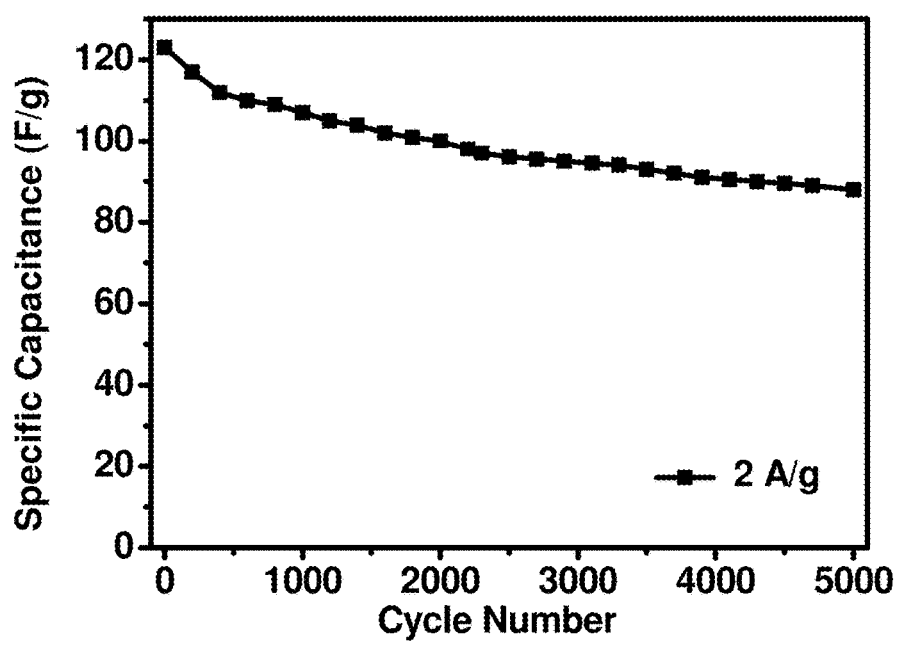
FIG. 19D shows the specific capacitance of the supercapacitor as a function of time when cycled at 2 A/g between voltages of 0 V and 2.5 V, in accordance with some embodiments.

FIG. 19D shows the specific capacitance of the supercapacitor as a function of time when cycled at 2 A/g between voltages of 0 V and 2.5 V.

Example 4

This Example describes a method of synthesizing a metal-organic framework having a structure suitable for use as an electrode for a supercapacitor.

Figure 20A:
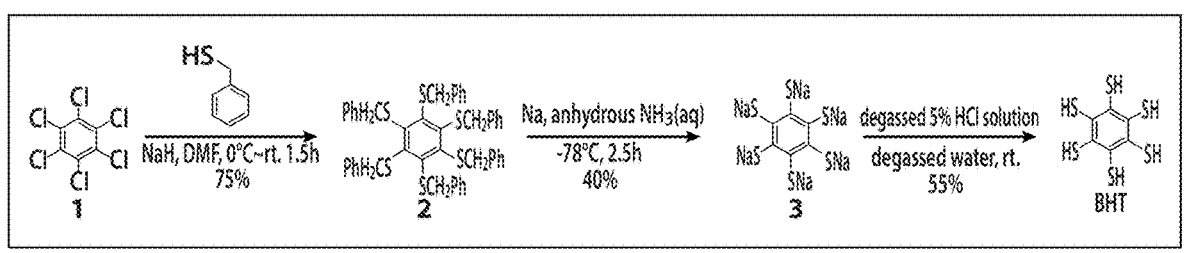
FIG. 20A shows a schematic depiction of a method of synthesizing a benzenehexathiol ligand, in accordance with some embodiments.

FIG. 20A shows a schematic depiction of a method of synthesizing a benzenehexathiol ligand.

Figure 20B:
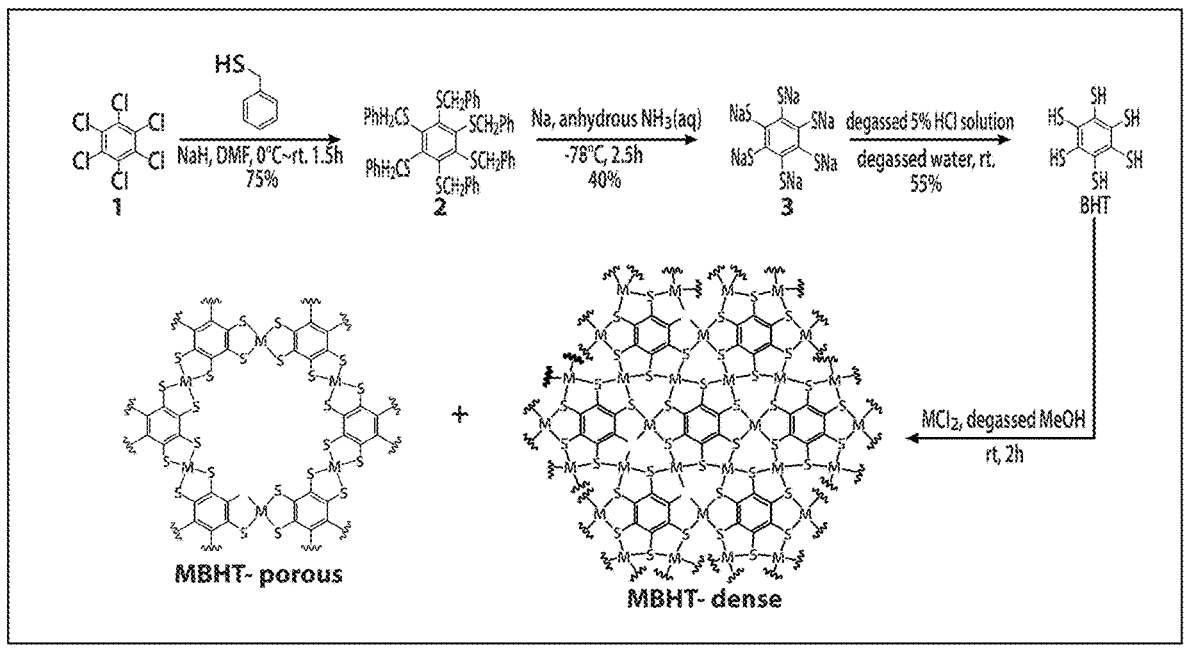
FIG. 20B shows a schematic depiction of a method of synthesizing a metal-organic framework from a benzenehexathiol ligand and a metal chloride to form a metal-organic framework comprising the metal ions from the metal chloride coordinated by the benzenehexathiol ligands, in accordance with some embodiments.

FIG. 20B shows a schematic depiction of a method of synthesizing a metal-organic framework from the benzenehexathiol ligand and a metal chloride to form a metal-organic framework comprising the metal ions from the metal chloride coordinated by the benzenehexathiol ligands.

Example 5

Supercapacitors (SC) have emerged as reliable and fast-charging electrochemical energy storage devices that offer high power densities. Their use is still limited, nevertheless, by their relatively low energy density. This Example describes a new non-porous CP, (Ni$_3$(benzenehexathiolate) (Ni$_3$BHT$_1$), which exhibits a high electrical conductivity of over 500 S/m. When used as an electrode for supercapacitors, Ni$_3$BHT$_1$ delivers excellent specific capacitances of 245 F/g and 426 F/cm$^3$ in non-aqueous electrolytes. Structural and electrochemical studies relate the favorable performance to pseudocapacitive intercalation of Li$^+$ ions between the 2D layers of Ni$_3$BHT$_1$.

Synthesis and Structural Characterization

Figure 21:
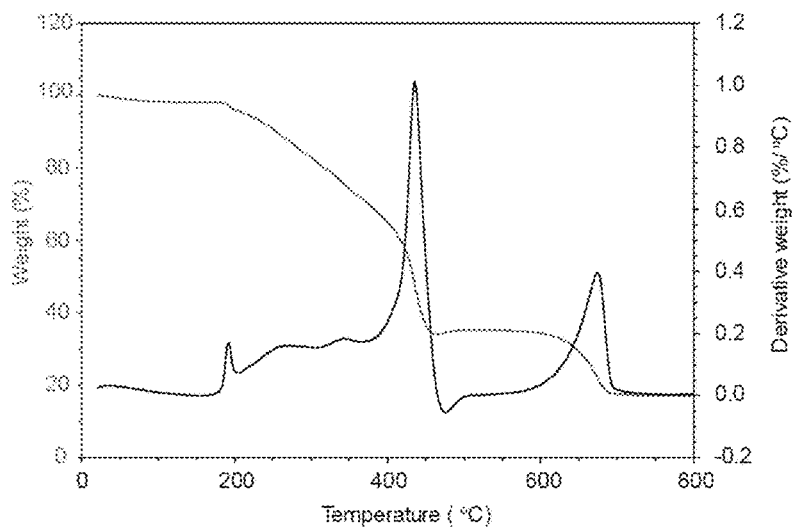
FIG. 21 shows the thermogravimetric response of $Ni_3BHT_1$, in accordance with some embodiments.
Figure 22:
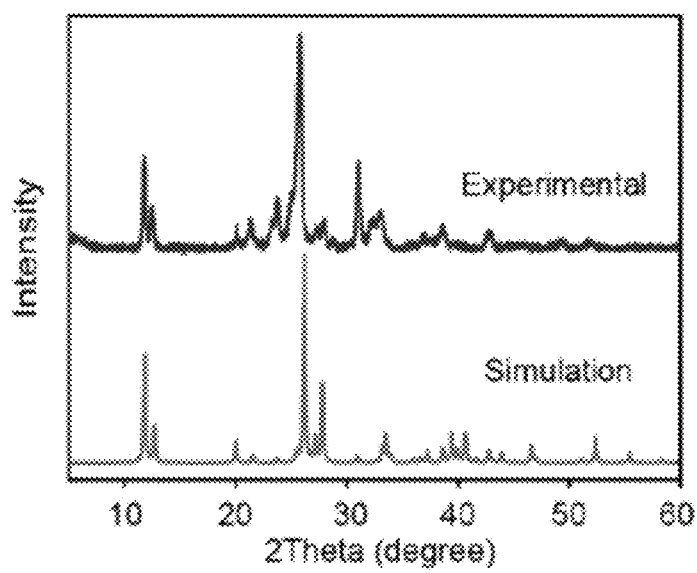
FIG. 22 shows powder X-ray diffraction patterns, in accordance with some embodiments.
Figure 23A:
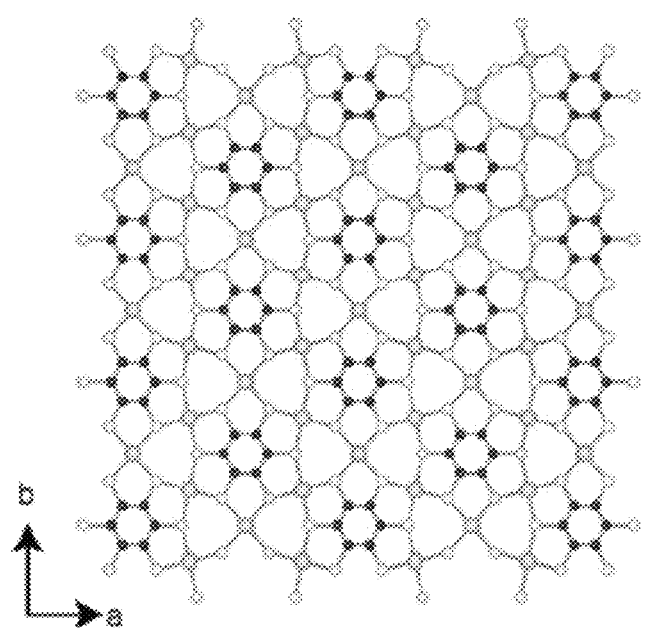
FIGS. 23A and 23B show views of a simulated structure for $Ni_3BHT_1$, in accordance with some embodiments.
Figure 23B:
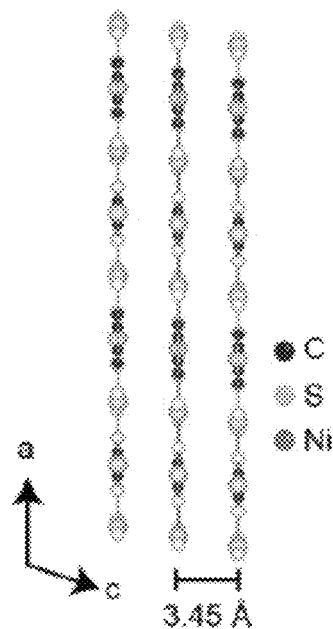
Figure 24:
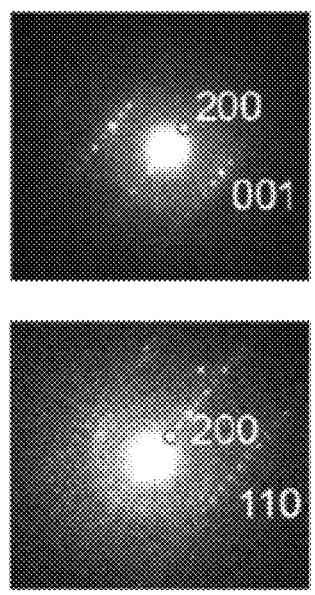
FIG. 24 shows selected area diffraction patterns for $Ni_3BHT_1$, in accordance with some embodiments.
Figure 25A:
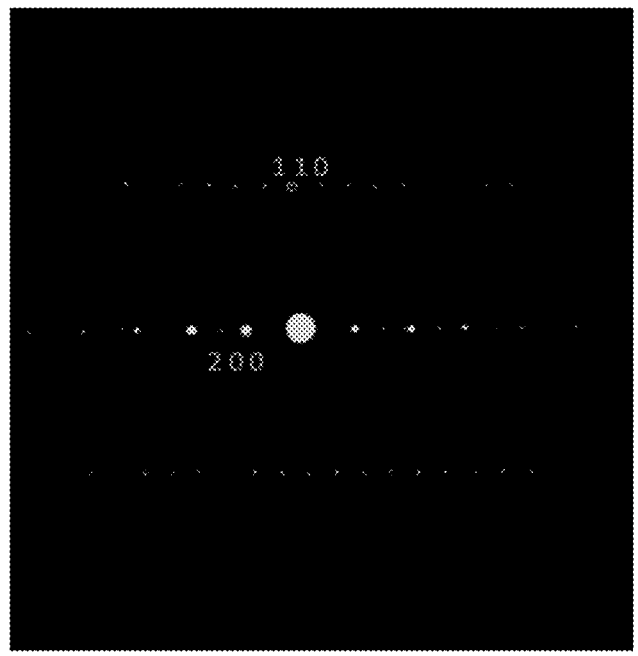
FIGS. 25A and 25B show simulated selected area diffraction patterns for $Ni_3BHT_1$, in accordance with some embodiments.
Figure 25B:
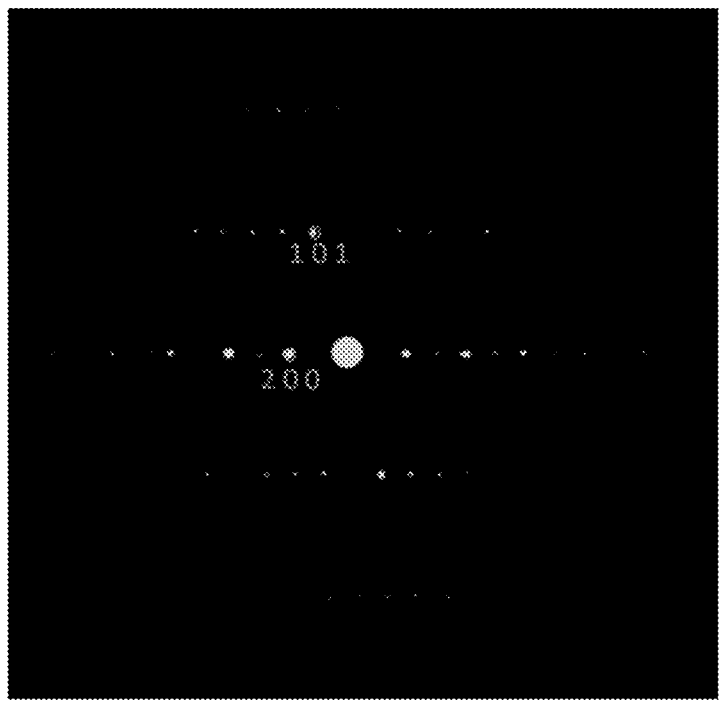
Figure 26:
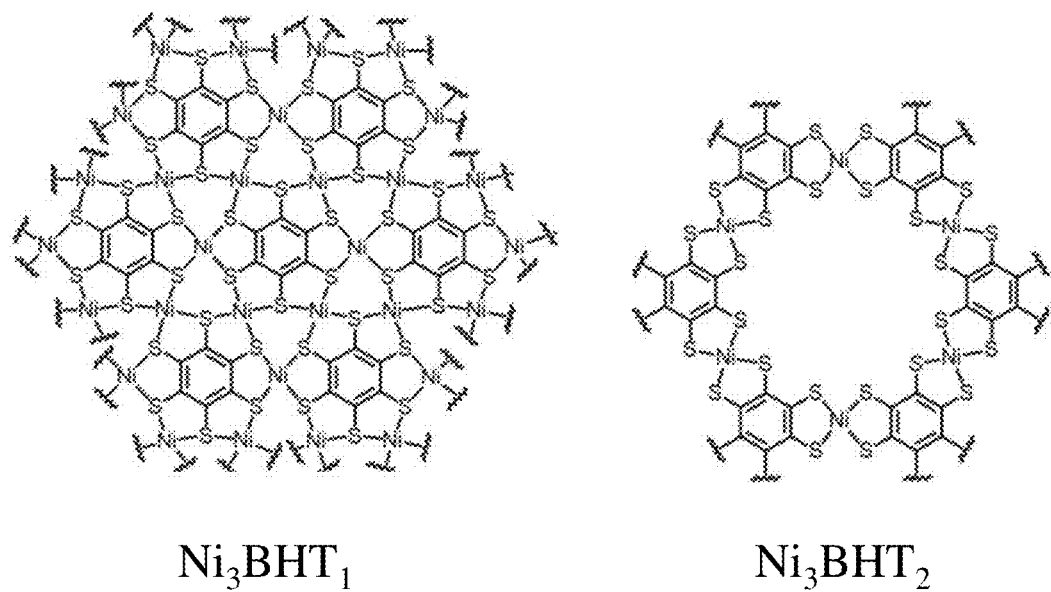
FIG. 26 shows the structures of $Ni_3BHT_1$ and $Ni_3BHT_2$, in accordance with some embodiments.

Microcrystalline samples of Ni$_3$BHT$_1$ were obtained through reaction of bezenehexathiol, C$_6$S$_6$H$_6$, with NiCl$_2$.6H$_2$O in de-aerated methanol under anaerobic conditions for 24 h at room temperature. Upon isolation from the mother liquor, Ni$_3$BHT$_1$ did not show weight loss below 200° C. and its electrical conductivity was maintained for at least 6 months in air (FIG. 21). The powder X-ray diffraction (PXRD) pattern of as-synthesized Ni$_3$BHT$_1$ did not match that of Ni$_3$(BHT)$_2$, and instead resembles that of Cu$_3$BHT$_1$ (FIG. 22). Further analysis through selected area electron diffraction (SAED) revealed unit cell parameters a=14.16 Å, b=8.86 Å, c=3.45 Å, α=90°, β=99.7° and γ=90° (FIGS. 23-26) that indeed are similar to those of Cu$_3$BHT$_1$. Taken together, the PXRD and SAED data suggest that Ni$_3$BHT$_1$ is a new phase that bears close resemblance to Cu$_3$BHT$_1$, with 2D layers made up of square-planar Ni$^{2+}$ ions bonded to four S atoms in a square planar coordination and BHT ligands surrounded by 6 Ni atoms. These form a dense arrangement that contrasts with the more-open, hexagonal honeycomb-type structure of Ni$_3$BHT$_2$ (FIG. 26). Elemental analysis found C and S content of 19.5% and 44.6%, respectively, close to the expected values for a chemical composition of Ni$_3$C$_6$S$_6$ for Ni$_3$BHT$_1$, and confirmed that the ligand does not suffer desulfurization during the reaction. Attempts to determine the Ni content through digestion methods have been hampered likely by the low solubility of NiS.

Figure 27:
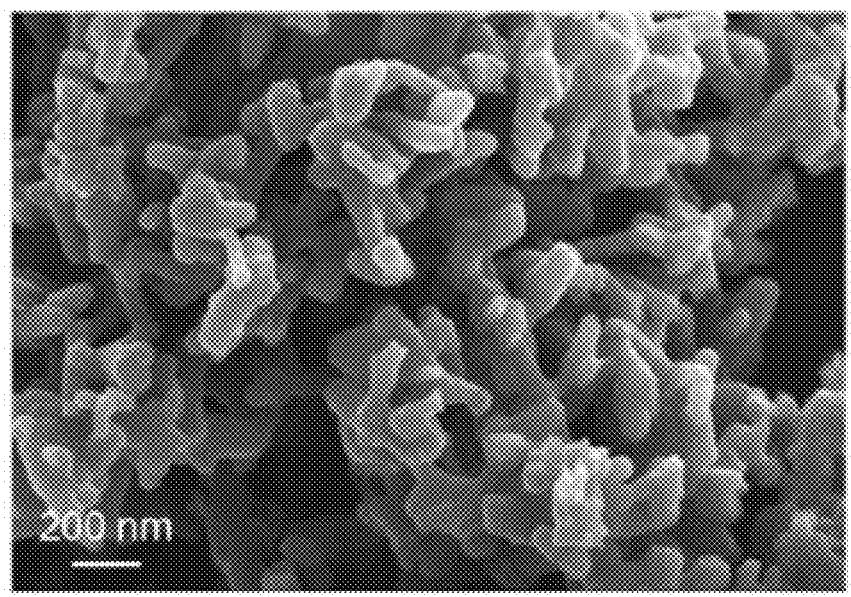
FIG. 27 shows a scanning electron microscopy image of $Ni_3BHT_1$, in accordance with some embodiments.
Figure 28:
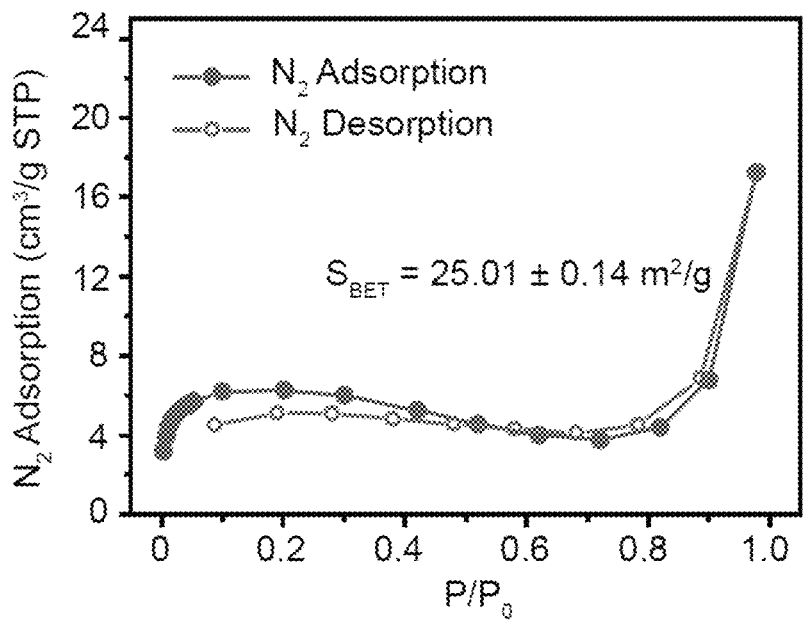
FIG. 28 shows a gas sorption isotherm for $Ni_3BHT_1$ obtained using $N_2$ as a probe gas, in accordance with some embodiments.
Figure 29:
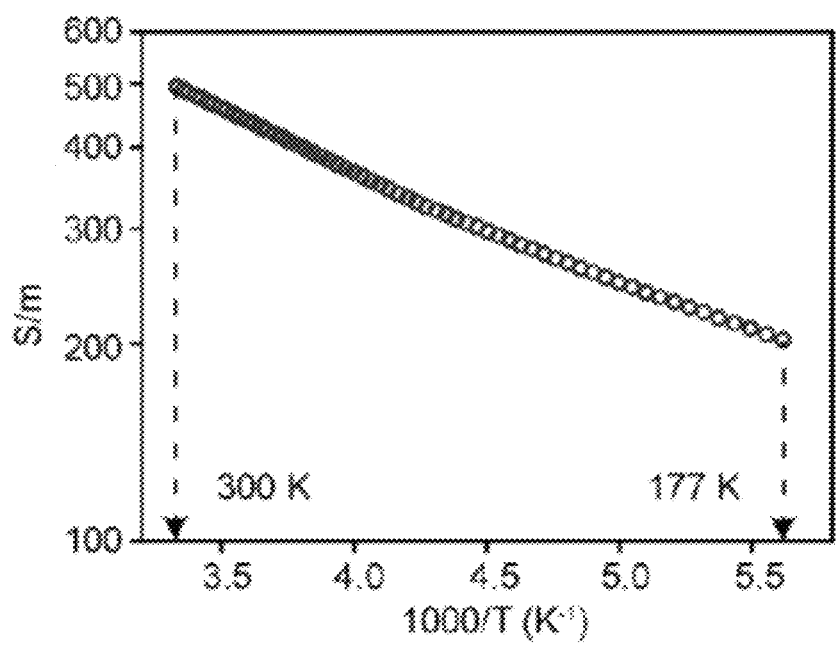
FIG. 29 shows the variable-temperature electrical conductivity of pressed $Ni_3BHT_1$ pellets, in accordance with some embodiments.

The bulk physical properties of Ni$_3$BHT$_1$ were studied using scanning electron microscopy (SEM), N$_2$ gas sorption analysis and van der Pauw electrical conductivity measurements. SEM images revealed rod-like structures that are larger than 100 nm in length and a few tens of nanometers in diameter (FIG. 27). N$_2$ sorption analysis determined a low Brunauer-Emmett-Teller (BET) SSA of ~25 m$^2$/g (FIG. 28), in line with the expected non-porous nature of Ni$_3$BHT$_1$. Variable-temperature electrical conductivity of pressed Ni$_3$BHT$_1$ pellets demonstrated an excellent conductivity of ~500 S/m at 298 K and a steady decline with decreasing temperature, as has been observed for several other bulk phases of 2D MOFs (FIG. 29). Overall, the 2D layered structure of Ni$_3$BHT$_1$ and its high electrical conductivity and thermal stability provided encouragement to assess its performance in supercapacitors. Electrochemical analyses were performed using a 1 M lithium hexafluorophosphate (LiPF$_6$)/MeCN electrolyte, which is believed to have a cation size that is adequately small to potentially intercalate between Ni$_3$BHT$_1$ layers.

Electrochemical Performance in Supercapacitors

Figure 30:
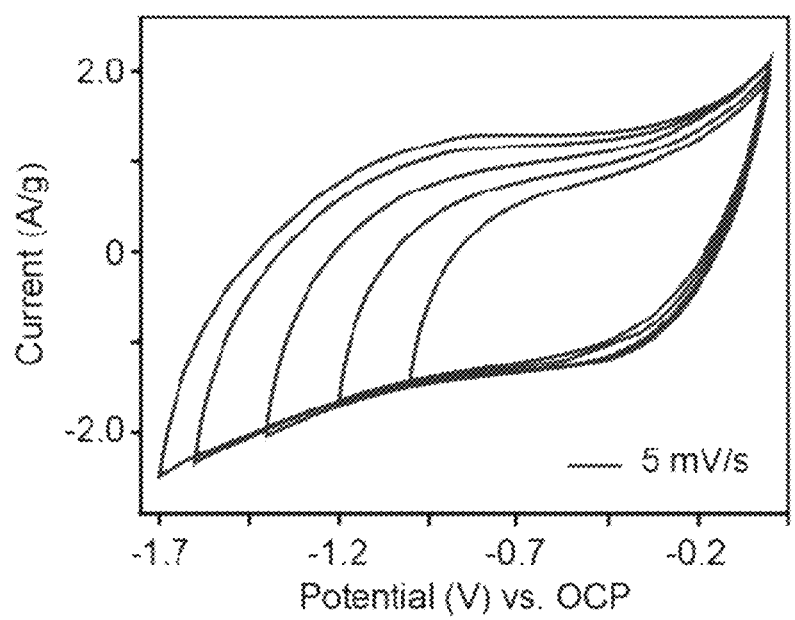
FIG. 30 shows cyclic voltammetry curves at a scan rate of 5 mV/s in increasing reductive potential windows from 1.0 to 1.7 V, in accordance with some embodiments.
Figure 31A:
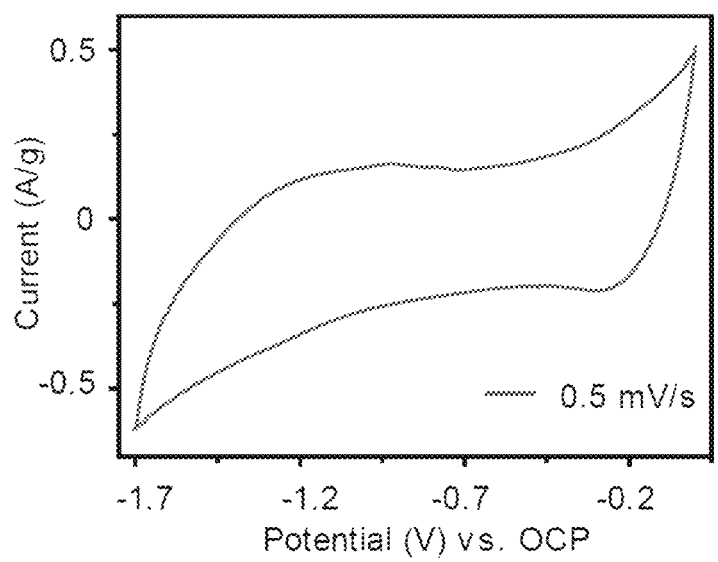
FIGS. 31A and 31B show cyclic voltammetry curves for $Ni_3BHT_1$ in a 1 M $LiPF_6$/MeCN electrolyte using a 3-electrode cell set-up and low scan rates, in accordance with some embodiments.
Figure 31B:
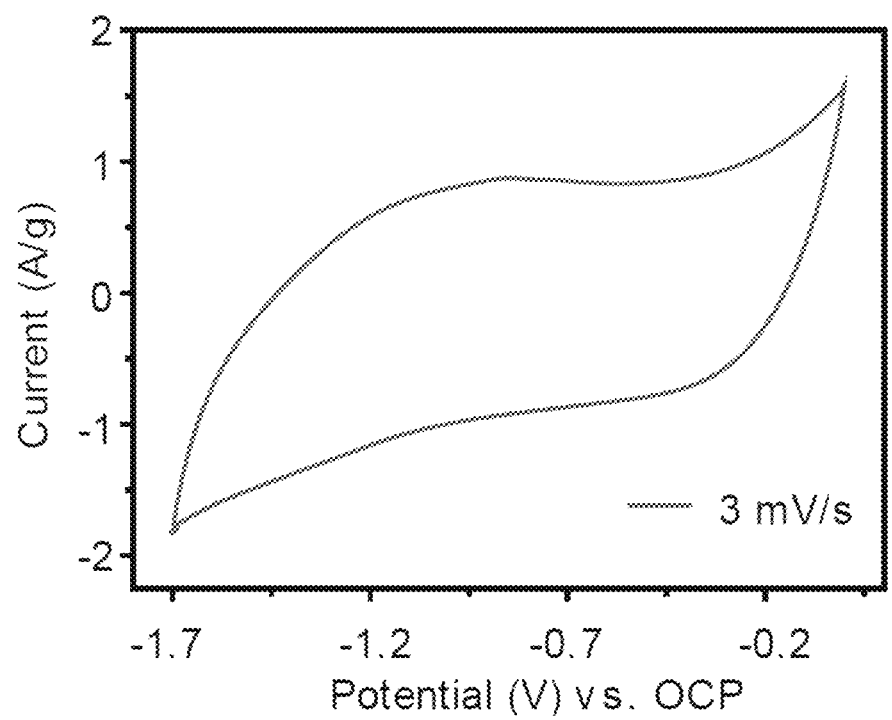
Figure 32:
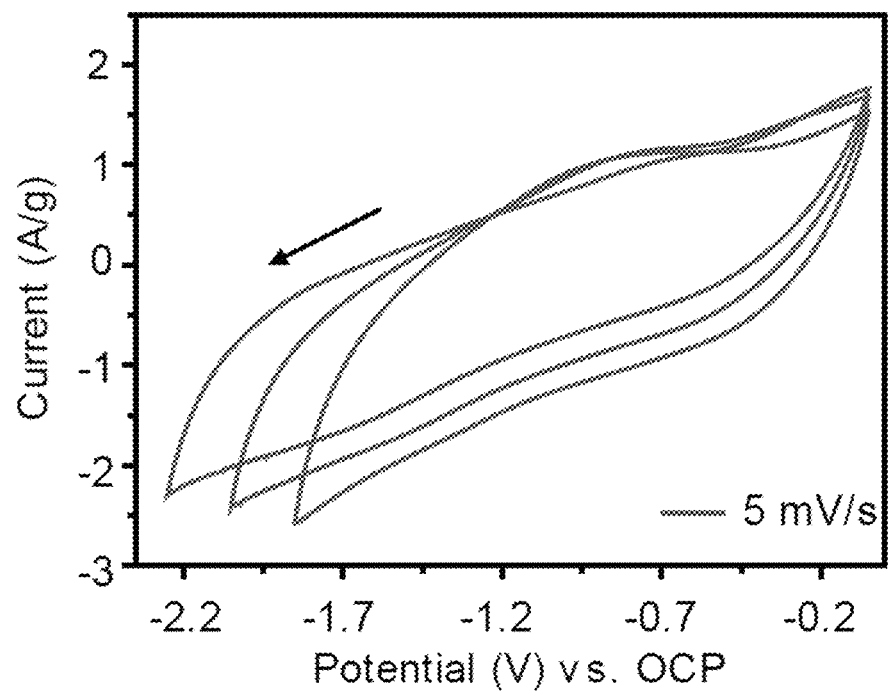
FIG. 32 shows cyclic voltammetry curves for $Ni_3BHT_1$ in a 1 M $LiPF_6$/MeCN electrolyte using a 3-electrode cell set-up and a scan rate of 5 mV/s, in accordance with some embodiments.

Cyclic voltammetry (CV) of Ni$_3$BHT$_1$ powders pressed on Ni foam was performed in a three-electrode cell using sufficiently large porous carbon as a counter electrode and Ag wire as pseudo-reference. CV curves obtained in increasingly large potential windows up to 1.7 V displayed distorted rectangular curves with no clear Faradaic processes (FIG. 30). Stable, rectangular voltammograms were observed even when the scan rate was decreased to as low as 0.5 mV/s (FIGS. 31A and B), but scanning beyond −1.7 V vs. open circuit potential (OCP) resulted in fast decay of current after multiple cycles (FIG. 32). Altogether, the CV responses indicate a capacitive charge storage process in Ni$_3$BHT$_1$ and also identify a safe working potential window of 1.7 V. Ni$_3$BHT$_1$ displayed high specific capacitances of 245 F/g and 426 F/cm$^3$ at a scan rate of 3 mV/s, which are unusually high for materials with surface areas as low as that of Ni$_3$BHT$_1$. Indeed, in view of its low surface area, it is believed that the large specific capacitance of Ni$_3$BHT$_1$ cannot be attributed to an ideal double-layer charge storage. An alternative mechanism is that of intercalation-based pseudocapacitance.

Figure 33:
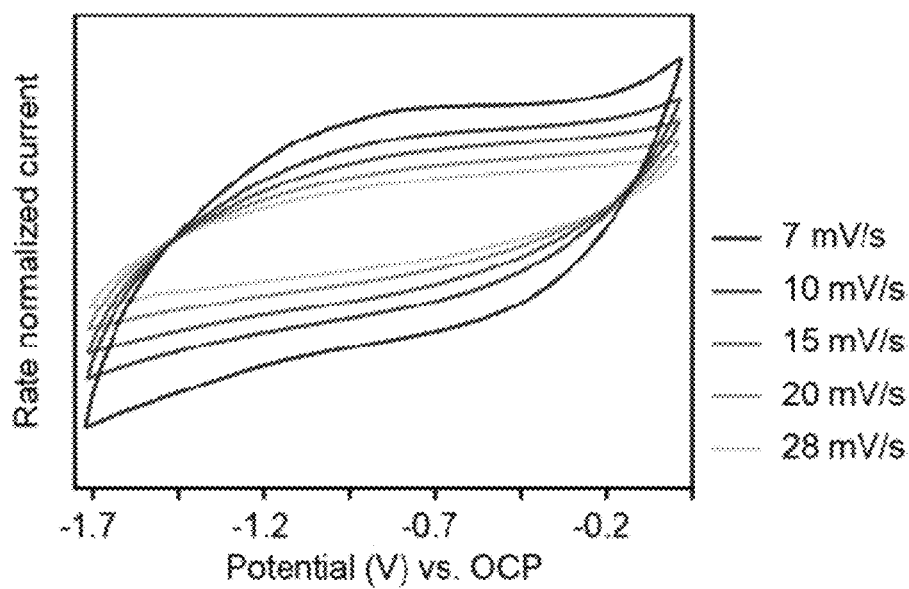
FIG. 33 shows cyclic voltammetry curves for a range of scan rates between 7 and 28 mV/s across a potential window of 1.7 V, in accordance with some embodiments.
Figure 34:
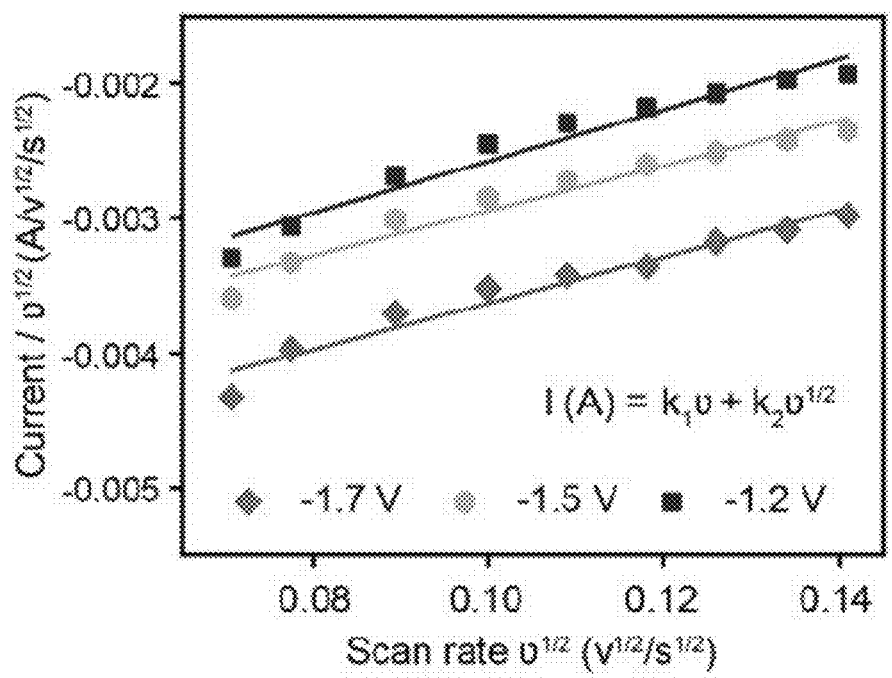
FIG. 34 is a plot showing current vs. scan rate, in accordance with some embodiments.
Figure 35:
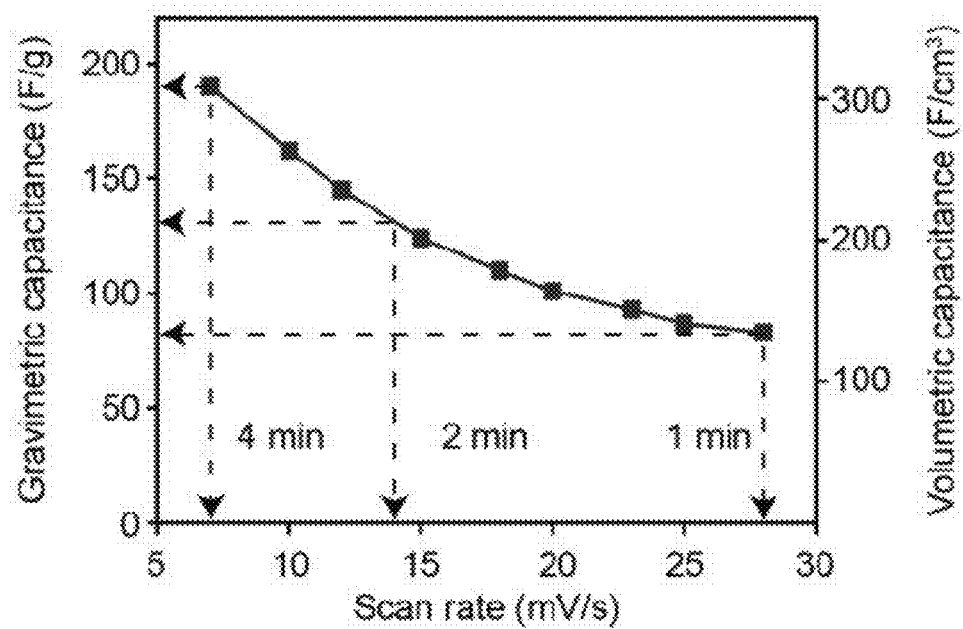
FIG. 35 is a plot showing specific discharge capacitances, in accordance with some embodiments.
Figure 36:
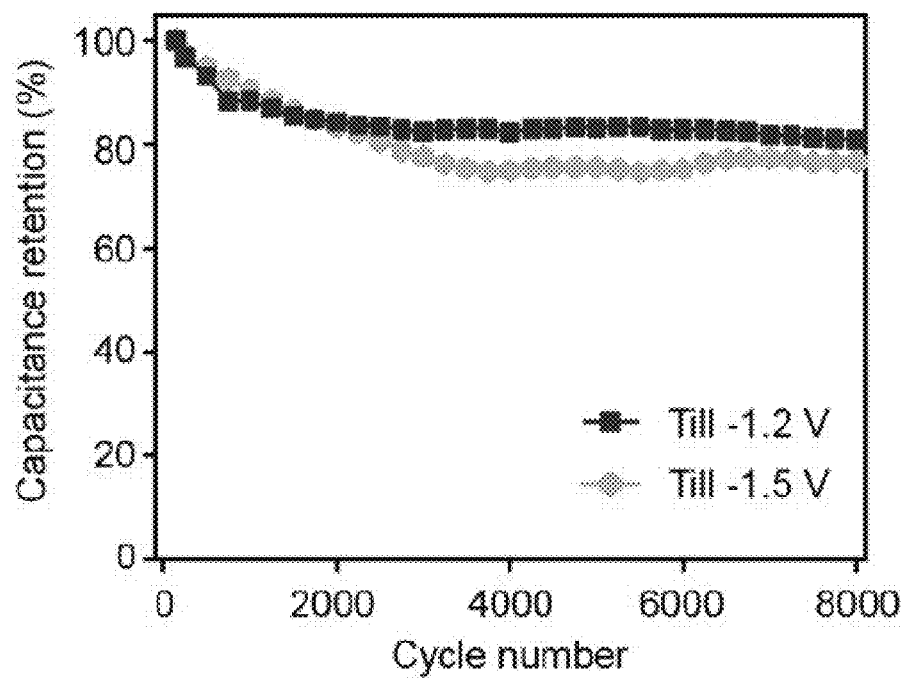
FIG. 36 is a plot showing capacitance retention under repeated cycling at a scan rate of 30 mV/s over 8,000 cycles, in accordance with some embodiments.
Figure 37:
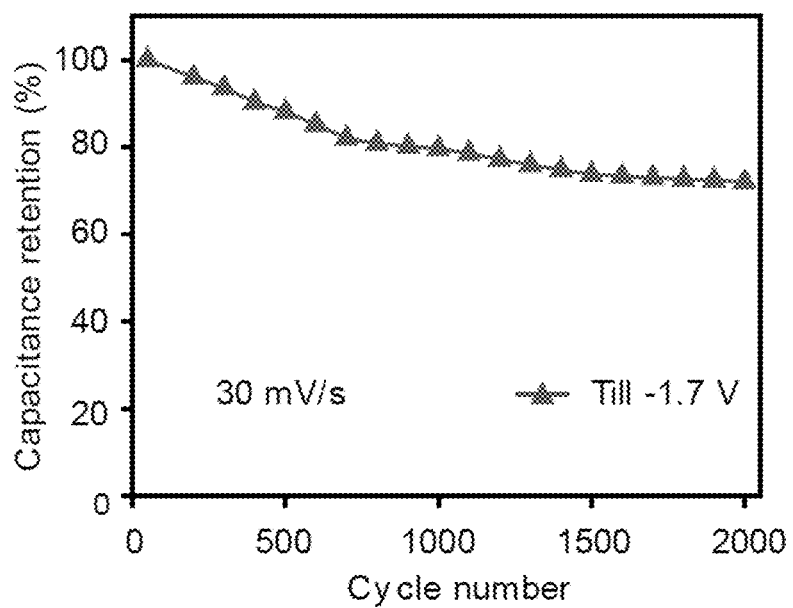
FIG. 37 is a plot showing cycling stability of $Ni_3BHT_1$ over 2,000 cyclic voltammetry cycles in a 3-electrode set-up employing a potential window of 1.7 V and a scan rate of 30 mV/s, in accordance with some embodiments.

One means to interrogate the mechanism giving rise to the high capacitance of Ni$_3$BHT$_1$ is through electrochemical kinetic studies that assess the nature of ion sorption on the electrode. Capacitive contributions in Ni$_3$BHT$_1$ were analyzed by plotting the current as i(V)/$\upsilon_{1/2}$ vs. $\upsilon^{1/2}$ for a range of scan rates at 3 different potentials (FIGS. 33-34). The slopes of these curves indicate major capacitive contributions of 80, 78, 76% at −1.2, −1.5 and −1.7 V vs. OCP, respectively, suggesting surface-controlled ion sorption in Ni$_3$BHT$_1$. Specific capacitances calculated from these curves reach high values of 195, 124 and 85 F/g at scan rates of 7, 14, and 28 mV/s, respectively (FIG. 35). Long-term cycling studies of Ni$_3$BHT$_1$ at a fast scan rate of 30 mV/s (discharge in 56 s) in different potential windows indicated retention of over 80% after 8,000 cycles (FIG. 36), although cycling in the widest window of 1.7 V decreased capacitance retention to 70% after 2000 cycles (FIG. 37).

Figure 38:
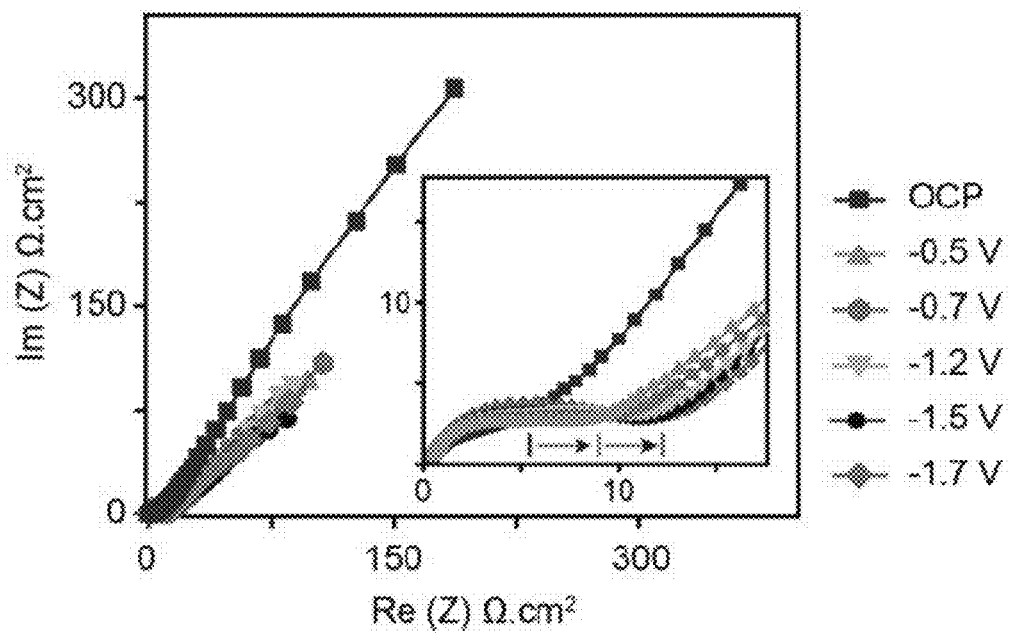
FIG. 38 is a plot of the imaginary vs. the real components of impedance obtained at frequencies between 10 mHz and 200 kHz for $Ni_3BHT_1$ electrodes, in accordance with some embodiments.

Electrochemical impedance spectra (EIS) were recorded at OCP under various negative polarizations to analyze the ion transport in Ni$_3$BHT$_1$ under dynamic conditions (FIG. 38). The EIS curves displayed extended 45° Warburg regions in the mid-frequency region and strong deviations from a vertical line in the lower frequency region, consistent with a non-ideal capacitive behavior that is typically associated with limited ion transport in an electrode material. In addition, a closer look at the high-frequency region yielded an increase in the semi-circle diameters with stronger polarizations (inset, FIG. 38), indicating that a charge transfer mechanism, typical of a pseudocapacitive electrode, may be at play.

Role of Electrolytic Ion Sizes

Next, experiments were performed to determine whether Ni$_3$BHT$_1$ displays intercalation-based pseudocapacitance.

Figure 39:
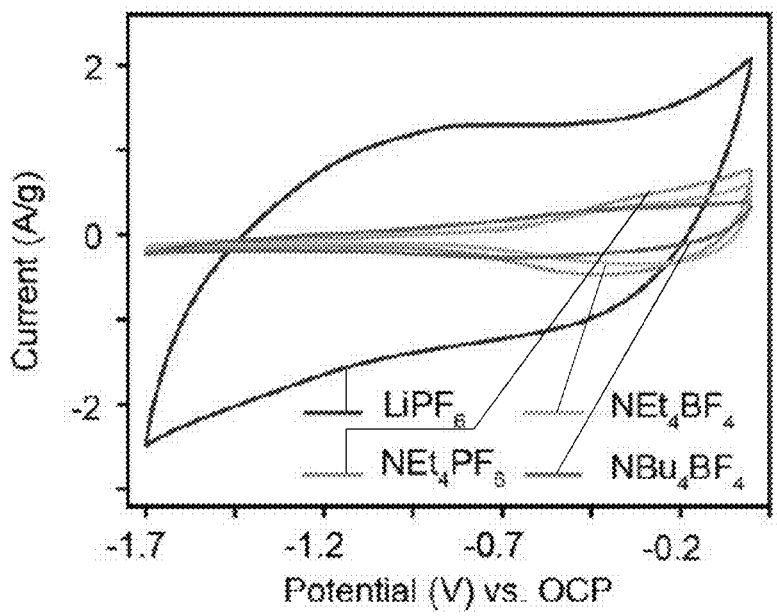
FIG. 39 is a plot showing cyclic voltammetry curves at a scan rate of 5 mV/s, in accordance with some embodiments.
Figure 40:
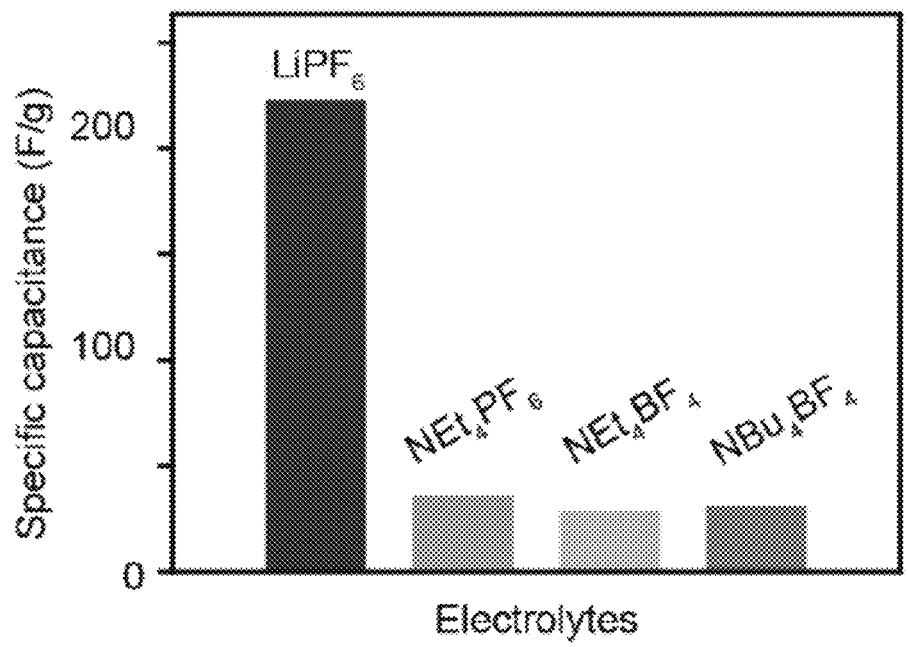
FIG. 40 is a plot showing gravimetric capacitances, in accordance with some embodiments.
Figure 41A:
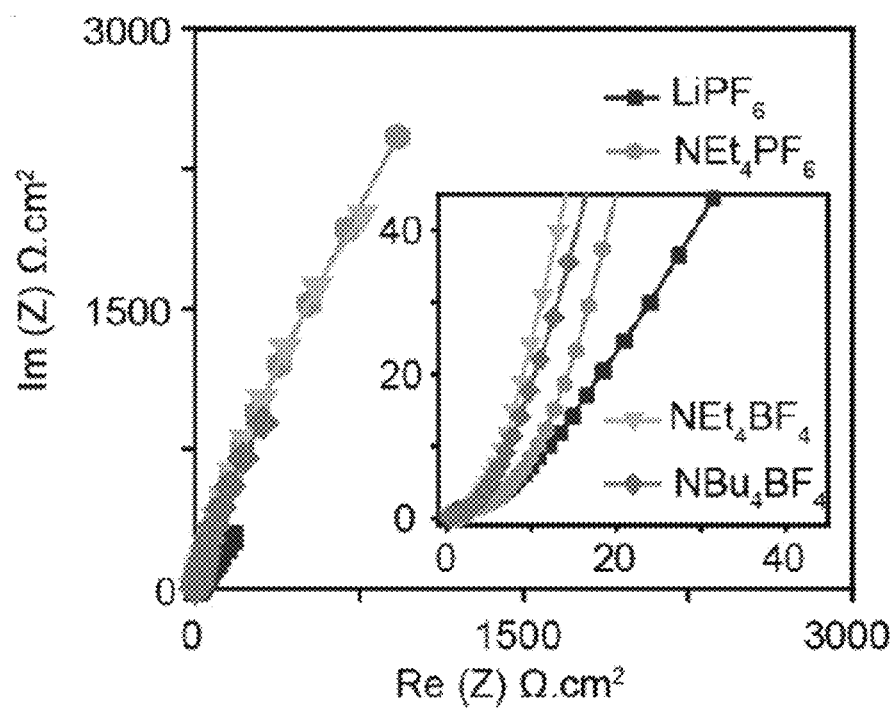
FIG. 41A is a plot showing Nyquist impedance spectra of $Ni_3BHT_1$, in accordance with some embodiments.

To this end, electrolyte salts with cations and anions of various sizes were employed: tetraethylammonium hexafluorophosphate ($NEt_4PF_6$), tetraethylammonium tetrafluoroborate ($NEt_4BF_4$), and tetrabutylammonium tetrafluoroborate ($NBu_4BF_4$). A comparison of CV curves obtained with these electrolytes demonstrates much lower current with tetraalkylammonium (TAA) cations relative to $Li^+$ (FIG. 39), and correspondingly lower capacitances of approximately 30 F/g compared to 227 F/g with Li+ (FIG. 40). Changing the anion and comparing $NEt_4PF_6$ to $NEt_4BF_4$ resulted in very similar CVs (FIG. 39), suggesting any differences in behavior are caused by cations and that the ion sorption process in accordingly mainly cation-driven. The CVs in TAA electrolytes further displayed nearly flat shapes with currents approaching zero upon scanning cathodically from OCP. It is believed that the observed ion-sieving behavior could be attributed to its ordered 2D layered structure, in which only ions that are smaller than the inter-layer spacing intercalate. Indeed, it is believed that $Li^+$ ions are small enough to intercalate, and their response in the low frequency region of the EIS deviated significantly from the ideal vertical line and differed from that of the larger $TAA^+$ cations, which are believed to be too bulky to intercalate (FIG. 41A).

Figure 41B:
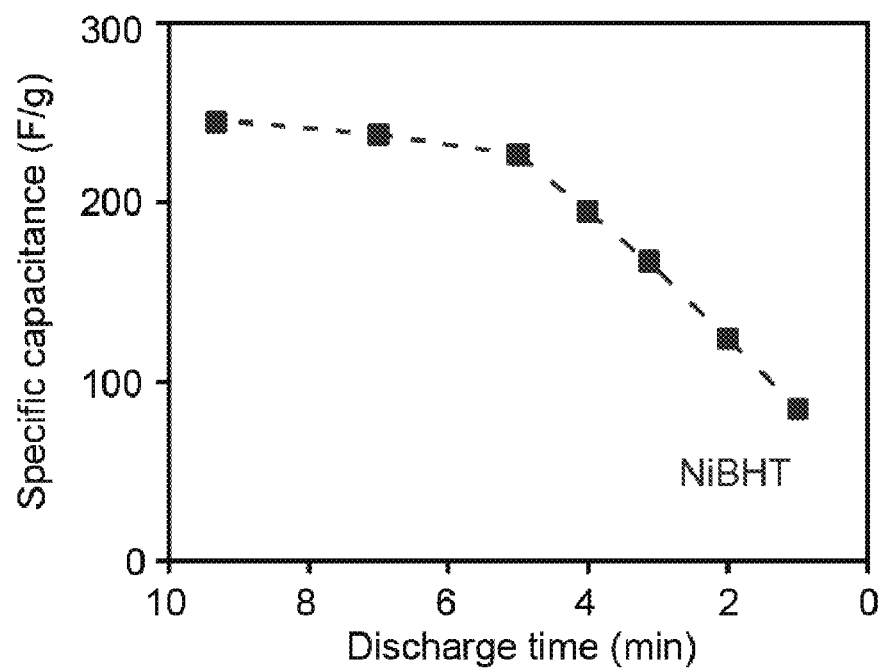
FIG. 41B is a plot showing the specific capacitance of $Ni_3BHT_1$ as a function of discharge time.

Overall, the electrochemical studies support an inference that ion sorption in $Ni_3BHT_3$ is affected by cation size and that the intercalation of ions into 2D layers influences the total capacitance. $Ni_3BHT_3$ showed a steady decline in performance when discharging in less than 3 minutes (FIG. 41B). This, together with the clear deviation from the ideal vertical line at low EIS frequencies expected for a pseudocapacitive material, point to impeded ion transport at high discharge rates.

Characterization of the Electrode Processes

Figure 42:
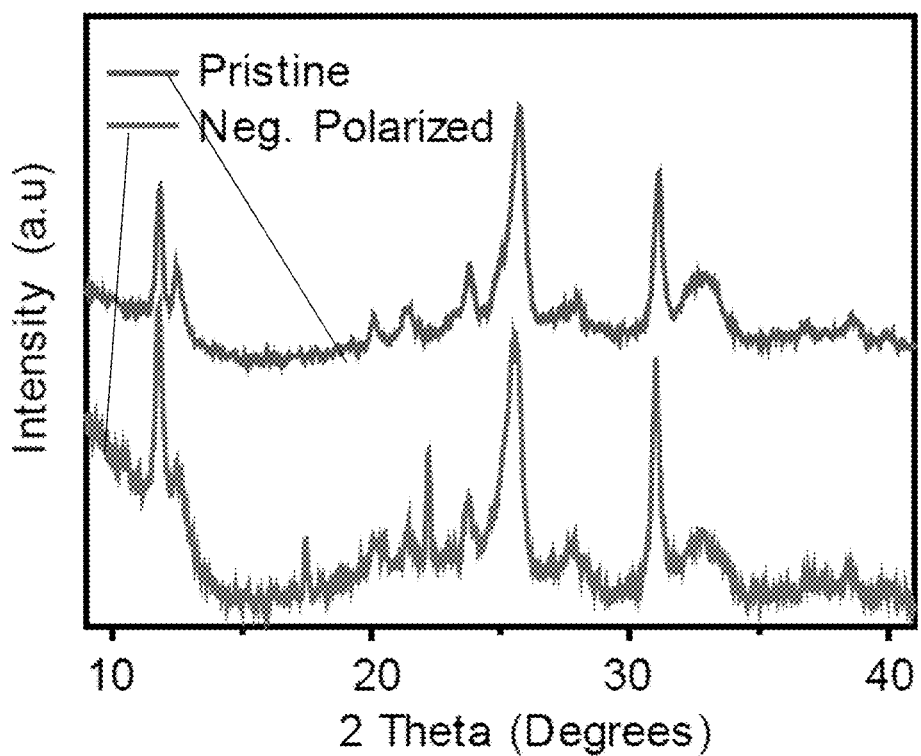
FIG. 42 is a plot showing powder X-ray diffraction patterns of pristine $Ni_3BHT_1$ pressed on a Ni foam before and after electrochemical cycling, in which the electrochemical cycling was performed in a 3-electrode setup at a scan rate of 30 mV/s and the cell was held at a voltage of −1.7 V vs. OCP for five minutes prior to disassembly for analysis, in accordance with some embodiments.

The structural and compositional evolution of $Ni_3BHT_1$ under potential bias was investigated using various ex situ X-ray and solid-state nuclear magnetic resonance (SSNMR) spectroscopy techniques. PXRD patterns of a $Ni_3BHT_1$ electrode cycled and negatively polarized in 1 M $LiPF_6$/MeCN evidenced good retention of crystallinity, highlighting the stability of $Ni_3BHT_1$ under electrochemical conditions (FIG. 42).

Figure 43:
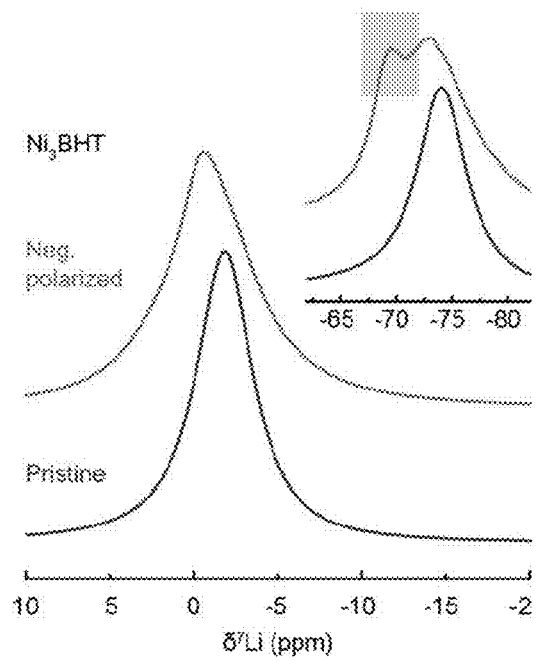
FIG. 43 is a plot showing $^7Li$ NMR spectra of soaked and negatively polarized $Ni_3BHT_1$ in a 1M $LiPF_6$/MeCN electrolyte, in accordance with some embodiments.
Figure 44:
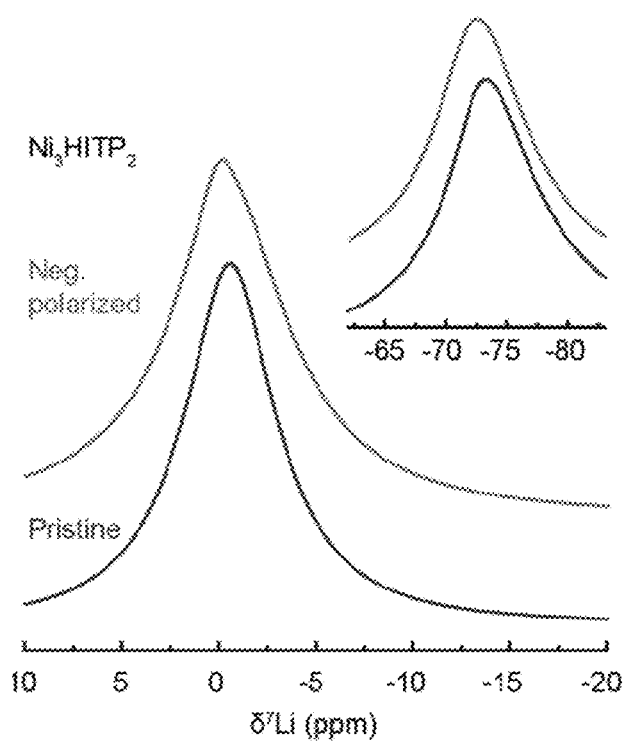
FIG. 44 is a plot showing $^7Li$ NMR spectra of soaked and negatively polarized $Ni_3HITP_2$ in a 1M $LiPF_6$/MeCN electrolyte, in accordance with some embodiments.

$^7Li$ SSNMR spectra of $Ni_3BHT_1$ samples prepared either as soaked with electrolyte or as negatively polarized in SCs were compared to identify different chemical environments of $^7Li$ during ion sorption under polarization. To provide a comparison point, similar tests were performed with $Ni_3HITP_2$ (HITP=2,3,6,7,10,11-hexaiminotriphenylene), a 2D porous MOF believed to adsorb ions in its micropores. $^7Li$ SSNMR spectra displayed strong isotropic peaks at approximately 0 ppm for both materials under all conditions (FIGS. 43 and 44). These peaks were assigned to $Li^+$ ions that are associated with the surface of the particles or of the pores. One notable difference is the asymmetry observed for the polarized $Ni_3BHT_1$ sample at −3 ppm, which manifests even more distinctly in its satellite peaks at ∼−70 and −73 ppm (inset, FIG. 43). The different chemical shift in the polarized $Ni_3BHT_1$ sample is believed to indicate a distinct ionic $^7Li$ chemical environment with distinct nuclear quadrupole coupling interactions, albeit with similar isotropic chemical shifts due to lithium's small diamagnetic chemical shift range. Because $Ni_3HITP_2$ exhibits micropores and thus allows double-layer ion adsorption, its $^7Li$ SSNMR spectrum displays a single gaussian-like resonance (FIG. 44). The additional $^7Li$ adsorption site in $Ni_3BHT_1$ is believed to arise from $Li^+$ ions intercalated in-between 2D sheets, in line with the electrochemical data.

Figure 45:
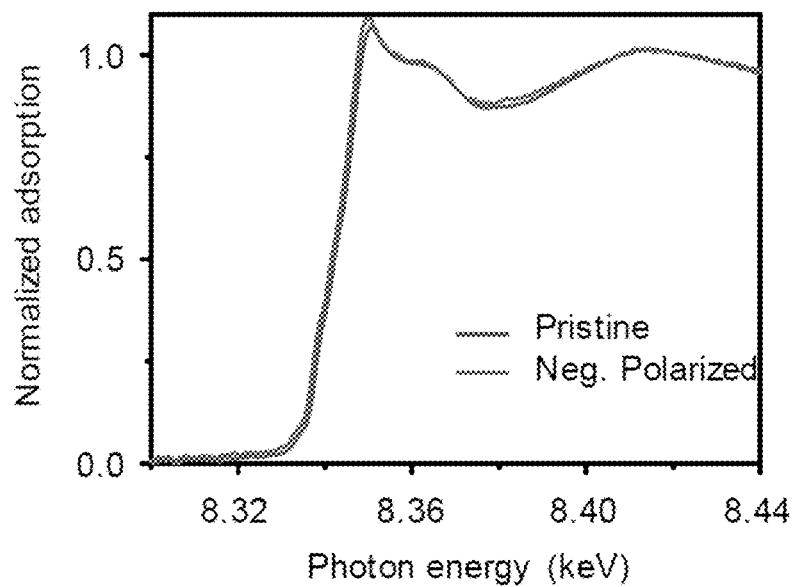
FIG. 45 is a plot showing Ni K-edge XANES, in accordance with some embodiments.
Figure 46:
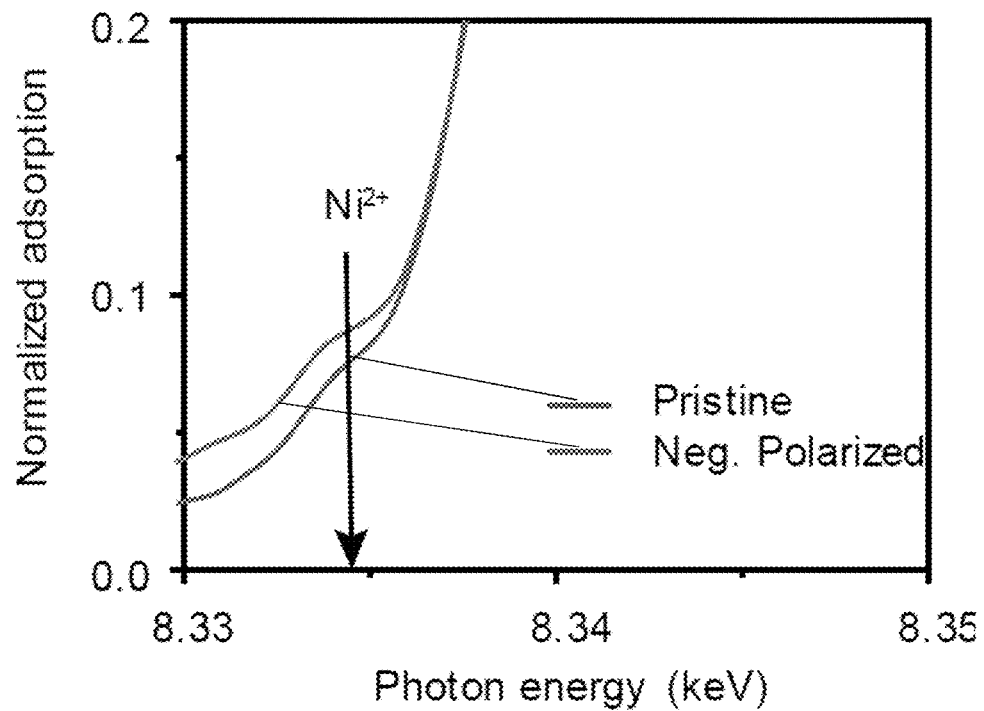
FIG. 46 is a plot showing pre-edge X-ray absorption for pristine $Ni_3BHT_1$ and for a negatively polarized $Ni_3BHT_1$ pellet, in accordance with some embodiments.
Figure 47:
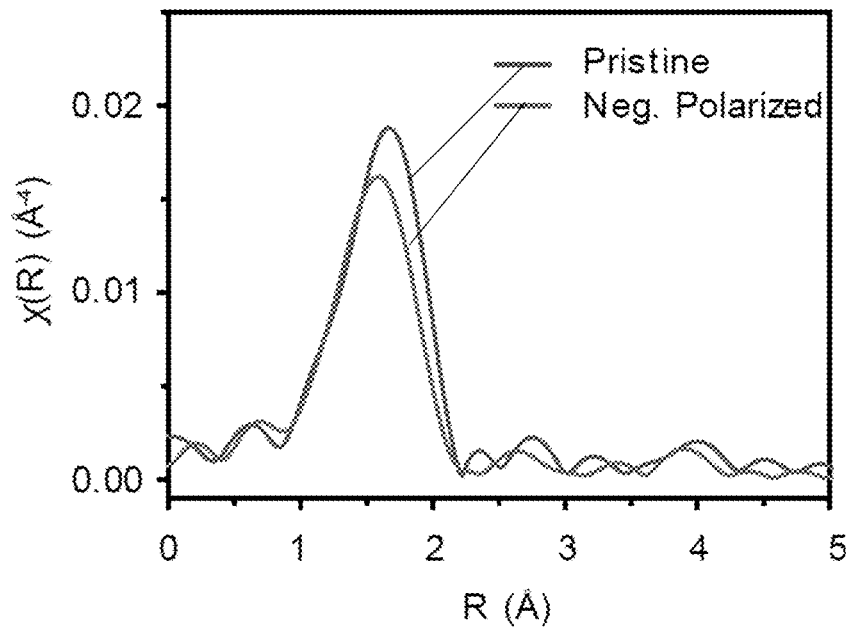
FIG. 47 is a plot showing a $k^3$-weighted Fourier transform of EXAFS for pristine and negatively polarized $Ni_3BHT_1$, in accordance with some embodiments.
Figure 48:
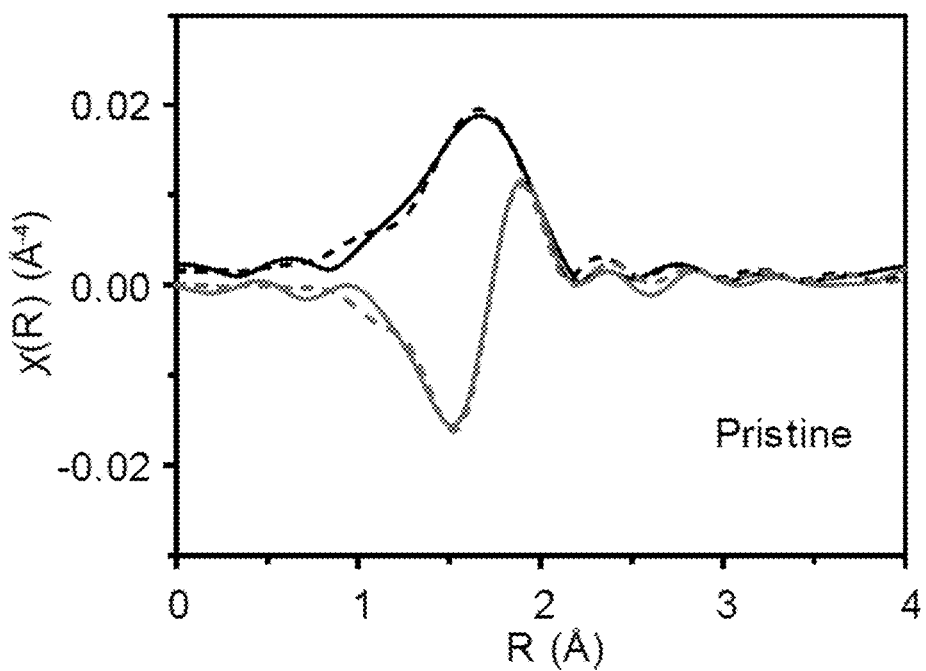
FIG. 48 is a plot showing the quality of the fits for $k^3$-weighted Fourier transform of EXAFS for pristine $Ni_3BHT_1$, in accordance with some embodiments.
Figure 49:
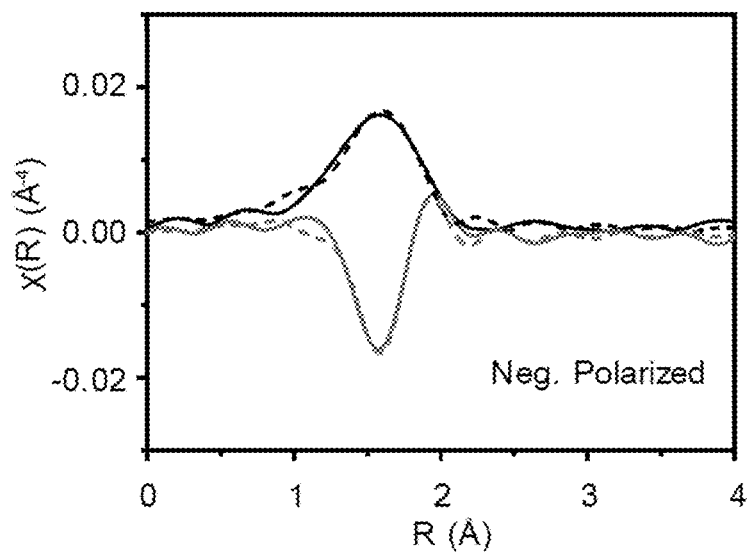
FIG. 49 is a plot showing the quality of the fits for $k^3$-weighted Fourier transform of EXAFS for pristine $Ni_3BHT_1$, in accordance with some embodiments.
Figure 50:
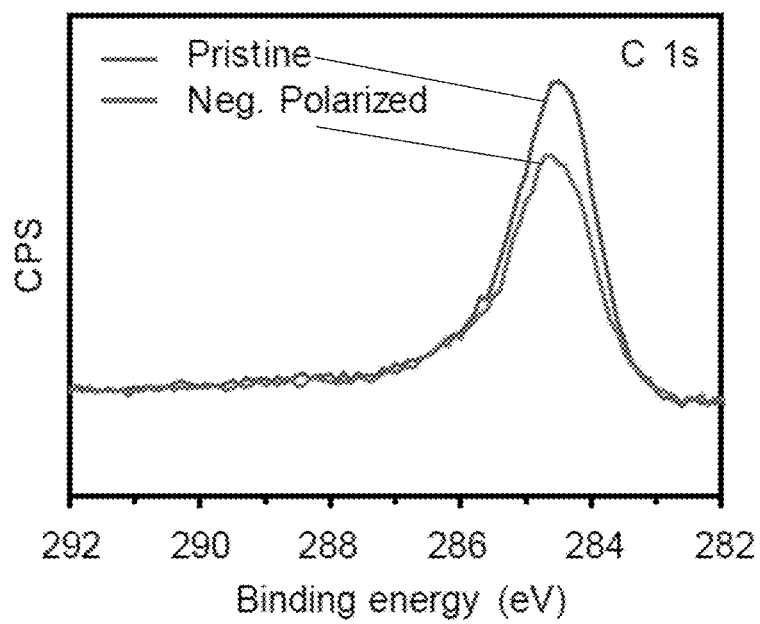
FIG. 50 is a plot showing a C 1s high resolution X-ray photoelectron spectrum of pristine and negatively polarized $Ni_3BHT_1$, in accordance with some embodiments.
Figure 51:
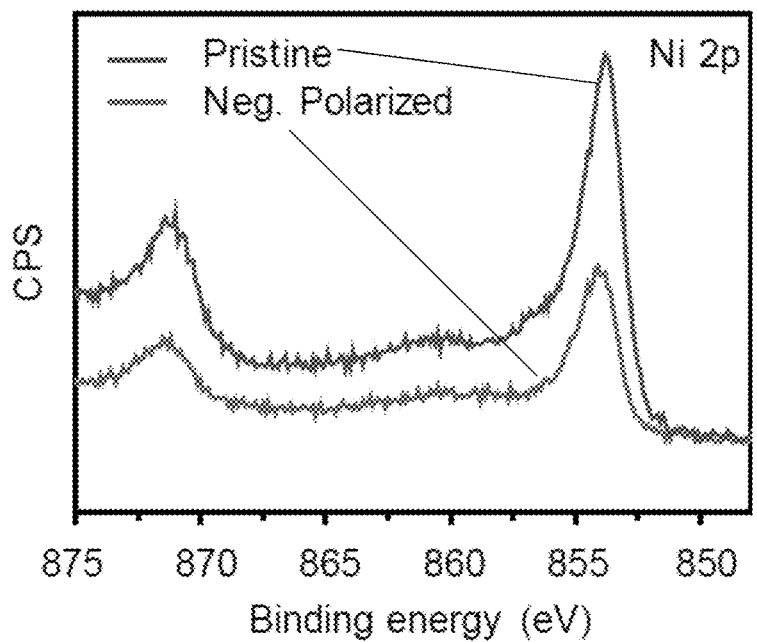
FIG. 51 is a plot showing a Ni 2p high resolution X-ray photoelectron spectrum of pristine and negatively polarized $Ni_3BHT_1$, in accordance with some embodiments.
Figure 52:
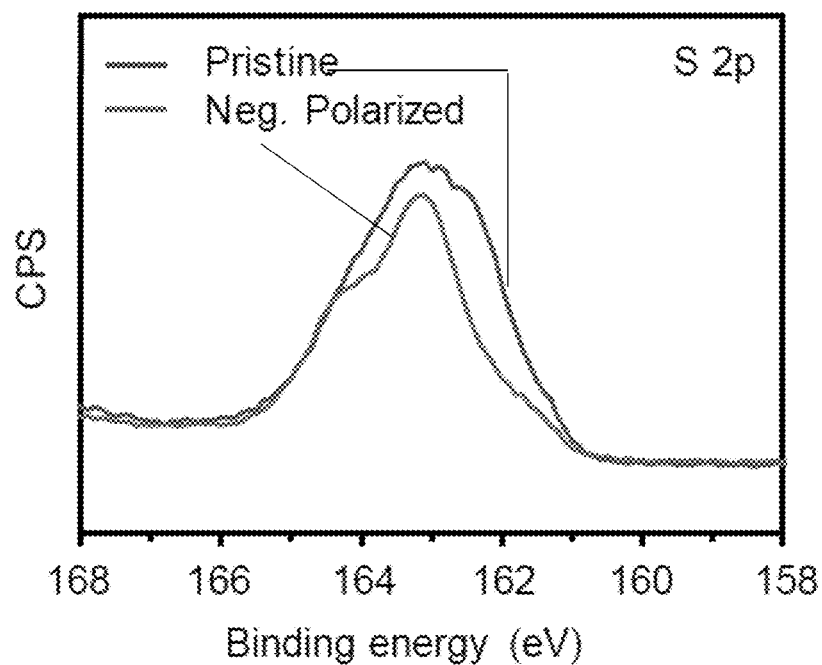
FIG. 52 is a plot showing a S 2p high resolution X-ray photoelectron spectrum of pristine and negatively polarized $Ni_3BHT_1$, in accordance with some embodiments.
Figure 53:
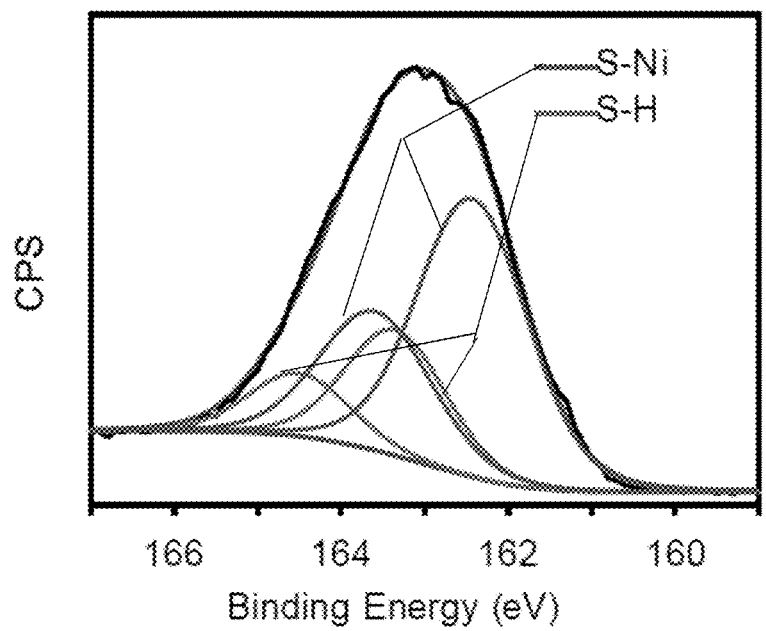
FIG. 53 is a plot showing a S 2p high resolution X-ray photoelectron spectrum of pristine $Ni_3BHT_1$, in accordance with some embodiments.
Figure 54:
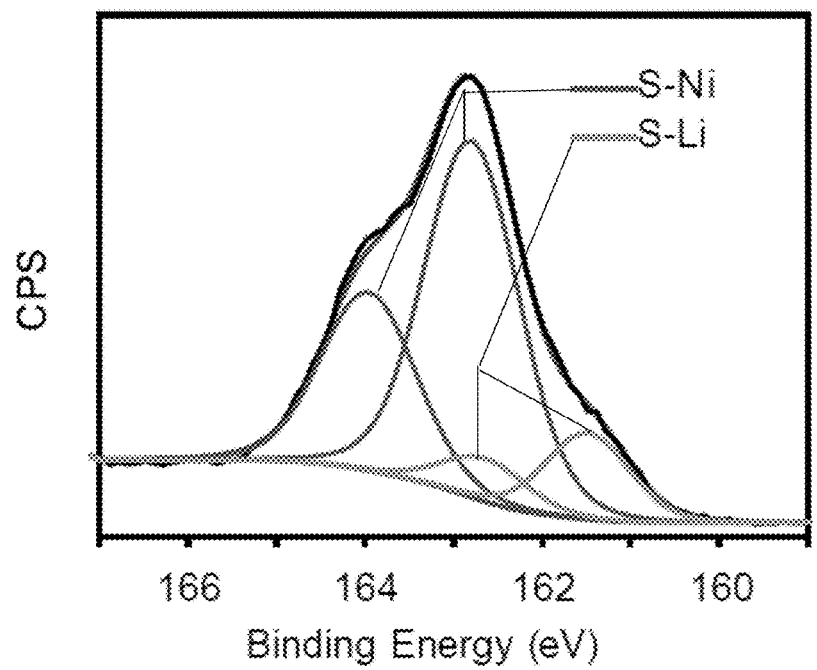
FIG. 54 is a plot showing a S 2p high resolution X-ray photoelectron spectrum of a negatively polarized $Ni_3BHT_1$ pellet, in accordance with some embodiments.

X-ray absorption spectroscopy (XAS) is believed to evidence that the pseudocapacitive behavior of $Ni_3BHT_1$ is not Ni-based. The X-ray absorption near edge spectroscopy (XANES) at the Ni—K edge revealed edge and pre-edge energies of 8.346 keV and 8.334 keV, respectively, for both pristine and polarized $Ni_3BHT_1$, which is believed to indicate that the 2+ oxidation state of Ni persisted during supercapacitor operation (FIGS. 45 and 46). Furthermore, analysis of the local coordination around Ni from the X-ray absorption fine structure (EXAFS) revealed essentially identical Ni coordination numbers of 4(±0.4) and 3.7(±0.4) before and after polarization (FIGS. 47-48). Likewise, the Ni—S bond length in $Ni_3BHT_1$ remained largely unchanged, although a slight decrease from 2.16 (±0.02) to 2.13 (±0.02) Å upon polarization suggests increased electron density on the S atoms. These observations suggest that redox processes are not metal based, and instead center on the ligand. Indeed, high resolution X-ray photoelectron spectroscopy (XPS) shows that the C 1s and Ni 2p peaks are unaffected by polarization, and the only observable changes are with the S 2p peak (FIGS. 50-52). Specifically, deconvolution of the S signal into various chemical components with doublet structures of $2_{p1/2}$ and $2_{p3/2}$, reveals a loss of S—H component and an appearance of S—Li component upon polarization, indicating reduction and subsequent intercalation of Li+ associated with the electronegative S sites (FIGS. 53-54). Notably, the observed redox process is believed to differentiate $Ni_3BHT_1$ from other transition metal-based pseudocapacitive materials wherein multiple oxidation states of the metal ions (Ru, Nb or Mo) are accessed during intercalation. Unfortunately, the extended conjugation structure over metal-organic frameworks makes it infeasible to identify the exact changes in oxidation states of the ligands. Nevertheless, the high specific capacitances and the large reductive potential window through intercalation pseudocapacitance identifies $Ni_3BHT_1$ as a promising negative electrode towards fabricating high-voltage asymmetric supercapacitors.

CONCLUSIONS

Figure 55:
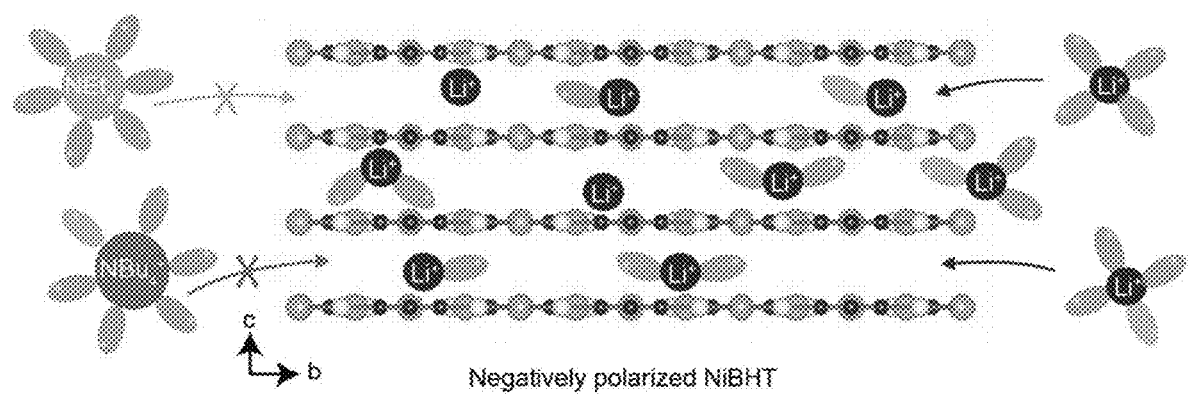
FIG. 55 is a schematic representation of the intercalative ion sorption of $Li^+$ ions between 2D layers of $Ni_3BHT_1$, in accordance with some embodiments.

In summary, it was demonstrated that despite its lack of porosity, $Ni_3BHT_1$ is a promising electrode material for supercapacitors, which delivers high specific capacitance of 245 F/g in a large reductive potential window of 1.7 V. Extensive electrochemical analyses have supported an inference that an intercalation-based ion-sorption mechanism has enabled such high capacitances in $Ni_3BHT_1$. A schematic of this process is shown in FIG. 55.

Materials and Methods $NiCl_2.6H_2O$ was purchased from Sigma-Aldrich and was used without further purification. Methanol and MeCN were purchased from VWR and were collected from an alumina column solvent purification system. Methanol was degassed overnight using in-house $N_2$ prior to $Ni_3BHT_1$ synthesis. All electrolytic salts, $LiPF_6$ and tetraalkylammonium salts, were purchased from Sigma-Aldrich or Beantown Chemicals and were used without further purification. Activated carbon was prepared as a thin film by repeated kneading and rolling of a slurry of activated carbon, acetylene black and a PTFE solution mixture in 8:1:1 ratio, respectively with ethanol. The prepared films were dried at 120° C. overnight prior to use in supercapacitors.

Synthesis of $Ni_3BHT_1$ 132 mg (0.555 mmol) of $NiCl_2.6H_2O$ was first dissolved in 100 mL of degassed methanol under a nitrogen atmosphere. BHT powder (50 mg, 0.185 mmol) was slowly added to the solution over 30 min and then the mixture was allowed to react for 24 h at room temperature. The resulting powder was filtered and cleaned with water and ethanol twice each and was dried at 100° C. under dynamic vacuum for 12 h. Yield: 73 mg, 90%. Elemental analysis was performed by Robertson Microlit Laboratories, N.J., USA using combustion and titration techniques. The obtained data were fit using ethanol and water as solvent residues in the material. Expected C: 19.43%, S: 44.41% and H: 1.61%. Observed C: 19.54%, S: 44.66% and H: 1.56%.

Figure 56:
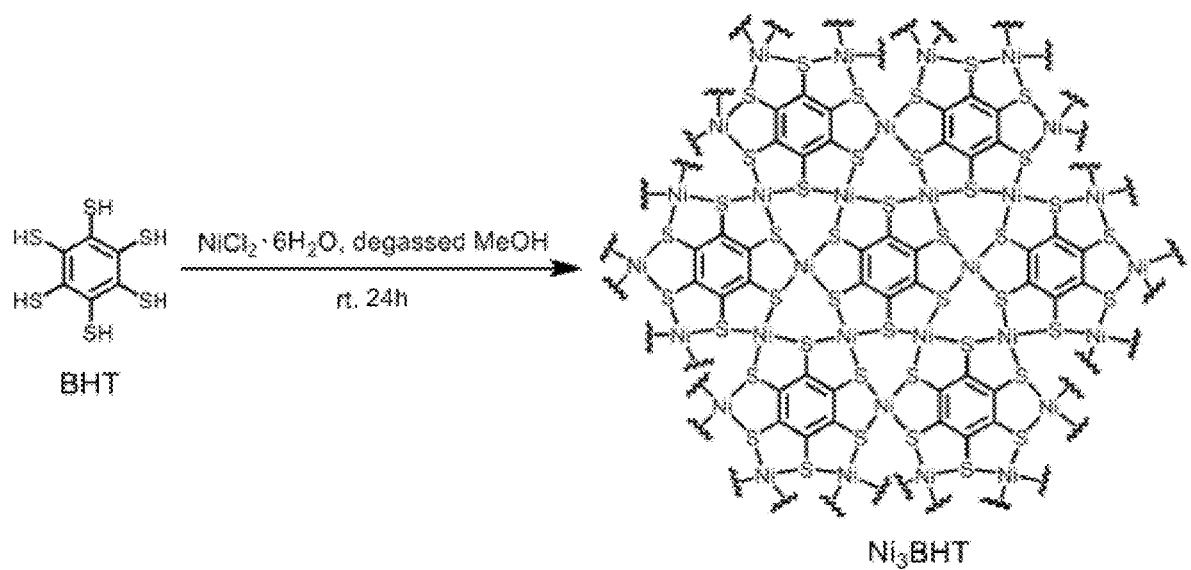
FIG. 56 is a schematic depiction of the synthesis of $Ni_3BHT_1$ by using a BHT ligand, in accordance with some embodiments.

FIG. 56 depicts the synthesis of $Ni_3BHT_1$ schematically.

Electrical Conductivity

The electrical conductivity of $Ni_3BHT_1$ was measured by the four-point van der Pauw method on a pellet with a 7 mm diameter pressed at 3.0 ton-force/cm$^2$. A Keithley 2450 source-meter was used as a current source and a Keithley 2182A unit was used as a voltmeter.

Electrochemical Characterization and Analysis

All electrochemical measurements were carried out using a Biologic VSP-300 potentiostat. EIS measurements were performed using a multi-sinusoidal signal with an amplitude of 10 mV over a large frequency range of 10 mHz-200 kHz. The specific gravimetric capacitance ($C_g$) was calculated from the discharge sequence of three-electrode CV curves using equation:

$$Cg=((\int I \cdot dV)/(m \cdot v \cdot dV))$$

where m=mass of the working electrode, dV=discharge potential window, u=scan rate. Volumetric capacitance ($C_v$) was calculated by multiplying $C_g$ with the electrode density (1.74 g/cm$^3$). CVs at different scan rates were compared by plotting their rate normalized currents: the currents divided by the corresponding scan rates.

Instrumentation and Sample Preparation

Powder X-ray diffraction (PXRD) patterns were recorded with a Bruker D8 Advance diffractometer equipped with a Gobel mirror, rotating sample stage, LynxEye detector and Cu Kα (λD 1.5405) X-ray source in a θ=2θ Bragg-Brentano geometry. An anti-scattering slit (2 mm) and an exchangeable detector slit (8 mm) were used. The tube voltage and current were 40 kV and 40 mA, respectively. Knife-edge attachments were used to remove scattering at low angles. Samples for PXRD were prepared by placing electrodes or powders on a zero-background silicon (510) crystal plate. Polarized $Ni_3BHT_1$ electrodes were prepared by pressing $Ni_3BHT_1$ powders on Ni foam and polarizing in a three-electrode cell. The fabricated cell was first allowed to rest overnight, then cycled at a scan rate of 10 mV/s for 100 cycles and held at -1.7 V vs. OCP for 5 minutes prior to disassembly.

Selected area electron diffraction (SAED) images were obtained with JEOL-2100, operated at an accelerating voltage of 200 kV. Samples were drop-cast onto Cu TEM grids from powder dispersed in methanol. Scanning electron microscopy (SEM) images were recorded using a Zeiss Supra 55VP FEG SEM using an InLens detector at an operating voltage of 3 kV. Nitrogen gas adsorption isotherms were measured with a Micromeritics ASAP 2020 Surface Area and Porosity Analyzer using liquid nitrogen baths (77 K). Samples were heated to 90° C. under a vacuum of 0.2 mtorr for 24 h prior to the analysis. Thermogravimetric analysis (TGA) was performed on a TA instruments Q500 Thermogravimetric Analyzer at a heating rate of 1° C./min under a nitrogen gas flow of 10 mL/min on a platinum pan.

Solid-state $^7$Li NMR experiments were performed on a Bruker NEO 500 (Bo=11.75 T, 500 MHz $^1$H) NMR spectrometer equipped with a 4 mm double resonance H-X magic-angle spinning (MAS) Bruker NMR probe. Powdered samples were packed into 4 mm o.d. $ZrO_2$ NMR rotors and closed with a Kel-F cap. NMR data were collected using Bloch decay or Hahn echo (γB1/2π=62.5 kHz) pulse sequences and acquired with MAS at a spinning frequency of 14 kHz. The Bloch pulse experiments implemented either π/4 (2 μs) or π/2 (4 μs) excitation pulses, and the Hahn echo pulses were optimized for each sample. Recycle delays were determined by measuring the $^7$Li nuclear spin-lattice relaxation (T1) time by the inversion-recovery method, and ranged between 75 and 300 ms. All $^7$Li NMR spectra were referenced to 0 ppm using a 1 M LiCl solution as an external reference. NMR spectra were processed within Topspin using exponential line broadening using -5 Hz. Data were also attempted using $^1$H decoupling however are not presented as the NMR line widths were not visibly impacted by $^1$H-$^7$Li heteronuclear dipolar coupling within these materials. Samples were prepared as either simply soaked in the electrolyte or as negatively polarized in supercapacitors. Soaked samples were prepared by adding ~2 ml of the $LiPF_6$/MeCN electrolyte to 25 mg of Ni3BHT in a glass vial and allowed to rest overnight. Polarized $Ni_3BHT_1$ electrodes were prepared by pressing $Ni_3BHT$, powders as pellets and polarizing in a three-electrode cell. The fabricated cell was first allowed to rest overnight and then scanned at 5 mV/s for 20 cycles in a potential range of 0 to -1.7 V vs. OCP and held at -1.7 V for 5 minutes before disassembly. Both the soaking and polarization procedures resulted in adsorption of Li ions at various available sorption sites and thus allowed for analysis of local chemical environment using ssNMR techniques. The wet samples of soaked powders and polarized electrodes of $Ni_3BHT_1$ were mildly washed with an MeCN solvent to remove excess electrolytic ions that remain as free species in the macro pores and were then dried under vacuum.

X-ray absorption spectroscopy (XAS) experiments were performed at the 10-BM beamline at the Advanced Photon Source (APS) at Argonne National Laboratory. All measurements were performed at the Ni K edge (8.333 keV) in transmission mode in fast scans from 250 eV below the edge to 550 eV above the edge, which took approximately 10 minutes per scan. Samples were pressed into a stainless-steel sample holder and placed in a sample cell. The cell was sealed and transferred to the beamline for measurement. At the Ni K edge, the Ni—S(CN=1, R=2.28 Å) scattering pair was simulated. $S_0^2$ was calibrated by fitting the foil. This was found to be 0.75. Least squared fits of the first shell of r-space and of isolated q-space were performed on the k$^3$ weighted Fourier transform data over the range 2.7 to 10 Å$^{-1}$ in each spectrum to fit the magnitude and imaginary components. Polarized $Ni_3BHT_1$ samples were prepared by using pristine $Ni_3BHT_1$ pellets as working electrodes in a three-electrode cell. Electrodes were first allowed to rest overnight and then they were scanned at 5 mV/s for 20 cycles in a potential range of 0 to -1.7 V vs. OCP and held at -1.7 V for 5 minutes before disassembly. Upon disassembly, the working electrode was carefully collected, rinsed with MeCN and dried.

X-ray photoelectron spectroscopy (XPS) was performed with a photoelectron spectrometer K-Alpha XPS System (Thermo Scientific) equipped with a hemispherical analyzer. The spectra were acquired using a monochromatized aluminum source Al Kα (E D 1,486.6 eV) with a beam spot size of 400 microns in a standard emission geometry with an analyzer energy resolution of 0.1 eV. Surface charge neutralization was performed by using a low-energy flood gun. Spectra were charge referenced to the adventitious C 1s, C—C peak at 284.8 eV. Polarized samples for ex situ analysis were prepared similarly to the XAS samples.

TABLE 1

Performance metrics for $Ni_3BHT_1$.

| Electrode material | Electrolyte | Gravimetric capacitance (F/g), scan conditions, discharge time |
|---|---|---|
| $Ni_3BHT_1$ | 1M $LiPF_6$/MECN | 124 F/g, 14 mV/s, 1.70 V (2 min)<br>195 F/g, 7 mV/s, 1.70 V (4 min)<br>238 F/g, 4 mV/s, 1.70 V (7 min) |

TABLE 2

Characteristics of pristine and negatively polarized $Ni_3BHT_1$ obtained from X-ray absorption spectroscopy

| Sample | Pre-edge energy (keV) | XANES energy (keV) | Scattering Pair | CN (±0.4) | R(Å) (±0.02) | $\sigma^2(Å^2)$ |
|---|---|---|---|---|---|---|
| Pristine $Ni_3BHT_1$ | 8.334 | 8.346 | Ni—S | 4.0 | 2.16 | 0.006 |
| Negatively polarized $Ni_3BHT_1$ | 8.334 | 8.346 | Ni—S | 3.7 | 2.13 | 0.006 |

X-Ray Diffraction Patterns Under Polarization

The PXRD patterns of the pristine $Ni_3BHT_1$ and negatively polarized electrodes show similar patterns with no obvious changes in peak positions (FIG. 37), indicating minimal changes to inter-layer packing distance upon intercalation of $Li^+$ ions. It is believed that this data indicates that the electrolytic $Li^+$ ions can undergo partial or full desolvation during intercalation depending on the nature of solvent-electrode surface interactions.

$Ni_3HITP_2$ as a Control Material for NMR $^7Li$ NMR studies were performed on samples that were either soaked or negatively polarized in a 1 M $LiPF_6$ electrolyte. Both the soaking and polarization procedures result in adsorption of Li ions at various available sorption sites and thus allow for analysis of the local chemical environment using NMR techniques. The wet samples were mildly washed with acetonitrile to remove excess electrolytic ions that remain as free species and then dried under vacuum. NMR studies of $Ni_3BHT_1$ indicated the presence of two distinct chemical environments for adsorbed Li ions and signaled the possibility of intercalative ion sorption in between the 2D sheets. In order to further understand this additional signal from $Ni_3BHT_1$, $Ni_3HITP_2$ was studied as a control material. $Ni_3HITP_2$ and $Ni_3BHT_1$ both have 2D structures with Ni as the metal nodes and also have electrical conductivity values that are within two orders of magnitudes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A supercapacitor electrode, comprising:
   a metal-organic framework comprising a plurality of metal ions coordinated with a plurality of ligands, wherein:
       the plurality of ligands comprises ligands comprising two or more sulfur donor atoms; and
       the metal ions are coordinated with the ligands comprising the sulfur donor atoms by the sulfur donor atoms.

2. A supercapacitor electrode as in claim 1, wherein the plurality of metal ions comprise nickel ions and the plurality of ligands comprise benzenehexathiol ligands.

3. A supercapacitor electrode as in claim 1, wherein the metal-organic framework has the following structure:

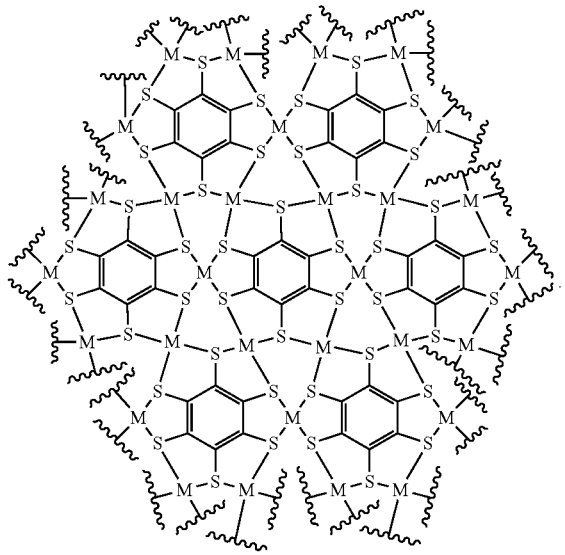

and wherein M is a nickel ion.

4. A supercapacitor electrode as in claim 1, wherein the metal-organic framework has a two-dimensional structure.

5. A supercapacitor electrode as in claim 1, wherein the metal-organic framework comprises a plurality of two-dimensional sheets.

6. A supercapacitor electrode as in claim 5, wherein an interaction energy between the plurality of two-dimensional sheets is less than a bond strength within the plurality of two-dimensional sheets.

7. A supercapacitor electrode as in claim 6, wherein an average spacing between the two-dimensional sheets is greater than or equal to 0.3 nm and less than or equal to 1 nm.

8. A supercapacitor electrode as in claim 1, wherein the metal-organic framework comprises a plurality of pores.

9. A supercapacitor electrode as in claim 8, wherein the plurality of pores are positioned in a plurality of two-dimensional sheets.

10. A supercapacitor electrode as in claim 1, wherein a portion of the metal ions are associated with two or more ligands.

11. A supercapacitor electrode as in claim 1, wherein the sulfur donor atoms are arranged about an organic core.

12. A supercapacitor electrode as in claim 11, wherein the organic core comprises an aryl and/or a heteroaryl ring.

13. A supercapacitor electrode as in claim 1, wherein the two or more sulfur donor atoms comprise vicinal thiol groups.

14. A supercapacitor electrode as in claim 1, wherein the plurality of ligands comprises benzenehexathiol and/or triphenylenehexathiol.

15. A supercapacitor electrode as in claim 1, wherein the supercapacitor electrode is positioned in a supercapacitor further comprising an electrolyte.

16. A supercapacitor electrode as in claim 15, wherein the electrolyte comprises an ionic liquid.

17. A supercapacitor electrode as in claim 1, wherein a second plurality of ions intercalates between the two-dimensional sheets of the metal-organic framework.

18. A supercapacitor electrode as in claim 1, wherein a redox potential for the plurality of metal ions is greater than or equal to −3.0 V and less than or equal to 2 V in comparison to a Standard Hydrogen Electrode.

19. A metal-organic framework, comprising:
   a plurality of metal ions coordinated with a plurality of ligands, wherein:
       the metal ions comprise nickel ions, cobalt ions, iron ions, platinum ions, and/or palladium ions;
       the plurality of ligands comprises ligands comprising two or more sulfur donor atoms; and
       the metal ions are coordinated with the ligands comprising the sulfur donor atoms by the sulfur donor atoms.

20. A supercapacitor, comprising:
   a first electrode comprising a first metal-organic framework; and
   a second electrode comprising a second metal-organic framework, wherein:
       each metal-organic framework comprises a plurality of metal ions coordinated with a plurality of ligands; and
       the second metal-organic framework differs from the first metal-organic framework.

* * * * *